(12) United States Patent
Chang et al.

(10) Patent No.: US 10,670,828 B2
(45) Date of Patent: Jun. 2, 2020

(54) OPTICAL IMAGE CAPTURING SYSTEM WITH THIN MOUNTING COMPONENTS

(71) Applicant: Ability Opto-Electronics Technology Co. Ltd., Taichung (TW)

(72) Inventors: Yeong-Ming Chang, Taichung (TW); Chien-Hsun Lai, Taichung (TW); Yao-Wei Liu, Taichung (TW)

(73) Assignee: ABILITY OPTO-ELECTRONICS TECHNOLOGY CO. LTD., Taichung (TW)

( * ) Notice: Subject to any disclaimer, the term of this patent is extended or adjusted under 35 U.S.C. 154(b) by 0 days.

(21) Appl. No.: 15/905,447

(22) Filed: Feb. 26, 2018

(65) Prior Publication Data

US 2019/0018215 A1    Jan. 17, 2019

(30) Foreign Application Priority Data

Jul. 12, 2017    (TW) .............................. 106210245 U

(51) Int. Cl.
| | |
|---|---|
| *G02B 7/02* | (2006.01) |
| *G02B 7/04* | (2006.01) |
| *G02B 13/00* | (2006.01) |
| *G02B 5/00* | (2006.01) |

(52) U.S. Cl.
CPC .............. *G02B 7/04* (2013.01); *G02B 7/021* (2013.01); *G02B 7/026* (2013.01); *G02B 13/0045* (2013.01); *G02B 5/005* (2013.01)

(58) Field of Classification Search
CPC .......... G02B 7/04; G02B 7/021; G02B 7/026; G02B 13/0045; G02B 5/005
See application file for complete search history.

(56) References Cited

U.S. PATENT DOCUMENTS

| | | | | |
|---|---|---|---|---|
| 9,456,735 | B2* | 10/2016 | Hrayr ................. | A61B 1/00183 |
| 2016/0124187 | A1* | 5/2016 | Chen ................. | G02B 13/0045 |
| | | | | 348/373 |

* cited by examiner

*Primary Examiner* — William Choi
(74) *Attorney, Agent, or Firm* — Muncy, Geissler, Olds & Lowe, P.C.

(57) ABSTRACT

An optical image capturing system with thin mounting components includes an optical imaging lens set providing at least two lenses with refractive power, an image plane, a first lens positioning element and a second lens positioning element. In certain conditions, the optical image capturing system with thin mounting components utilizes the member with a small thickness to design the positioning of the lenses, further effectively elevating the amount of light admitted into the optical image capturing system with thin mounting components and increasing the field of view thereof. The optical image capturing system with thin mounting components has an adequate illuminance and elevates the image quality in order to be applied to the small electronic products or the electronic products with slim border.

20 Claims, 28 Drawing Sheets

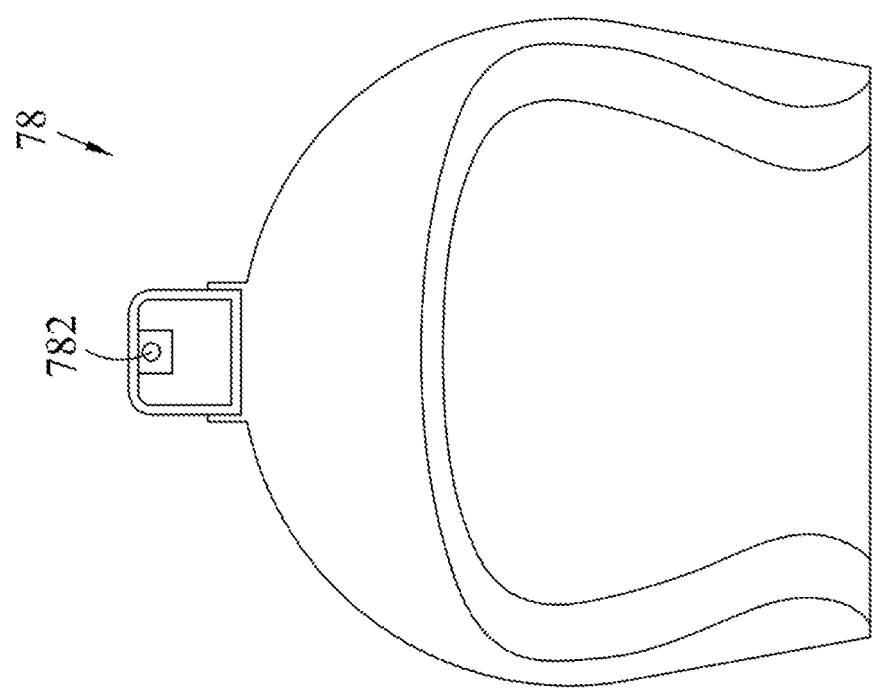

OPTICAL IMAGE CAPTURING SYSTEM WITH THIN MOUNTING COMPONENTS

CROSS-REFERENCE TO RELATED APPLICATION

This application claims priority from Taiwan Patent Application No. 106210245, filed on Jul. 12, 2017, in the Taiwan Intellectual Property Office, the content of which is hereby incorporated by reference in its entirety for all purposes.

BACKGROUND OF THE INVENTION

1. Field of the Invention

The present invention generally relates to an optical image capturing system, and more particularly to a minimized optical image capturing system with thin mounting components applied for an electronic device.

2. Description of the Related Art

In recent years, as the popularization of portable electronic devices with camera functionalities increases, the demand for optical systems has been elevated. The photosensitive element of an ordinary optical system is commonly selected from a charge coupled device (CCD) or complementary metal-oxide semiconductor sensor (CMOS Sensor). With the recent advancements in semiconductor device manufacturing technology, the pixel size of the photosensitive element has been gradually minimized, and the development of optical systems with a high pixel field has substantially improved. Therefore, the demand for high image quality increases on a daily basis.

Conventional optical systems of portable electronic devices usually adopt a two lenses structure as their main structure. However, since the pixel density of portable electronic devices continuously increases, more end-users are demanding for cameras having a large aperture, equipped with functionalities such as low light mode or night mode. Conventional optical image capturing systems may not be sufficient to meet those advanced photography requirements.

Therefore, it is an important issue about how to effectively increase the amount of light admitted into the optical image capturing system with thin mounting components and further elevate the image quality thereof.

SUMMARY OF THE INVENTION

The aspect of embodiment of the present invention directs to an optical image capturing system with thin mounting components and can use a combination of refractive powers, convex and concave surfaces of at least two optical lenses (the convex surface or concave surface in the disclosure is the description of the change of geometrical shape of an object side or an image side of each lens at different heights from an optical axis in principle), and use mechanism elements with thread-less configurations and having a thin thickness for the design of the positioning lens, further effectively increasing the amount of light admitted into the optical image capturing system with thin mounting components and increasing the angle of view of the optical imaging lens with thin mounting components, and being equipped with certain relative illuminance and improving the total pixels and image quality, in order to be applied to minimized or electronic products with thin mounting components.

The terms and definitions pertaining to the mechanism element parameters in the embodiment of the present invention are shown below for further reference:

Please refer to FIG. 1C, which is shown for explaining the terms of identical mechanism elements in each embodiment of present invention by taking the first embodiment of present invention for example. The optical image capturing system with thin mounting components comprises an image sensing device S. The optical image capturing system with thin mounting components may further comprise a first lens positioning element, denoted as PE1 (Positioning Element 1) and the first lens positioning element may be formed of a material which may be selected from metals such as aluminum, copper, silver and gold, or plastics such as PC and LCP. The first lens positioning element comprises a lens mount PEH and a base plate PEB. The lens mount PEH is disposed to be near to the object side, hollow and opaque for shading the optical imaging lens set, while the base plate PEB has an open accommodating space, and configured in a direction approaching the image plane for shading the image plane. The maximum of a smallest side length on a plane of a periphery of the base plate PEB and perpendicular to the optical axis is PhiD. The first lens positioning element PE1 may be selected as the commonly known holder or belong to the integrally formed mechanism member. The optical imaging lens set 10 may further comprise a second lens positioning element, denoted as PE2 (Positioning Element 2), with a hollow-tubular shape and opaque properties, accommodated in the lens mount PEH and comprising a positioning portion PEP, and the positioning portion PEP is utilized to accommodate the optical imaging lens set for the function of positionally arranging the lenses on the optical axis. An external side of the positioning portion PEP does not contact inner sides of the lens mount PEH. The maximum diameter of a plane of a periphery of an image side of the positioning portion PEP and perpendicular to the optical axis is PhiC. The maximum thickness of the smallest side length of the base plate PEB is TH1. The minimum thickness of the positioning portion PEP is TH2.

Regarding the present invention of the optical image capturing system with thin mounting components, since the external side of the positioning portion PEP of the second lens positioning element PE2 does not contact the inner sides of the lens mount PEH of the first lens positioning element PE1, curable adhesive may be applied to the first lens positioning element PE1 and the second lens positioning element PE2 in advance, and the optical axis of the optical imaging lens set may be adjusted to overlap the normal line at the center of the image sensing device S, after which, the step of curing the applied curable adhesive may be subsequently performed. That is, the so-called active alignment assembly method is performed. Currently, with respect to a more complicated optical image capturing system with thin mounting components or specific applications such as the assembly of lenses, the active alignment technique is essential therein, and the present invention of the optical capturing system with thin mounting components may exactly meet the said requirement.

The term and its definition to the lens parameter in the embodiment of the present are shown below for further reference.

The Lens Parameter Related to a Length or a Height of the Lens

The maximum image height of the optical image capturing system with thin mounting components may be expressed as HOI. The height of the optical image capturing system with thin mounting components may be expressed as HOS. The distance from the object side of the first lens to the image side of the last lens of the optical image capturing system with thin mounting components may be expressed as InTL. The distance from a fixed aperture (stop) to the image plane of the optical image capturing system with thin mounting components may be expressed as InS. The distance from the first lens to the second lens of the optical image capturing system with thin mounting components may be expressed as IN12 (example). The thickness of the first lens of the optical image capturing system with thin mounting components on the optical axis may be expressed as TP1 (example).

The Lens Parameter Related to Material of the Lens

A coefficient of dispersion of the first lens in the optical image capturing system with thin mounting components may be expressed as NA1 (example); a refractive index of the first lens may be expressed as Nd1 (example).

The Lens Parameter Related to Angle of View

An angle of view may be expressed as AF. A half angle of view may be expressed as HAF. An angle of a chief ray may be expressed as MRA.

The Lens Parameter Related to the Exit/Entrance Pupil

An entrance pupil diameter of the optical image capturing system with thin mounting components may be expressed as HEP. The maximum effective half diameter (EHD) of any surface of a single lens refers to a perpendicular height between the optical axis and an intersection point, where the incident ray at the maximum view angle passing through the most marginal entrance pupil intersects with the surface of the lens. For example, the maximum effective half diameter of the object side of the first lens may be expressed as EHD11. The maximum effective half diameter of the image side of the first lens may be expressed as EHD 12. The maximum effective half diameter of the object side of the second lens may be expressed as EHD21. The maximum effective half diameter of the image side of the second lens may be expressed as EHD22. The maximum effective half diameters of any surfaces of other lens in the optical image capturing system with thin mounting components may be expressed in a similar way. The maximum effective diameter of an image side of a lens closest to the image plane among the optical image capturing system with thin mounting components is PhiA, and a formula as follows is satisfied: PhiA=2 EHD, wherein if the surface is aspheric, the cut-off point of the maximum effective diameter may include the cut-off point of the aspheric surface. An ineffective half diameter of any surface of a single lens denoted as IHD means the surface section extended from the cut-off point (if the surface is aspheric, the cut-off point is the end point with an aspheric parameter on the surface) of the maximum effective diameter on the same surface in the direction away from the optical axis. The maximum diameter of an image side of a lens closest to the image plane among the optical image capturing system with thin mounting components is PhiB, and a formula as follows is satisfied: PhiB=2 (EHD+IHD)=PhiA+2 (IHD).

The maximum effective diameter of an image side of a lens closest to the image plane (i.e. the image space) in the optical image capturing system with thin mounting components is also called an optical exit pupil, denoted as PhiA. If the optical exit pupil is positioned on the image side of the third lens, the optical exit pupil may be denoted as PhiA3. If the optical exit pupil is positioned on the image side of the fourth lens, the optical exit pupil may be denoted as PhiA4. If the optical exit pupil is positioned on the image side of the fifth lens, the optical exit pupil may be denoted as PhiA5. If the optical exit pupil is positioned on the image side of the sixth lens, the optical exit pupil may be denoted as PhiA6. If the optical image capturing system with thin mounting components has more lenses with different refractive power, the optical exit pupil thereof is denoted in a similar way as described above. The pupil ratio of the optical image capturing system with thin mounting components may be denoted as PMR, and a condition as follows is satisfied: PMR=PhiA/HEP.

The Lens Parameter Related to the Arc Length of the Lens Shape and the Outline of Surface of the Lens The outline curve length of the maximum effective half diameter of any surface of single lens refers to an arc length of a curve, which starts from an intersection point as an initial point where the surface of the lens intersects the optical axis of the optical image capturing system with thin mounting components, travels along the surface outline of the lens, and ends at the point which defines the maximum effective half diameter; the arc length between the aforementioned two points is the outline curve length of the maximum effective half diameter, and may be denoted as ARS. For example, the length of the maximum effective half diameter outline curve of the object side of the first lens may be denoted as ARS11. The length of the maximum effective half diameter outline curve of the image side of the first lens may be denoted as ARS12. The length of the maximum effective half diameter outline curve of the object side of the second lens may be denoted as ARS21. The length of the maximum effective half diameter outline curve of the image side of the second lens may be denoted as ARS22. The outline curve lengths of the maximum effective half diameter of any surface of the other lenses in the optical image capturing system with thin mounting components may be denoted according to the regular pattern shown above.

The outline curve length of ½ entrance pupil diameter (HEP) of any surface of single lens refers to an arc length of curve, which starts from an intersection point as an initial point where the surface of the lens intersects the optical axis of the optical image capturing system with thin mounting components, travels along the surface outline of the lens, and ends at a coordinate point on the surface where the vertical height from the optical axis to the coordinate point is equivalent to ½ entrance pupil diameter; the arc length between the aforementioned two points is the outline curve length of the ½ entrance pupil diameter (HEP), and may be denoted as ARE. For example, the outline curve length of the ½ entrance pupil diameter (HEP) of the object side of the first lens may be denoted as ARE11. The outline curve length of the ½ entrance pupil diameter (HEP) of the image side of the first lens may be denoted as ARE12. The outline curve length of the ½ entrance pupil diameter (HEP) of the object side of the second lens may be denoted as ARE21. The outline curve length of the ½ entrance pupil diameter (HEP) of the image side of the second lens may be denoted as ARE22. The outline curve lengths of the ½ entrance pupil diameter (HEP) of any surface of the other lenses in the optical image capturing system with thin mounting components may be denoted according to the regular pattern shown above.

The Lens Parameter Related to the Surface Depth of the Lens

The distance paralleling the optical axis, which is measured from the intersection point where the object side of the sixth lens crosses the optical axis to the terminal point of the maximum effective half diameter of the object side of the sixth lens may be expressed as InRS61 (depth of the EHD).

The distance parallel to an optical axis, which is measured from the intersection point where the image side of the sixth lens crosses the optical axis to the terminal point of the maximum effective half diameter of the image side of the sixth lens may be expressed as InRS62 (depth of the EHD). The depths of the EHD (sinkage values) on the object side or the image side of other lens may be expressed in a similar way.

The Lens Parameter Related to the Shape of the Lens

The critical point C is a point which is tangential to the tangential plane being perpendicular to the optical axis on the specific surface of the lens except that an intersection point which crosses the optical axis on the specific surface of the lens. In addition to the description above, for example, the perpendicular distance between the critical point C51 on the object side of the fifth lens and the optical axis may be expressed as HVT51 (example). The perpendicular distance between a critical point C52 on the image side of the fifth lens and the optical axis may be expressed as HVT52 (example). The perpendicular distance between the critical point C61 on the object side of the sixth lens and the optical axis may be expressed as HVT61 (example). The perpendicular distance between a critical point C62 on the image side of the sixth lens and the optical axis may be expressed as HVT62 (example). The perpendicular distances between the critical point on the image side or object side of other lens and the optical axis may be expressed in the similar way.

The object side of the seventh lens has one inflection point IF711 which is the nearest to the optical axis, and the sinkage value of the inflection point IF711 may be denoted as SGI711 (instance). That is, SGI711 is a horizontal distance in parallel with the optical axis from an intersection point where the object side of the seventh lens crosses the optical axis to the inflection point nearest to the optical axis on the object side of the seventh lens. A perpendicular distance between the inflection point IF711 and the optical axis may be expressed as HIF711 (instance). The image side of the seventh lens has one inflection point IF721 which is nearest to the optical axis, and the sinkage value of the inflection point IF721 may be denoted as SGI721 (instance). That is, SGI721 is a horizontal distance in parallel with the optical axis from an intersection point where the image side of the seventh lens crosses the optical axis to the inflection point nearest to the optical axis on the image side of the seventh lens. A perpendicular distance between the inflection point IF721 and the optical axis may be expressed as HIF721 (instance).

The object side of the seventh lens has one inflection point IF712 which is the second nearest to the optical axis, and the sinkage value of the inflection point IF712 may be denoted as SGI712 (instance). That is, SGI712 is a horizontal distance in parallel with the optical axis from an intersection point where the object side of the seventh lens crosses the optical axis to the inflection point second nearest to the optical axis on the object side of the seventh lens. A perpendicular distance between the inflection point IF712 and the optical axis may be expressed as HIF712 (instance). The image side of the seventh lens has one inflection point IF722 which is the second nearest to the optical axis, and the sinkage value of the inflection point IF722 may be denoted as SGI722 (instance). That is, SGI722 is a horizontal distance in parallel with the optical axis from an intersection point where the image side of the seventh lens crosses the optical axis to the inflection point second nearest to the optical axis on the image side of the seventh lens. A perpendicular distance between the inflection point IF722 and the optical axis may be expressed as HIF722 (instance).

The object side of the seventh lens has one inflection point IF713 which is the third nearest to the optical axis, and the sinkage value of the inflection point IF713 may be denoted as SGI713 (instance). That is, SGI713 is a horizontal distance in parallel with the optical axis from an intersection point where the object side of the seventh lens crosses the optical axis to the inflection point third nearest to the optical axis on the object side of the seventh lens. A perpendicular distance between the inflection point IF713 and the optical axis may be expressed as HIF713 (instance). The image side of the seventh lens has one inflection point IF723 which is the third nearest to the optical axis, and the sinkage value of the inflection point IF723 may be denoted as SGI723 (instance). That is, SGI723 is a horizontal distance in parallel with the optical axis from an intersection point where the image side of the seventh lens crosses the optical axis to the inflection point third nearest to the optical axis on the image side of the seventh lens. The perpendicular distance between the inflection point IF723 and the optical axis may be expressed as HIF723 (instance).

The object side of the seventh lens has one inflection point IF714 which is the fourth nearest to the optical axis, and the sinkage value of the inflection point IF714 may be denoted as SGI714 (instance). That is, SGI714 is a horizontal distance in parallel with the optical axis from an intersection point where the object side of the seventh lens crosses the optical axis to the inflection point fourth nearest to the optical axis on the object side of the seventh lens. A perpendicular distance between the inflection point IF714 and the optical axis may be expressed as HIF714 (instance). The image side of the seventh lens has one inflection point IF724 which is the fourth nearest to the optical axis, and the sinkage value of the inflection point IF724 is denoted as SGI724 (instance). That is, SGI724 is a horizontal distance in parallel with the optical axis from an intersection point where the image side of the seventh lens crosses the optical axis to the inflection point fourth nearest to the optical axis on the image side of the seventh lens. The perpendicular distance between the inflection point IF724 and the optical axis may be expressed as HIF724 (instance).

An inflection point, a distance perpendicular to the optical axis between the inflection point and the optical axis, and a sinkage value thereof on the object side or image side of other lenses may be denoted according to the regular patterns shown above.

The Lens Parameter Related to the Aberration

The optical distortion for image formation in the optical image capturing system with thin mounting components may be expressed as ODT. TV distortion for image formation in the optical image capturing system with thin mounting components may be expressed as TDT. Furthermore, the degree of aberration offset can be further described within the limited range of 50% to 100% field of view of the formed image. The offset of the spherical aberration may be expressed as DFS. The offset of the coma aberration may be expressed as DFC.

The present invention provides an optical image capturing system with thin mounting components. The object side or the image side of the lens closest to the image plane of the optical image capturing system with thin mounting components may be provided with the inflection point which can adjust each angle of view incident on the sixth lens and conduct amendment for optical distortion and TV distortion.

The surface of the sixth lens may be provided with the function of preferable adjustment of the optical path so as to elevate the image quality.

In the present invention, an optical image capturing system with thin mounting components is provided, which comprises: an optical imaging lens set comprising at least two lenses having refractive power; an image plane; a first lens positioning element comprising a lens mount and a base plate, wherein the lens mount is hollow and opaque for shading the optical imaging lens set, the base plate is configured in a direction approaching the image plane for shading the image plane, a maximum of a smallest side length on a plane of a periphery of the base plate and perpendicular to an optical axis may be expressed as PhiD. The focal length of the optical imaging lens set may be expressed as f. The entrance pupil diameter of the optical imaging lens set may be expressed as HEP. The half maximum angle of view of the optical imaging lens set may be expressed as HAF. The following conditions are satisfied: $1.0 \leq f/HEP \leq 10.0$, 0 deg$<HAF \leq 150$ deg, and 0 mm$<PhiD \leq 18$ mm.

In the present invention, another optical image capturing system with thin mounting components is provided, which comprises: an optical imaging lens set comprising at least two lenses having refractive power; an image plane; a first lens positioning element, comprising a lens mount and a base plate, wherein the lens mount is hollow and opaque for shading the optical imaging lens set, the base plate is configured in a direction approaching the image plane for shading the image plane, a maximum of a smallest side length on a plane of a periphery of the base plate and perpendicular to an optical axis may be expressed as PhiD; and a second lens positioning element, accommodated in the lens mount and comprising a positioning portion, wherein the positioning portion is hollow for accommodating the optical imaging lens set so as to make the lenses arrange on the optical axis, an external side of the positioning portion does not contact inner sides of the lens mount, a maximum diameter on a plane of a periphery of an image side of the positioning portion and perpendicular to the optical axis may be expressed as PhiC. A focal length of the optical imaging lens set may be expressed as f. An entrance pupil diameter of the optical imaging lens set may be expressed as HEP. A half maximum angle of view of the optical imaging lens set may be expressed as HAF. A maximum thickness of a smallest side length of the base plate may be expressed as TH1 and a minimum thickness of the positioning portion may be expressed as TH2. The following conditions are satisfied: $1.0 \leq f/HEP \leq 10.0$, 0 deg$<HAF \leq 150$ deg, 0 mm$<PhiD \leq 18$ mm, and 0 mm$<TH1+TH2 \leq 1.5$ mm.

In the present invention, one more optical image capturing system with thin mounting components is provided, which comprises: an optical imaging lens set comprising at least two lenses having refractive power; an image plane; a first lens positioning element comprising a lens mount and a base plate, wherein the lens mount is hollow and opaque for shading the optical imaging lens set, the base plate is configured in a direction approaching the image plane for shading the image plane, a maximum of the smallest side length on a plane of the periphery of the base plate and perpendicular to an optical axis may be expressed as PhiD. A focal length of the optical imaging lens set may be expressed as f. An entrance pupil diameter of the optical imaging lens set may be expressed as HEP. A half maximum angle of view of the optical imaging lens set may be expressed as HAF. A maximum thickness of a smallest side length of the base seat may be expressed as TH1. The following conditions are satisfied: $1.05 \leq f/HEP \leq 10.0$, 0 deg$<HAF \leq 150$ deg, 0 mm$<PhiD \leq 18$ mm, and 0 mm$<TH1 \leq 0.3$ mm.

The length of the outline curve of any surface of single lens within the range of maximum effective half diameter affects the capability of correcting the surface aberration and the optical path difference between the rays at each field of view. Longer outline curve length elevates the capability for aberration correction, but simultaneously increases the difficulty of production as well. Thereby, the length of the outline curve of any surface of single lens within the range of the maximum effective half diameter has to be controlled, and especially, the proportional relationship (ARS/TP) between the length of the outline curve (ARS) of the surface within the range of the maximum effective half diameter and the thickness (TP) of the lens to which the surface belongs on the optical axis has to be controlled. For example, the length of the maximum effective half diameter outline curve of the object side of the first lens is denoted as ARS11, and the thickness of the first lens on the optical axis is TP1, wherein the ratio between ARS11 and TP1 is ARS11/TP1. The length of the maximum effective half diameter outline curve of the image side of the first lens is denoted as ARS12, and the ratio between the ARS12 and TP1 is ARS12/TP1. The length of the maximum effective half diameter outline curve of the object side of the second lens is denoted as ARS21, and the thickness of the second lens on the optical axis is TP2, wherein the ratio between ARS21 and TP2 is ARS21/TP2. The length of the maximum effective half diameter outline curve of the image side of the second lens is denoted as ARS22, wherein the ratio between ARS22 and TP2 is ARS22/TP2. The proportional relationships between the lengths of the maximum effective half diameter outline curve of any surface of the other lenses of the optical image capturing system with thin mounting components and the thicknesses (TP) of the other lenses to which the surfaces belong on the optical axis are denoted according to the regular pattern shown above.

The outline curve length within a range of ½ entrance pupil diameter height (HEP) of any surface of single lens especially affects the capability of correcting the aberration in the shared region of each field of view on the surface and correcting the optical path difference between the rays at each field of view. Longer outline curve length elevates the capability for aberration correction, but simultaneously increases the difficulty of production as well. Therefore, the outline curve length within a range of ½ entrance pupil diameter height (HEP) of any surface of single lens has to be controlled, and especially, the proportional relationship between the outline curve length within a range of ½ entrance pupil diameter height (HEP) of any surface of single lens and the thickness (TP) to which the surface belongs on the optical axis has to be controlled. For example, the outline curve length of the ½ entrance pupil diameter height (HEP) of the object side of the first lens may be denoted as ARE11, and the thickness of the first lens on the optical axis may be expressed as TP1, wherein the ratio between ARE11 and TP1 may be expressed as ARE11/TP1. The outline curve length of the ½ entrance pupil diameter height (HEP) of the image side of the first lens may be denoted as ARE12, wherein the ratio of the ARE12 to TP1 may be expressed as ARE12/TP1. The outline curve length of the ½ entrance pupil diameter height (HEP) of the object side of the second lens may be denoted as ARE21, and the thickness of the second lens on the optical axis is TP2, wherein the ratio between ARE21 and TP2 may be expressed as ARE21/TP2. The outline curve length of the ½ entrance pupil diameter height (HEP) of the image side of the second lens may be denoted as ARE22, wherein the ratio of the ARE22 to TP2 may be expressed as ARE22/TP2. The proportional relationships between the outline curve lengths of the ½ entrance pupil diameter height (HEP) on any surface of the other lenses of the optical image capturing system with thin mounting components and the thicknesses (TP) on the optical axis of the other lenses to which the surfaces belong are denoted according to the regular pattern shown above.

BRIEF DESCRIPTION OF THE DRAWINGS

The detailed structure, operating principle and effects of the present invention will be described in more details hereinafter with reference to the accompanying drawings that show various embodiments of the present invention as follows.

FIG. 7H shows a schematic view of the optical image capturing system with thin mounting components of the present invention applied to an extreme sport imaging device;

DETAILED DESCRIPTION OF THE PREFERRED EMBODIMENTS

Figure 1A:
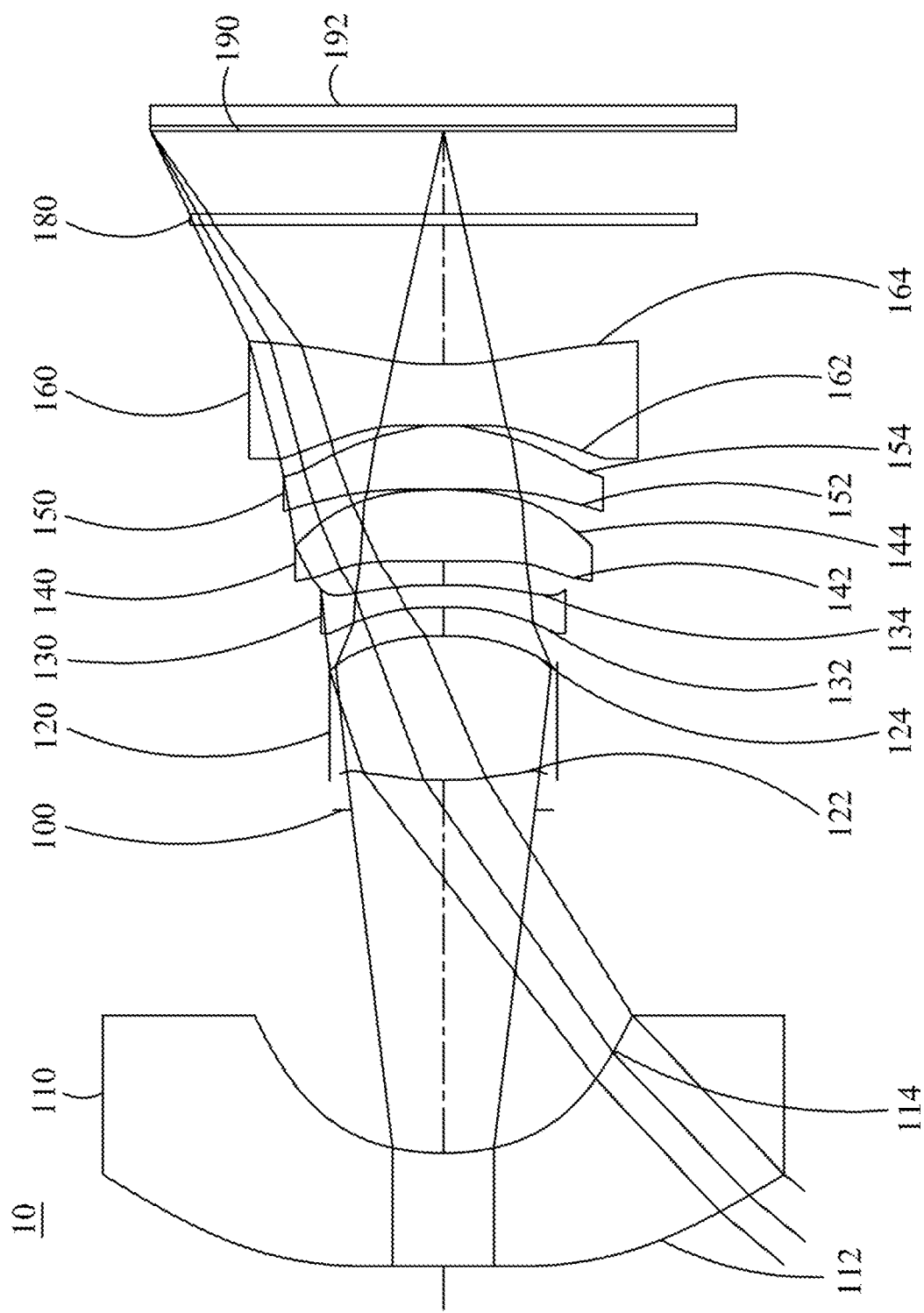
FIG. 1A is a schematic diagram of an optical image capturing system with thin mounting components of a first embodiment of the present invention.

The optical image capturing system with thin mounting components may use three sets of operation wavelengths, which are respectively 486.1 nm, 587.5 nm and 656.2 nm, and 587.5 nm is served as the primary reference wavelength and is a reference wavelength from which to obtain technical features. The optical image capturing system with thin mounting components may also use five sets of wavelengths which are respectively 470 nm, 510 nm, 555 nm, 610 nm and 650 nm, and 555 nm is served as the primary reference wavelength and is a reference wavelength from which to obtain technical features.

The ratio of the focal length f of the optical image capturing system with thin mounting components to a focal length fp of each lens with positive refractive power may be expressed as PPR. The ratio of the focal length f of the optical image capturing system with thin mounting components to a focal length fn of each lens with negative refractive power may be expressed as NPR. The sum of the PPR of all lenses with positive refractive powers may be expressed as ΣPPR. The sum of the NPR of all lenses with negative refractive powers may be expressed as ΣNPR. The total refractive power and the total length of the optical image capturing system with thin mounting components can be controlled easily when meeting following conditions: $0.5 \leq \Sigma PPR/|\Sigma NPR| \leq 15$. Preferably, the following condition may be satisfied: $1 \leq \Sigma PPR/|\Sigma NPR| \leq 3.0$.

The optical image capturing system with thin mounting components may further include an image sensing device which is disposed on an image plane. The half diagonal of an effective detection field of the image sensing device (i.e. the imaging height or the maximum image height of the optical image capturing system with thin mounting components) may be expressed as HOI. The distance on the optical axis from the object side of the first lens to the image plane may be expressed as HOS. The following conditions are met: $HOS/HOI \leq 50$ and $0.5 \leq HOS/f \leq 150$. Preferably, the following conditions may be satisfied: $1 \leq HOS/HOI \leq 40$ and $1 \leq HOS/f \leq 140$. Hereby, the configuration can keep the miniaturization of the optical image capturing system with thin mounting components to collocate with light and thin portable electronic products.

In addition, in the optical image capturing system with thin mounting components of the present invention, according to different requirements, at least one aperture may be arranged to reduce stray light and this configuration is helpful to elevate the image quality.

In the optical image capturing system with thin mounting components of the present invention, the aperture may be a front or middle aperture. Wherein, the front aperture is the aperture disposed between a photographed object and the first lens, while the middle aperture is the aperture disposed between the first lens and the image plane. In the case that the aperture is the front aperture, it can allow the optical image capturing system with thin mounting components to generate a longer distance between the exit pupil and the image plane thereof, such that the optical image capturing system with thin mounting components can accommodate more optical elements and the efficiency about receiving image of the image sensing device can be increased. In the case that the aperture is the middle aperture, it is helpful to expand the angle of view of the optical image capturing system with thin mounting components, such that the optical image capturing system with thin mounting components has an advantage of a wide angle camera lens. The distance from the foregoing aperture to the image plane may be expressed as InS. The following condition is met: $0.2 \leq InS/HOS \leq 1.1$. Therefore, this configuration can allow the miniaturization of the optical image capturing system with thin mounting components as well as the characteristics of wide angle of view at the same time.

In the optical image capturing system with thin mounting components of the present invention, the distance from the object side of the first lens to the image side of the sixth lens may be expressed as InTL. The sum of the thicknesses of all lenses with refractive power on the optical axis may be expressed as ΣTP. The following condition is satisfied: $0.1 \leq \Sigma TP/InTL \leq 0.9$. Therefore, the configuration can maintain the contrast ratio of the optical image capturing system with thin mounting components and the yield rate regarding lens manufacturing at the same time, as well as provide the proper back focal length to accommodate other elements.

The curvature radius of the object side of the first lens may be expressed as R1. The curvature radius of the image side of the first lens may be expressed as R2. The following condition is met: $0.001 \leq |R1/R2| \leq 25$. Therefore, the first lens may have a suitable magnitude of positive refractive power, so as to prevent the spherical aberration from increasing too much. Preferably, the following condition may be satisfied: $0.01 \leq |R1/R2| < 12$.

The curvature radius of the object side of the sixth lens may be expressed as R11. The curvature radius of the image side of the sixth lens may be expressed as R12. The following condition is satisfied: $-7 < (R11-R12)/(R11+R12) < 50$. Hereby, this configuration is beneficial to the correction of the astigmatism generated by the optical image capturing system with thin mounting components.

The distance on the optical axis between the first lens and the second lens may be expressed as IN12. The following condition is satisfied: $IN12/f \leq 60$. This configuration is helpful to improve the chromatic aberration of the lens in order to elevate the performance of the lenses.

The distance of the optical axis between the fifth lens and the sixth lens may be expressed as IN56. The following condition is satisfied: $IN56/f \leq 3.0$. This configuration is helpful to improve the chromatic aberration of the lens in order to elevate the performance of the lenses.

The thicknesses of the first lens and the second lens on the optical axis may be expressed as TP1 and TP2, respectively. The following condition is satisfied: $0.1 \leq (TP1+IN12)/TP2 \leq 10$. This configuration is helpful in controlling the sensitivity generated by the optical image capturing system with thin mounting components and improves its performance.

The thicknesses of the fifth lens and the sixth lens on the optical axis may be expressed as TP5 and TP6, respectively, and the distance between the foregoing two lens on the optical axis may be expressed as IN56. The following condition is met: $0.1 \leq (TP6+IN56)/TP5 \leq 15$. This configuration is helpful to control the sensitivity generated by the optical image capturing system with thin mounting components and decrease the total height of the optical image capturing system with thin mounting components.

The thicknesses of the third lens, the fourth lens and the fifth lens on the optical axis may be expressed as TP3, TP4 and TP5, respectively. The distance of the optical axis between the third lens and the fourth lens may be expressed as IN34. The distance on the optical axis between the fourth lens and the fifth lens may be expressed as IN45. The distance between the object side of the first lens and the image side of the lens closest to the image plane may be expressed as InTL. The following condition is satisfied: $0.1 \leq TP4/(IN34+TP4+IN45) < 1$. Therefore, this configuration is helpful to slightly correct the aberration of the propagating process of the incident light layer by layer, and decrease the total height of the optical image capturing system with thin mounting components.

In the optical image capturing system with thin mounting components of the present invention, the perpendicular distance between a critical point C61 on an object side of the sixth lens and the optical axis may be expressed as HVT61. A perpendicular distance between a critical point C62 on an image side of the sixth lens and the optical axis may be expressed as HVT62. A horizontal distance on the optical axis from an intersection point where the object side of the sixth lens crosses the optical axis to the critical point C61 may be expressed as SGC61. A horizontal distance on the optical axis from an intersection point where the image side of the sixth lens crosses the optical axis to the critical point C62 may be expressed as SGC62. The following conditions may be satisfied: 0 mm≤HVT61≤3 mm; 0 mm<HVT62≤6 mm; 0≤HVT61/HVT62; 0 mm≤|SGC61|≤0.5 mm; 0 mm<|SGC62|≤2 mm, and 0<|SGC62|/(|SGC62|+TP6)≤0.9. Therefore, this configuration is helpful to correct the off-axis aberration effectively.

The optical image capturing system with thin mounting components of the present invention meets the following condition: 0.2≤HVT62/HOI≤0.9. Preferably, the following condition may be met: 0.3≤HVT62/HOI≤0.8. This configuration is helpful to correct the aberration of surrounding field of view for the optical image capturing system with thin mounting components.

The optical image capturing system with thin mounting components of the present invention meets the following condition: 0≤HVT62/HOS≤0.5. Preferably, the following condition may be satisfied: 0.2≤HVT62/HOS≤0.45. This configuration is helpful to correct the aberration for the surrounding field of view for the optical image capturing system with thin mounting components.

In the optical image capturing system with thin mounting components of the present invention, the horizontal distance in parallel with an optical axis from an inflection point on the object side of the sixth lens that is nearest to the optical axis to an intersection point where the object side of the sixth lens crosses the optical axis may be expressed as expressed as SGI611. The horizontal distance in parallel with an optical axis from an inflection point on the image side of the sixth lens that is nearest to the optical axis to an intersection point where the image side of the sixth lens crosses the optical axis may be expressed as SGI621. The following conditions are satisfied: 0<SGI611/(SGI611+TP6)≤0.9 and 0<SGI621/(SGI621+TP6)≤0.9. Preferably, the following conditions may be met: 0.1≤SGI611/(SGI611+TP6)≤0.6 and 0.1≤SGI621/(SGI621+TP6)≤0.6.

The distance in parallel with the optical axis from an inflection point on the object side of the sixth lens that is second nearest to the optical axis to an intersection point where the object side of the sixth lens crosses the optical axis may be expressed as SGI612. The distance in parallel with the optical axis from an inflection point on the image side of the sixth lens that is second nearest to the optical axis to an intersection point where the image side of the sixth lens crosses the optical axis may be expressed as SGI622. The following conditions are satisfied: 0<SGI612/(SGI612+TP6)≤0.9 and 0<SGI622/(SGI622+TP6)≤0.9. Preferably, the following conditions may be satisfied: 0.1≤SGI612/(SGI612+TP6)≤0.6 and 0.1≤SGI622/(SGI622+TP6)≤0.6.

The perpendicular distance between the inflection point on the object side of the sixth lens that is the nearest to the optical axis and the optical axis may be expressed as HIF611. The distance perpendicular to the optical axis between an intersection point where the image side of the sixth lens crosses the optical axis and an inflection point on the image side of the sixth lens that is the nearest to the optical axis may be expressed as HIF621. The following conditions are met: 0.001 mm≤|HIF611|≤5 mm and 0.001 mm≤|HIF621|≤5 mm. Preferably, the following conditions may be satisfied: 0.1 mm≤|HIF611|≤3.5 mm and 1.5 mm≤|HIF621|≤3.5 mm.

The perpendicular distance between the inflection point on the object side of the sixth lens that is second nearest to the optical axis and the optical axis may expressed as HIF612. The distance perpendicular to the optical axis between an intersection point where the image side of the sixth lens crosses the optical axis and an inflection point on the image side of the sixth lens that is second nearest to the optical axis may be expressed as HIF622. The following conditions are satisfied: 0.001 mm≤|HIF612|≤5 mm and 0.001 mm≤|HIF622|≤5 mm. Preferably, the following conditions may be satisfied: 0.1 mm≤|HIF622|≤3.5 mm and 0.1 mm≤|HIF612|≤3.5 mm.

The perpendicular distance between the inflection point on the object side of the sixth lens that is third nearest to the optical axis and the optical axis may be expressed as HIF613. The distance perpendicular to the optical axis between an intersection point where the image side of the sixth lens crosses the optical axis and an inflection point on the image side of the sixth lens that is third nearest to the optical axis may be expressed as HIF623. The following conditions are satisfied: 0.001 mm≤|HIF613|≤5 mm and 0.001 mm≤|HIF623|≤5 mm. Preferably, the following conditions may be satisfied: 0.1 mm≤|HIF623|≤3.5 mm and 0.1 mm≤|HIF613|≤3.5 mm.

The perpendicular distance between the inflection point on the object side of the sixth lens that is fourth nearest to the optical axis and the optical axis may be expressed as HIF614. The distance perpendicular to the optical axis between an intersection point where the image side of the sixth lens crosses the optical axis and an inflection point on the image side of the sixth lens that is fourth nearest to the optical axis may be expressed as HIF624. The following conditions are satisfied: 0.001 mm≤|HIF614|≤5 mm and 0.001 mm≤|HIF624|≤5 mm. Preferably, the following conditions may be satisfied: 0.1 mm≤|HIF624|≤3.5 mm and 0.1 mm≤|HIF614|≤3.5 mm.

In the optical image capturing system with thin mounting components of present invention, PhiA meets the following condition: 0 mm<PhiA≤17.4 mm, and preferably, PhiA may meet the following condition: 0 mm<PhiA≤13.5 mm; PhiC meets the following condition: 0 mm<PhiC≤17.7 mm, and preferably, PhiC may meet the following condition: 0 mm<PhiC≤14 mm; PhiD meets the following condition: 0 mm<PhiD≤18 mm, and preferably, PhiD may meet the following condition: 0 mm<PhiD≤15 mm; TH1 meets the following condition: 0 mm<TH1≤5 mm, or preferably, TH1 may meet the following condition: 0 mm<TH1≤0.5 mm; TH2 meets the following condition: 0 mm<TH2≤5 mm, and preferably, TH2 may meet the following condition: 0 mm<TH2≤0.5 mm; PhiA/PhiD meets the following condition: 0<PhiA/PhiD≤0.99, and preferably, PhiA/PhiD may meet the following condition: 0<PhiA/PhiD≤0.97; TH1+TH2 meets the following condition: 0 mm<TH1+TH2≤10 mm, and preferably, TH1+TH2 may meet the following condition: 0 mm<TH1+TH2≤1.5 mm; (TH1+TH2)/HOI meets the following condition: 0<(TH1+TH2)/HOI≤0.95, and preferably, (TH1+TH2)/HOI may meet the following condition: 0<(TH1+TH2)/HOI≤0.5; (TH1+TH2)/HOS meets the following condition: 0<(TH1+TH2)/HOS≤0.95, and preferably, (TH1+TH2)/HOS may meet the following condition: 0<(TH1+TH2)/HOS≤0.5; (TH1+TH2)/PhiA meets a condition as follows: 0<(TH1+TH2)/PhiA≤0.95, and preferably, (TH1+TH2)/PhiA may meet a condition as follows: 0<(TH1+TH2)/PhiA≤0.5.

In one implementation method of the optical image capturing system with thin mounting components of the present invention, it can be helpful to correct the chromatic aberration of the optical image capturing system with thin mounting by arranging the lenses with a high coefficient of dispersion and a low coefficient of dispersion in an interlaced manner.

The Aspheric equation for the lens can be represented by:

$$z=ch^2/[1+[1*(k+1)c^2h^2]0.5]+A4h^4+A6h^6+A8h^8+A10h^{10}+A12h^{12}+A14h^{14}+A16h^{16}+A18h^{18}+A20h^{20}+\ldots \quad (1),$$

wherein z is a position value of the position along the optical axis and at the height h which refers to the surface apex; k is the cone coefficient, c is the reciprocal of curvature radius, and A4, A6, A8, A10, A12, A14, A16, A18, and A20 are high order aspheric coefficients.

In the optical image capturing system with thin mounting components provided by the present invention, the lens may be made of glass or plastic material. If the lens is made of plastic material, it can reduce the cost of manufacturing as well as the weight of the lens effectively. If lens is made of glass, it can control the heat effect and increase the design space of the configuration of the lens with refractive powers in the optical image capturing system with thin mounting components. The object side and the image side of the first lens through seventh lens in the optical image capturing system with thin mounting components may be aspheric, which can gain more control variables and even reduce the number of the used lens in contrast to traditional glass lenses in addition to the use of reducing the aberration. Thus, the total height of the optical image capturing system with thin mounting components can be reduced effectively.

Furthermore, in the optical image capturing system with thin mounting components provided by the present disclosure, when the surface of lens is a convex surface, the surface of that lens is basically a convex surface in the vicinity of the optical axis. When the surface of lens is a concave surface, the surface of that lens is basically a concave surface in the vicinity of the optical axis.

The optical image capturing system with thin mounting components of the present invention can be applied to the optical image capturing system with automatic focus based on the demand and have the characters of a good aberration correction and a good image quality. Thereby, the optical image capturing system can expand the application aspect.

The optical image capturing system with thin mounting components of the present invention can further include a driving module based on the demand. The driving module may be coupled with the lens and enable the movement of the lens. The foregoing driving module may be the voice coil motor (VCM) which is applied to move the lens to focus, or may be the optical image stabilization (OIS) which is applied to reduce the frequency which lead to the out focus due to the vibration of the camera lens in the process of the photographing.

In the optical image capturing system with thin mounting components of the present invention, at least one lens among the first lens, second lens, third lens, fourth lens, fifth lens, sixth lens and seventh lens may further be a light filtering element for light with wavelength of less than 500 nm based on the demands of the product. The light filtering element may be achieved by coating film on at least one surface of that lens with certain filtering function, or forming that lens with material that can filter light with short wavelength.

The image plane of the optical image capturing system with thin mounting components of the present invention may be a plane or a curved surface based on the demands of the product. When the image plane is a curved surface (e.g. a spherical surface with curvature radius), it is helpful to decrease the required incident angle that makes the rays focus on the image plane. In addition to the aid of the miniaturization of the length of the optical image capturing system with thin mounting components (TTL), it is helpful to elevate the relative illumination at the same time.

According to the foregoing implementation method, the specific embodiments with figures are presented in detail as below.

The First Embodiment

Figure 1B:
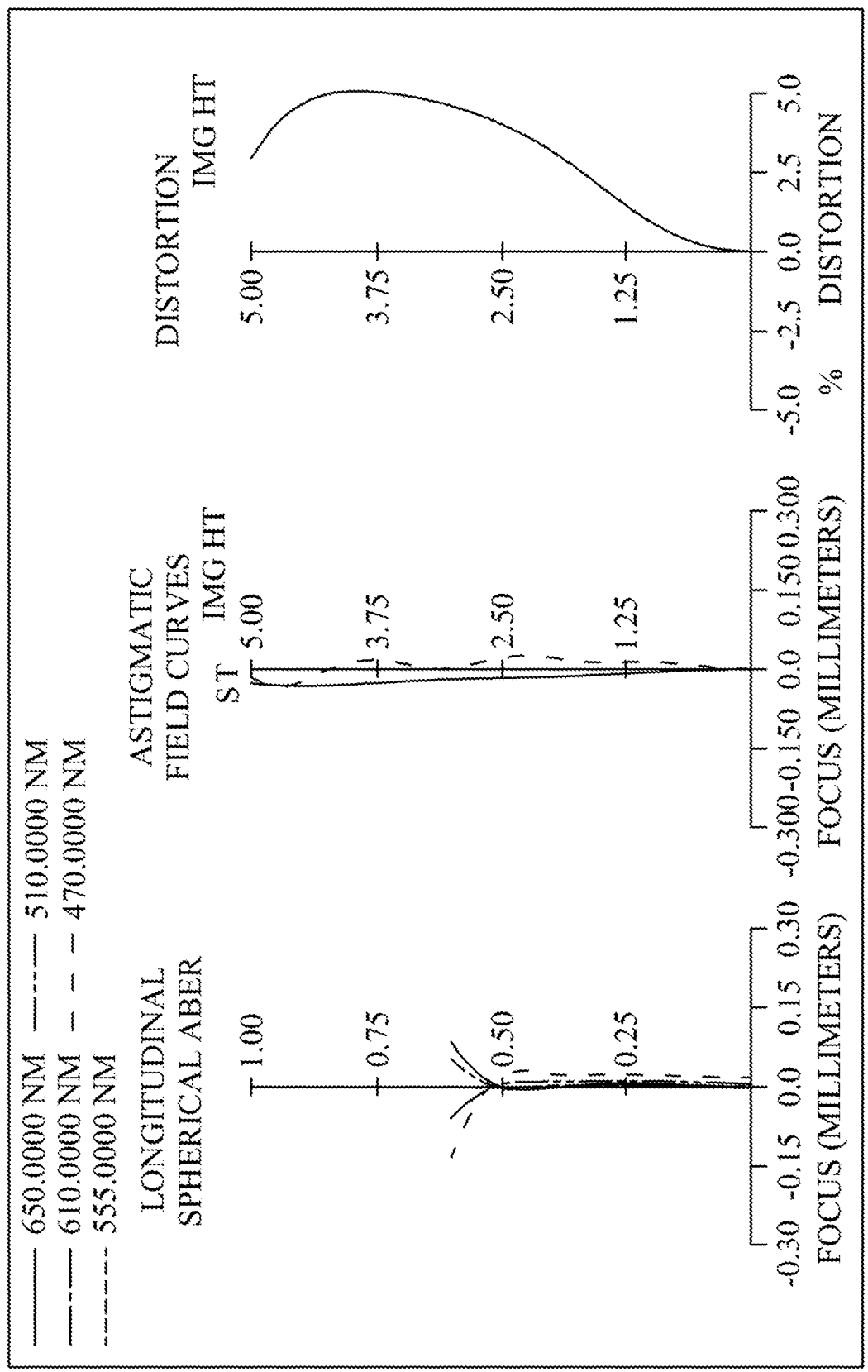
FIG. 1B shows curve diagrams of longitudinal spherical aberration, astigmatic field, and optical distortion of the optical image capturing system with thin mounting components of the first embodiment of the present invention in the order from left to right.
Figure 1C:
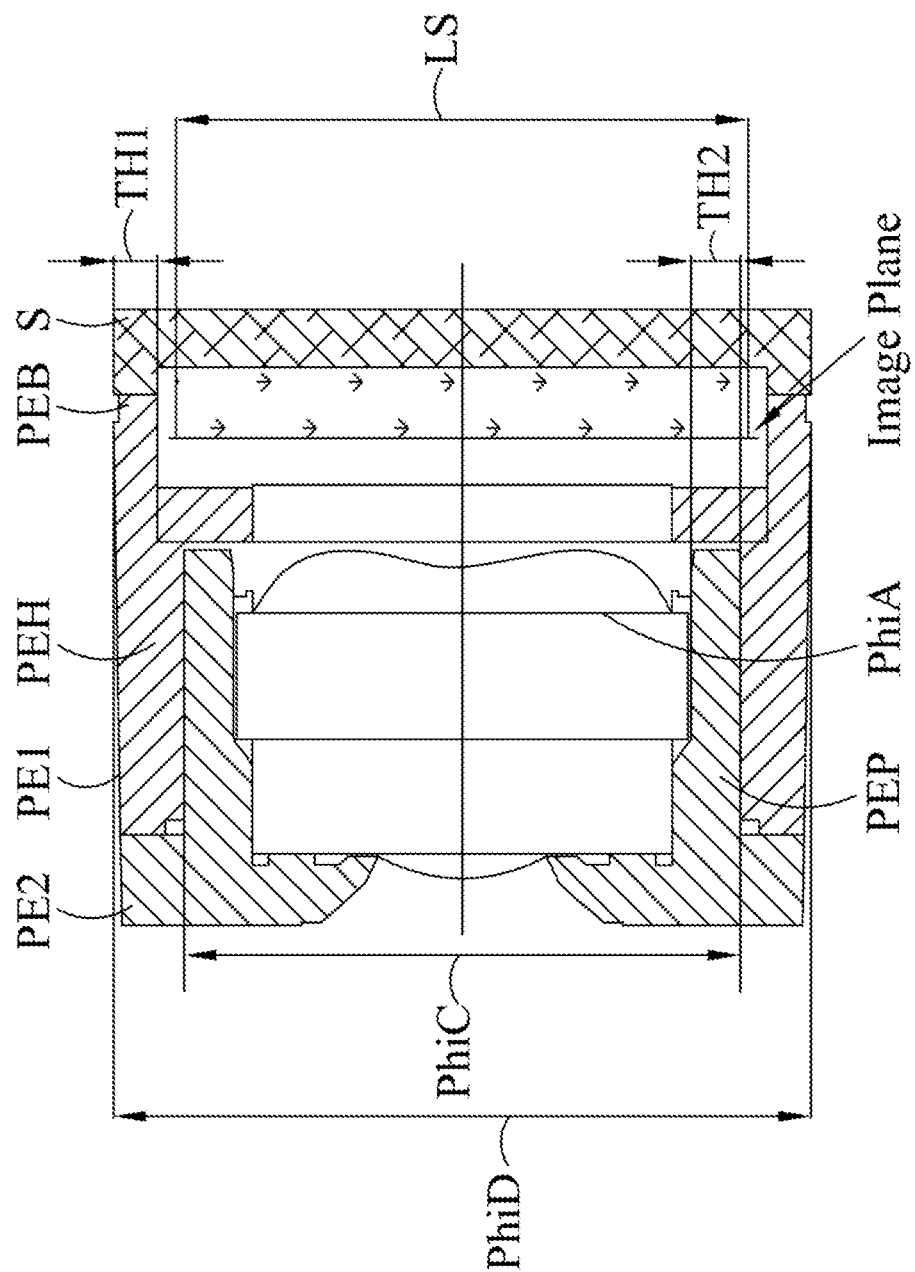
FIG. 1C is a schematic diagram depicting an assembly of a first lens positioning element and a second lens positioning element of an optical image capturing system with thin mounting components of the first embodiment of the present invention.

Please refer to FIG. 1A and FIG. 1B, wherein FIG. 1A is a schematic view of the optical imaging lens set of optical image capturing system with thin mounting components according to the first embodiment of the present invention and FIG. 1B shows the longitudinal spherical aberration curves, astigmatic field curves, and optical distortion curve of the optical image capturing system with thin mounting components of the first embodiment of the present invention in order from left to right. FIG. 1C is a schematic diagram depicting an assembly of a first lens positioning element and a second lens positioning element of the optical image capturing system with thin mounting components of the first embodiment of the present invention.

As shown in FIG. 1A, in order from an object side to an image side, the optical image capturing system with thin mounting components 10 includes a first lens 110, an aperture 100, a second lens 120, a third lens 130, a fourth lens 140, a fifth lens 150, a sixth lens 160, an infrared filter 180, an image plane 190, and an image sensing device 192.

The first lens 110 has negative refractive power and is made of plastic material. An object side 112 of the first lens 110 is a concave surface and an image side 114 of the first lens 110 is a concave surface, and both the object side 112 and the image side 114 of the first lens 110 are aspheric. The object side 112 of the first lens 110 has two inflection points. The length of the maximum effective half diameter outline curve of the object side of the first lens may be denoted as ARS11, and the length of the maximum effective half diameter outline curve of the image side of the first lens may be denoted as ARS12. The outline curve length of the ½ entrance pupil diameter (HEP) of the object side of the first lens may be denoted as ARE11, and the outline curve length of the ½ entrance pupil diameter (HEP) of the image side of the first lens may be denoted as ARE12. The thickness of the first lens on the optical axis may be denoted as TP1.

The horizontal distance parallel to the optical axis from an inflection point on the object side of the first lens which is nearest to the optical axis to an intersection point where the object side of the first lens crosses the optical axis may be expressed as SGI111. The horizontal distance paralleling the optical axis from an inflection point on the image side of the first lens which is nearest to the optical axis to an intersection point where the image side of the first lens crosses the optical axis may be expressed as SGI121. The following conditions are met: SGI111=−0.0031 mm, and |SGI111|/(|SGI111|+TP1)=0.0016.

The horizontal distance in parallel with the optical axis from an inflection point on the object side of the first lens that is second nearest to the optical axis to an intersection point where the object side of the first lens crosses the optical axis may be expressed as SGI112. The horizontal distance in parallel with the optical axis from an inflection point on the image side of the first lens that is second nearest to the optical axis to an intersection point where the image side of the first lens crosses the optical axis may be expressed as SGI1122. The following conditions are met: SGI112=1.3178 mm and |SGI112|/(|SGI112|+TP1)=0.4052.

The perpendicular distance from the inflection point on the object side of the first lens that is nearest to the optical axis to an optical axis may be expressed as HIF111. The distance perpendicular to the optical axis from the inflection point on the image side of the first lens that is nearest to the optical axis to an intersection point where the image side of the first lens crosses the optical axis may be expressed as HIF121. The following conditions are met: HIF111=0.5557 mm and HIF111/HOI=0.1111.

The perpendicular distance from the inflection point on the object side of the first lens that is second nearest to the optical axis to an optical axis may be expressed as HIF112. The distance perpendicular to the optical axis from the inflection point on the image side of the first lens that is second nearest to the optical axis to an intersection point where the image side of the first lens crosses the optical axis may be expressed as HIF122. The following conditions are met: HIF112=5.3732 mm and HIF112/HOI=1.0746.

The second lens 120 has positive refractive power and is made of plastic material. An object side 122 of the second lens 120 is a convex surface and an image side 124 of the second lens 120 is a convex surface, and both the object side 122 and the image side 124 of the second lens 120 are aspheric. The object side 122 of the second lens 120 has one inflection point. The length of the maximum effective half diameter outline curve of the object side of the second lens may be denoted as ARS21, and the length of the maximum effective half diameter outline curve of the image side of the second lens may be denoted as ARS22. The outline curve length of the ½ entrance pupil diameter (HEP) of the object side of the second lens may be denoted as ARE21, and the outline curve length of the ½ entrance pupil diameter (HEP) of the image side of the second lens may be denoted as ARE22. The thickness of the second lens on the optical axis may be denoted as TP2.

The horizontal distance in parallel with the optical axis from an inflection point on the object side of the second lens that is nearest to the optical axis to the intersection point where the object side of the second lens crosses the optical axis may be expressed as SGI211. The horizontal distance in parallel with the optical axis from an inflection point on the image side of the second lens that is nearest to the optical axis to the intersection point where the image side of the second lens crosses the optical axis may be expressed as SGI221. The following conditions are met: SGI211=0.1069 mm, |SGI211|/(|SGI211|+TP2)=0.0412, SGI221=0 mm and |SGI221|/(|SGI221|+TP2)=0.

The perpendicular distance from the inflection point on the object side of the second lens that is nearest to the optical axis to the optical axis may be expressed as HIF211. The distance perpendicular to the optical axis from the inflection point on the image side of the second lens that is nearest to the optical axis to the intersection point where the image side of the second lens crosses the optical axis may be expressed as HIF221. The following conditions are met: HIF211=1.1264 mm, HIF211/HOI=0.2253, HIF221=0 mm and HIF221/HOI=0.

The third lens 130 has negative refractive power and is made of plastic material. An object side 132 of the third lens 130 is a concave surface and an image side 134 of the third lens 130 is a convex surface, and both the object side 132 and the image side 134 of the third lens 130 are aspheric. The object side 132 and the image side 134 of the third lens 130 both have one inflection point. The length of the maximum effective half diameter outline curve of the object side of the third lens may be denoted as ARS31, and the length of the maximum effective half diameter outline curve of the image side of the third lens may be denoted as ARS32. The outline curve length of the ½ entrance pupil diameter (HEP) of the object side of the third lens may be denoted as ARE31, and the outline curve length of the ½ entrance pupil diameter (HEP) of the image side of the third lens may be denoted as ARE32. The thickness of the third lens on the optical axis may be denoted as TP3.

The horizontal distance in parallel with the optical axis from an inflection point on the object side of the third lens that is nearest to the optical axis to an intersection point where the object side of the third lens crosses the optical axis may be expressed as SGI311. The horizontal distance in parallel with the optical axis from an inflection point on the image side of the third lens that is nearest to the optical axis to an intersection point where the image side of the third lens crosses the optical axis may be expressed as SGI321. The following conditions are satisfied: SGI311=−0.3041 mm, |SGI311|/(|SGI311|+TP3)=0.4445, SGI321=−0.1172 mm and |SGI321|/(|SGI321|+TP3)=0.2357.

The perpendicular distance between the inflection point on the object side of the third lens that is nearest to the optical axis and the optical axis may be expressed as HIF311. The distance perpendicular to the optical axis between the inflection point on the image side of the third lens that is nearest to the optical axis and the intersection point where the image side of the third lens crosses the optical axis may be expressed as HIF321. The following conditions are satisfied: HIF311=1.5907 mm, HIF311/HOI=0.3181, HIF321=1.3380 mm and HIF321/HOI=0.2676.

The fourth lens 140 has positive refractive power and is made of a plastic material. An object side 142 of the fourth lens 140 is a convex surface and an image side of the fourth lens 140 is a concave surface, and both the object side 142 and the image side 144 of the fourth lens 140 are aspheric. The object side 142 of the fourth lens 140 has two inflection points, and the image side 144 of the fourth lens 140 has one inflection point. The length of the maximum effective half diameter outline curve of the object side of the fourth lens may be denoted as ARS41, and the length of the maximum effective half diameter outline curve of the image side of the fourth lens may be denoted as ARS42. The outline curve length of the ½ entrance pupil diameter (HEP) of the object side of the fourth lens may be denoted as ARE41, and the outline curve length of the ½ entrance pupil diameter (HEP) of the image side of the fourth lens may be denoted as ARE42. The thickness of the fourth lens on the optical axis may be denoted as TP4.

The horizontal distance in parallel with the optical axis from an inflection point on the object side of the fourth lens that is nearest to the optical axis to the intersection point where the object side of the fourth lens crosses the optical axis may be expressed as SGI411. The horizontal distance in parallel with the optical axis from an inflection point on the image side of the fourth lens that is nearest to the optical axis to the intersection point where the image side of the fourth lens crosses the optical axis may be expressed as SGI421. The following conditions are satisfied: SGI411=0.0070 mm,

|SGI411|/(|SGI411|+TP4)=0.0056, SGI421=0.0006 mm and |SGI421|/(|SGI421|+TP4)=0.0005.

The horizontal distance in parallel with the optical axis from an inflection point on the object side of the fourth lens that is second nearest to the optical axis to the intersection point where the object side of the fourth lens crosses the optical axis may be expressed as SGI412. The horizontal distance in parallel with the optical axis from an inflection point on the image side of the fourth lens that is second nearest to the optical axis to the intersection point where the image side of the fourth lens crosses the optical axis may be expressed as SGI422. The following conditions are satisfied: SGI412=−0.2078 mm and |SGI412|/(|SGI412|+TP4)=0.1439.

The perpendicular distance between the inflection point on the object side of the fourth lens that is nearest to the optical axis and the optical axis may be expressed as HIF411. The distance perpendicular to the optical axis between the inflection point on the image side of the fourth lens that is nearest to the optical axis and the intersection point where the image side of the fourth lens crosses the optical axis may be expressed as HIF421. The following conditions are satisfied: HIF411=0.4706 mm, HIF411/HOI=0.0941, HIF421=0.1721 mm and HIF421/HOI=0.0344.

The perpendicular distance between the inflection point on the object side of the fourth lens that is second nearest to the optical axis and the optical axis may be expressed as HIF412. The distance perpendicular to the optical axis between the inflection point on the image side of the fourth lens that is second nearest to the optical axis and the intersection point where the image side of the fourth lens crosses the optical axis may be expressed as HIF422. The following conditions are satisfied: HIF412=2.0421 mm and HIF412/HOI=0.4084.

The fifth lens 150 has positive refractive power and is made of a plastic material. An object side 152 of the fifth lens 150 is a concave surface and an image side 154 of the fifth lens 150 is a convex surface, and both the object side 152 and the image side 154 of the fifth lens 150 are aspheric. The object side 152 of the fifth lens 150 has two inflection points and the image side 154 of the fifth lens 150 has one inflection point. The length of the maximum effective half diameter outline curve of the object side of the fifth lens may be denoted as ARS51, and the length of the maximum effective half diameter outline curve of the image side of the fifth lens may be denoted as ARS52. The outline curve length of the ½ entrance pupil diameter (HEP) of the object side of the fifth lens may be denoted as ARE51, and the outline curve length of the ½ entrance pupil diameter (HEP) of the image side of the fifth lens may be denoted as ARE52. The thickness of the fifth lens on the optical axis may be denoted as TP5.

The horizontal distance in parallel with the optical axis from an inflection point on the object side of the fifth lens that is nearest to the optical axis to the intersection point where the object side of the fifth lens crosses the optical axis may be expressed as SGI511. The horizontal distance in parallel with the optical axis from an inflection point on the image side of the fifth lens that is nearest to the optical axis to the intersection point where the image side of the fifth lens crosses the optical axis may be expressed as SGI521. The following conditions are satisfied: SGI511=0.00364 mm, |SGI511|/(|SGI511|+TP5)=0.00338, SGI521=−0.63365 mm and |SGI521|/(|SGI521|+TP5)=0.37154.

The horizontal distance in parallel with the optical axis from an inflection point on the object side of the fifth lens that is second nearest to the optical axis to the intersection point where the object side of the fifth lens crosses the optical axis may be expressed as SGI512. The horizontal distance in parallel with the optical axis from an inflection point on the image side of the fifth lens that is second nearest to the optical axis to the intersection point where the image side of the fifth lens crosses the optical axis may be expressed as SGI522. The following conditions are satisfied: SGI512=−0.32032 mm and |SGI512|/(|SGI512|+TP5)=0.23009.

The horizontal distance in parallel with the optical axis from an inflection point on the object side of the fifth lens that is third nearest to the optical axis to the intersection point where the object side of the fifth lens crosses the optical axis may be expressed as SGI513. The horizontal distance in parallel with the optical axis from an inflection point on the image side of the fifth lens that is third nearest to the optical axis to the intersection point where the image side of the fifth lens crosses the optical axis may be expressed as SGI523. The following conditions are satisfied: SGI513=0 mm, |SGI513|/(|SGI513|+TP5)=0, SGI523=0 mm and |SGI523|/(|SGI523|+TP5)=0.

The horizontal distance in parallel with the optical axis from an inflection point on the object side of the fifth lens that is fourth nearest to the optical axis to the intersection point where the object side of the fifth lens crosses the optical axis may be expressed as SGI514. The horizontal distance in parallel with the optical axis from an inflection point on the image side of the fifth lens that is fourth nearest to the optical axis to the intersection point where the image side of the fifth lens crosses the optical axis may be expressed as SGI524. The following conditions are satisfied: SGI514=0 mm, |SGI514|/(|SGI514|+TP5)=0, SGI524=0 mm and |SGI524|/(|SGI524|+TP5)=0.

The perpendicular distance between the optical axis and the inflection point on the object side of the fifth lens that is nearest to the optical axis may be expressed as HIF511. The perpendicular distance between the optical axis and the inflection point on the image side of the fifth lens that may be nearest to the optical axis is expressed as HIF521. The following conditions are satisfied: HIF511=0.28212 mm, HIF511/HOI=0.05642, HIF521=2.13850 mm and HIF521/HOI=0.42770.

The perpendicular distance between the inflection point on the object side of the fifth lens that is second nearest to the optical axis and the optical axis may be expressed as HIF512. The perpendicular distance between the inflection point on the image side of the fifth lens that is second nearest to the optical axis and the optical axis may be expressed as HIF522. The following conditions are satisfied: HIF512=2.51384 mm and HIF512/HOI=0.50277.

The perpendicular distance between the inflection point on the object side of the fifth lens that is third nearest to the optical axis and the optical axis may be expressed as HIF513. The perpendicular distance between the inflection point on the image side of the fifth lens that is third nearest to the optical axis and the optical axis may be expressed as HIF523. The following conditions are satisfied: HIF513=0 mm, HIF513/HOI=0, HIF523=0 mm and HIF523/HOI=0.

The perpendicular distance between the inflection point on the object side of the fifth lens that is fourth nearest to the optical axis and the optical axis may be expressed as HIF514. The perpendicular distance between the inflection point on the image side of the fifth lens that is fourth nearest to the optical axis and the optical axis may be expressed as HIF524. The following conditions are satisfied: HIF514=0 mm, HIF514/HOI=0, HIF524=0 mm and HIF524/HOI=0.

The sixth lens 160 has negative refractive power and is made of a plastic material. An object side 162 of the sixth lens 160 is a concave surface and an image side 164 of the sixth lens 160 is a concave surface, and the object side 162 of the sixth lens 160 has two inflection points and the image side 164 of the sixth lens 160 has one inflection point. Therefore, the incident angle of each field of view on the sixth lens can be effectively adjusted and the spherical aberration can thus be improved. The length of the maximum effective half diameter outline curve of the object side of the sixth lens is denoted as ARS61, and the length of the maximum effective half diameter outline curve of the image side of the sixth lens may be denoted as ARS62. The outline curve length of the ½ entrance pupil diameter (HEP) of the object side of the sixth lens may be denoted as ARE61, and the outline curve length of the ½ entrance pupil diameter (HEP) of the image side of the sixth lens may be denoted as ARE62. The thickness of the sixth lens on the optical axis may be denoted as TP6.

The horizontal distance in parallel with the optical axis from an inflection point on the object side of the sixth lens that is nearest to the optical axis to the intersection point where the object side of the sixth lens crosses the optical axis may be expressed as SGI611. The horizontal distance in parallel with the optical axis from an inflection point on the image side of the sixth lens that is nearest to the optical axis to the intersection point where the image side of the sixth lens crosses the optical axis may be expressed as SGI621. The following conditions are met: SGI611=−0.38558 mm, |SGI611|/(|SGI611|+TP6)=0.27212, SGI621=0.12386 mm and |SGI621|/(|SGI621|+TP6)=0.10722.

The horizontal distance in parallel with the optical axis from an inflection point on the object side of the sixth lens that is second nearest to the optical axis to an intersection point where the object side of the sixth lens crosses the optical axis may be expressed as SGI612. The horizontal distance in parallel with the optical axis from an inflection point on the image side of the sixth lens that is second nearest to the optical axis to the intersection point where the image side of the sixth lens crosses the optical axis may be expressed as SGI622. The following conditions are met: SGI612=−0.47400 mm, |SGI612|/(|SGI612|+TP6)= 0.31488, SGI622=0 mm and |SGI622|/(|SGI622|+TP6)=0.

The perpendicular distance between the inflection point on the object side of the sixth lens that is nearest to the optical axis and the optical axis may be expressed as HIF611. The perpendicular distance between the inflection point on the image side of the sixth lens that is nearest to the optical axis and the optical axis may be expressed as HIF621. The following conditions are met: HIF611=2.24283 mm, HIF611/HOI=0.44857, HIF621=1.07376 mm and HIF621/HOI=0.21475.

The perpendicular distance between the inflection point on the object side of the sixth lens that is second nearest to the optical axis and the optical axis may be expressed as HIF612. The perpendicular distance between the inflection point on the image side of the sixth lens that is second nearest to the optical axis and the optical axis may be expressed as HIF622. The following conditions are met: HIF612=2.48895 mm and HIF612/HOI=0.49779.

The perpendicular distance between the inflection point on the object side of the sixth lens that is third nearest to the optical axis and the optical axis may be expressed as HIF613. The perpendicular distance between the inflection point on the image side of the sixth lens that is third nearest to the optical axis and the optical axis may be expressed as HIF623. The following conditions are met: HIF613=0 mm, HIF613/HOI=0, HIF623=0 mm and HIF623/HOI=0.

The perpendicular distance between the inflection point on the object side of the sixth lens that is fourth nearest to the optical axis and the optical axis may be expressed as HIF614. The perpendicular distance between the inflection point on the image side of the sixth lens that is fourth nearest to the optical axis and the optical axis may be expressed as HIF624. The following conditions are met: HIF614=0 mm, HIF614/HOI=0, HIF624=0 mm and HIF624/HOI=0.

The infrared filter 180 is made of glass material. The infrared filter 180 is disposed between the sixth lens 160 and the image plane 190, and does not affect the focal length of the optical image capturing system with thin mounting components.

In the optical image capturing system with thin mounting components of the first embodiment, the focal length of the optical image capturing system with thin mounting components may be expressed as f, the entrance pupil diameter of the optical image capturing system with thin mounting components may be expressed as HEP, and a half maximum angle of view of the optical image capturing system with thin mounting components may be expressed as HAF. The value of the parameters are shown as below: f=4.075 mm, f/HEP=1.4, HAF=50.001° and tan(HAF)=1.1918.

In the optical image capturing system with thin mounting components of the first embodiment, the focal length of the first lens 110 may be expressed as f1 and the focal length of the sixth lens 160 may be expressed as f6. The following conditions are satisfied: f1=−7.828 mm, |f/f1|=0.52060, f6=−4.886 and |f1|>|f6|.

In the optical image capturing system with thin mounting components of the first embodiment, focal lengths of the second lens 120 to the fifth lens 150 may be expressed as f2, f3, f4 and f5, respectively. The following conditions are satisfied: |f2|+|f3|+|f4|+|f5|=95.50815 mm, |f1|+|f6|=12.71352 mm and |f2|+|f3|+|f4|+|f5|>|f1|+|f6|.

The ratio of the focal length f of the optical image capturing system with thin mounting components to the focal length fp of each lens with positive refractive power may be expressed as PPR. The ratio of the focal length f of the optical image capturing system with thin mounting components to the focal length fn of each lens with negative refractive power may be expressed as NPR. In the optical image capturing system with thin mounting components of the first embodiment, a sum of the PPR of all lenses with positive refractive power is ΣPPR=f/f2+f/f4+f/f5=1.63290. The sum of the NPR of all lenses with negative refractive powers may be expressed as ΣNPR=|f/f1|+|f/f3|+|f/f6|=1.51305, ΣPPR/|ΣNPR|=1.07921. And the following conditions are also satisfied: |f/f2|=0.69101, |f/f3|=0.15834, |f/f4|=0.06883, |f/f5|=0.87305 and |f/f6|=0.83412.

In the optical image capturing system with thin mounting components of the first embodiment, the distance from the object side 112 of the first lens to the image side 164 of the sixth lens may be expressed as InTL. The distance from the object side 112 of the first lens to the image plane 190 is HOS. The distance from an aperture 100 to the image plane 190 may be expressed as InS. A half diagonal of an effective detection field of the image sensing device 192 is HOI. The distance from the image side 164 of the sixth lens to the image plane 190 may be expressed as BFL. The following conditions are met: InTL+BFL=HOS, HOS=19.54120 mm, HOI=5.0 mm, HOS/HOI=3.90824, HOS/f=4.7952, InS=11.685 mm, InS/HOS=0.59794 and InTL/HOS=0.7936.

In the optical image capturing system with thin mounting components of the first embodiment, the total thickness of all lenses with refractive power on the optical axis may be expressed as ΣTP. The following conditions are met: ΣTP=8.13899 mm and ΣTP/InTL=0.52477. This configuration can maintain the contrast ratio of the image formation of the optical image capturing system with thin mounting components and the yield rate regarding lens manufacturing at the same time, as well as provide the proper back focal length so as to accommodate other elements.

In the optical image capturing system with thin mounting components of the first embodiment, the curvature radius of the object side 112 of the first lens may be expressed as R1. The curvature radius of the image side 114 of the first lens is R2. The following condition is satisfied: |R1/R2|=8.99987. The first lens has a suitable magnitude of positive refractive power, so as to prevent longitudinal spherical aberration from increasing too quickly.

In the optical image capturing system with thin mounting components of the first embodiment, the curvature radius of the object side 162 of the sixth lens is R11. The curvature radius of the image side 164 of the sixth lens is R12. The following conditions are satisfied: (R11−R12)/(R11+R12)=1.27780. This configuration is beneficial to correct the astigmatism generated by the optical image capturing system with thin mounting components.

In the optical image capturing system with thin mounting components of the first embodiment, a sum of focal lengths of all lenses with positive refractive power may be expressed as ΣPP. The following conditions are satisfied: ΣPP=f2+f4+f5=69.770 mm and f5/(f2+f4+f5)=0.067. This configuration is helpful to distribute the positive refractive power of a single lens to other lenses with positive refractive powers in an appropriate way, so as to suppress the generation of noticeable aberrations in the propagating process of the incident light in the optical image capturing system with thin mounting components.

In the optical image capturing system with thin mounting components of the first embodiment, the sum of focal lengths of all lenses with negative refractive power is ΣNP. The following conditions are satisfied: ΣNP=f1+f3+f6=−38.451 mm and f6/(f1+f3+f6)=0.127. This configuration is helpful to distribute the sixth lens with negative refractive power to other lenses with negative refractive powers in an appropriate way, so as to suppress the generation of noticeable aberrations in the propagating process of the incident light in the optical image capturing system with thin mounting components.

In the optical image capturing system with thin mounting components of the first embodiment, the distance to the optical axis between the first lens 110 and the second lens 120 may be expressed as IN12. The following conditions are met: IN12=6.418 mm and IN12/f=1.57491. This configuration is helpful to improve the chromatic aberration of the lens in order to elevate the performance of the lenses.

In the optical image capturing system with thin mounting components of the first embodiment, a distance on the optical axis between the fifth lens 150 and the sixth lens 160 is IN56. The following conditions are met: IN56=0.025 mm and IN56/f=0.00613. This configuration is helpful to improve the chromatic aberration of the lens in order to elevate the performance of the lenses.

In the optical image capturing system with thin mounting components of the first embodiment, the thicknesses of the first lens 110 and the second lens 120 on the optical axis may be expressed as TP1 and TP2, respectively. The following conditions are satisfied: TP1=1.934 mm, TP2=2.486 mm and (TP1+IN12)/TP2=3.36005 This configuration is helpful to control the sensitivity generated by the optical image capturing system with thin mounting components and elevate the performance.

In the optical image capturing system with thin mounting components of the first embodiment, the thicknesses of the fifth lens 150 and the sixth lens 160 on the optical axis may be expressed as TP5 and TP6, respectively, and the distance between the aforementioned two lenses on the optical axis may be expressed as IN56. The following conditions are satisfied: TP5=1.072 mm, TP6=1.031 mm and (TP6+IN56)/TP5=0.98555. This configuration is helpful to control the sensitivity generated by the optical image capturing system with thin mounting components and reduce the total height of the optical image capturing system with thin mounting components.

In the optical image capturing system with thin mounting components of the first embodiment, a distance on the optical axis between the third lens 130 and the fourth lens 140 may be expressed as IN34. The distance on the optical axis between the fourth lens 140 and the fifth lens 150 may be expressed as IN45. The following conditions are satisfied: IN34=0.401 mm, IN45=0.025 mm and TP4/(IN34+TP4+IN45)=0.74376. This configuration is helpful to slightly correct the aberration of the propagating process of the incident light layer by layer and decrease the total height of the optical image capturing system with thin mounting components.

In the optical image capturing system with thin mounting components of the first embodiment, a distance parallel to the optical axis from a maximum effective half diameter position on the object side 152 of the fifth lens to an intersection point where the object side 152 of the fifth lens crosses the optical axis may be expressed as InRS51. The distance parallel to the optical axis from a maximum effective half diameter position on the image side 154 of the fifth lens to an intersection point where the image side 154 of the fifth lens crosses the optical axis may be expressed as InRS52. The thickness of the fifth lens 150 may be expressed as TP5. The following conditions are satisfied: InRS51=−0.34789 mm, InRS52=−0.88185 mm, |InRS51|/TP5=0.32458 and |InRS52|/TP5=0.82276. This configuration is favorable to manufacturing and allows for effective forming of the lens and miniaturization of the optical image capturing system with thin mounting components.

In the optical image capturing system with thin mounting components of the first embodiment, the perpendicular distance between a critical point on the object side 152 of the fifth lens and the optical axis may be expressed as HVT51. The perpendicular distance between a critical point on the image side 154 of the fifth lens and the optical axis may be expressed as HVT52. The following conditions are satisfied: HVT51=0.515349 mm and HVT52=0 mm.

In the optical image capturing system with thin mounting components of the first embodiment, a distance in parallel with the optical axis from a maximum effective half diameter position on the object side 162 of the sixth lens to an intersection point where the object side 162 of the sixth lens crosses the optical axis may be expressed as InRS61. The distance parallel to the optical axis from a maximum effective half diameter position on the image side 164 of the sixth lens to an intersection point where the image side 164 of the sixth lens crosses the optical axis may be expressed as InRS62. The thickness of the sixth lens 160 may be expressed as TP6. The following conditions are satisfied: InRS61=−0.58390 mm, InRS62=0.41976 mm, |InRS61|/TP6=0.56616 and |InRS62|/TP6=0.40700. This configuration is favorable to manufacturing and allows for effective forming of the lens and miniaturization of the optical image capturing system with thin mounting components.

In the optical image capturing system with thin mounting components of the first embodiment, the perpendicular distance between a critical point on the object side 162 of the sixth lens and the optical axis may be expressed as HVT61. The perpendicular distance between a critical point C62 on the image side 164 of the sixth lens and the optical axis may be expressed as HVT62. The following conditions are satisfied: HVT61=0 mm and HVT62=0 mm.

In the optical image capturing system with thin mounting components of the first embodiment, the following condition is satisfied: HVT51/HOI=0.1031. This configuration is helpful to correct the aberration of the surrounding field of view of the optical image capturing system with thin mounting components.

In the optical image capturing system with thin mounting components of the first embodiment, the following condition is satisfied: HVT51/HOS=0.02634. Therefore, the configuration is helpful to correcting the aberration of the surrounding field of view of the optical image capturing system with thin mounting components.

In the optical image capturing system with thin mounting components of the first embodiment, the second lens 120, the third lens 130 and the sixth lens 160 have negative refractive powers. The coefficient of dispersion for the second lens may be expressed as NA2. The coefficient of dispersion for the third lens may be expressed as NA3. The coefficient of dispersion for the sixth lens may be expressed as NA6. The following condition is satisfied: NA6/NA2≤1. This configuration is helpful to correcting the chromatic aberration of the optical image capturing system with thin mounting components.

In the optical image capturing system with thin mounting components of the first embodiment, TV distortion and optical distortion for image formation in the optical image capturing system with thin mounting components may be expressed as TDT and ODT, respectively. The following conditions are satisfied: |TDT|=2.124% and |ODT|=5.076%.

Please refer to FIG. 1C, the code names and values pertaining to the related mechanism element parameters in the embodiment of the present invention are shown below in detail. The optical image capturing system with thin mounting components may comprise an image sensor S, wherein a maximum of a smallest side length on the plane of a periphery of the image sensor S and perpendicular to the optical axis is LS. The optical image capturing system with thin mounting components may further comprise a first lens positioning element, denoted as PE1 (Positioning Element 1), wherein the first lens positioning element PE1 is hollow and opaque, and comprises a lens mount PEH and a base plate PEB. The base plate PEB is configured in a direction approaching the image plane for shading and adjusting the image sensor S. The base plate PEB has a predetermined thickness equal to positioning element 1 TH1, wherein a maximum of a smallest side length on a plane of a periphery of the base plate PEB and perpendicular to the optical axis is PhiD. The lens mount PEH (may selectively be integrally formed) has a hollow-tubular shape and opaque property for accommodating the second lens positioning element, wherein the second lens positioning element is denoted as PE2.

The second lens positioning element PE2 comprises a positioning portion PEP. The positioning portion PEP is hollow and has a predetermined thickness equal to positioning element 2 TH2 at the image side thereof. The maximum diameter of a plane of a periphery of the positioning portion PEP and perpendicular to the optical axis is PhiC. The positioning portion PEP has a positioning function for accommodating the lenses and making the lenses arranging on the optical axis. The external side of the positioning portion PEP does not contact inner sides (a thread-less design is employed in the present embodiment) of the lens mount PEH. Furthermore, the manner of dispensing adhesive on object side is selectively performed so as to make the first lens positioning element PE1 and the second lens positioning element PE2 bonded and fixed.

In the optical image capturing system with thin mounting components, LS is 12 mm, PhiA is double value of EHD62 and equals to 6.726 mm (EHD62: the maximum effective half diameter on the image side of the sixth lens), PhiC=PhiA+2*TH2=7.026 mm, PhiD=PhiC+2*(TH1+TH2)=7.426 mm, TH1 is 0.2 mm, TH2 is 0.15 mm, PhiA/PhiD is 0.9057, (TH1+TH2) is 0.35 mm, (TH1+TH2)/HOI is 0.035, (TH1+TH2)/HOS is 0.0179, 2*(TH1+TH2)/PhiA is 0.1041, and (TH1+TH2)/LS is 0.0292.

The parameters of the lenses of the first embodiment are listed in Table 1 and Table 2.

TABLE 1

Lens Parameters for the First Embodiment
f (focal length) = 4.075 mm; f/HEP = 1.4; HAF (half angle of view) = 50.000 deg

| Surface No | | Curvature Radius | Thickness (mm) | Material | Refractive Index | Coefficient of Dispersion | Focal Length |
|---|---|---|---|---|---|---|---|
| 0 | Object | Plane | Plane | | | | |
| 1 | First Lens | −40.99625704 | 1.934 | Plastic | 1.515 | 56.55 | −7.828 |
| 2 | | 4.555209289 | 5.923 | | | | |
| 3 | Aperture | Plane | 0.495 | | | | |
| 4 | Second Lens | 5.333427366 | 2.486 | Plastic | 1.544 | 55.96 | 5.897 |
| 5 | | −6.781659971 | 0.502 | | | | |
| 6 | Third Lens | −5.697794287 | 0.380 | Plastic | 1.642 | 22.46 | −25.738 |
| 7 | | −8.883957518 | 0.401 | | | | |
| 8 | Fourth Lens | 13.19225664 | 1.236 | Plastic | 1.544 | 55.96 | 59.205 |
| 9 | | 21.55681832 | 0.025 | | | | |
| 10 | Fifth Lens | 8.987806345 | 1.072 | Plastic | 1.515 | 56.55 | 4.668 |

TABLE 1-continued

Lens Parameters for the First Embodiment
f (focal length) = 4.075 mm; f/HEP = 1.4; HAF (half angle of view) = 50.000 deg

| Surface No | | Curvature Radius | Thickness (mm) | Material | Refractive Index | Coefficient of Dispersion | Focal Length |
|---|---|---|---|---|---|---|---|
| 11 | | −3.158875374 | 0.025 | | | | |
| 12 | Sixth Lens | −29.46491425 | 1.031 | Plastic | 1.642 | 22.46 | −4.886 |
| 13 | | 3.593484273 | 2.412 | | | | |
| 14 | Infrared Filter | Plane | 0.200 | | 1.517 | 64.13 | |
| 15 | | Plane | 1.420 | | | | |
| 16 | Image Plane | Plane | | | | | |

Reference Wavelength: 555 nm;
Shield Position: The 1st surface with effective aperture = 5.800 mm;
The 3rd surface with effective aperture radius = 1.570 mm;
The 5th surface with the effective aperture radius = 1.950 mm

TABLE 2

Coefficients of the aspheric surfaces
Table 2: Aspheric Coefficients

| | Surface No | | | | | | |
|---|---|---|---|---|---|---|---|
| | 1 | 2 | 4 | 5 | 6 | 7 | 8 |
| k | 4.310876E+01 | −4.707622E+00 | 2.616025E+00 | 2.445397E+00 | 5.645686E+00 | −2.117147E+01 | −5.287220E+00 |
| A4 | 7.054243E−03 | 1.714312E−02 | −8.377541E−03 | −1.789549E−02 | −3.379055E−03 | −1.370959E−02 | −2.937377E−02 |
| A6 | −5.233264E−04 | −1.502232E−04 | −1.838068E−03 | −3.657520E−03 | −1.225453E−03 | 6.250200E−03 | 2.743532E−03 |
| A8 | 3.077890E−05 | −1.359611E−04 | 1.233332E−03 | −1.131622E−03 | −5.979572E−03 | −5.854426E−03 | −2.457574E−03 |
| A10 | −1.260650E−06 | 2.680747E−05 | −2.390895E−03 | 1.390351E−03 | 4.556449E−03 | 4.049451E−03 | 1.874319E−03 |
| A12 | 3.319093E−08 | −2.017491E−06 | 1.998555E−03 | −4.152857E−04 | −1.177175E−03 | −1.314592E−03 | −6.013661E−04 |
| A14 | −5.051600E−10 | 6.604615E−08 | −9.734019E−04 | 5.487286E−05 | 1.370522E−04 | 2.143097E−04 | 8.792480E−05 |
| A16 | 3.380000E−12 | −1.301630E−09 | 2.478373E−04 | −2.919339E−06 | −5.974015E−06 | −1.399894E−05 | −4.770527E−06 |

| | Surface No | | | | |
|---|---|---|---|---|---|
| | 9 | 10 | 11 | 12 | 13 |
| k | 6.200000E+01 | −2.114008E+01 | −7.699904E+00 | −6.155476E+01 | −3.120467E−01 |
| A4 | −1.359965E−01 | −1.263831E−01 | −1.927804E−02 | −2.492467E−02 | −3.521844E−02 |
| A6 | 6.628518E−02 | 6.965399E−02 | 2.478376E−03 | −1.835360E−03 | 5.629654E−03 |
| A8 | −2.129167E−02 | −2.116027E−02 | 1.438785E−03 | 3.201343E−03 | −5.466925E−04 |
| A10 | 4.396344E−03 | 3.819371E−03 | −7.013749E−04 | −8.990757E−04 | 2.231154E−05 |
| A12 | −5.542899E−04 | −4.040283E−04 | 1.253214E−04 | 1.245343E−04 | 5.548990E−07 |
| A14 | 3.768879E−05 | 2.280473E−05 | −9.943196E−06 | −8.788363E−06 | −9.396920E−08 |
| A16 | −1.052467E−06 | −5.165452E−07 | 2.898397E−07 | 2.494302E−07 | 2.728360E−09 |

The values pertaining to the outline curve lengths are obtainable according to the data in Table 1 and Table 2:

First Embodiment (Primary Reference Wavelength = 555 nm)

| ARE | ½(HEP) | ARE value | ARE − ½(HEP) | 2 (ARE/HEP) % | TP | ARE/TP (%) |
|---|---|---|---|---|---|---|
| 11 | 1.455 | 1.455 | −0.00033 | 99.98% | 1.934 | 75.23% |
| 12 | 1.455 | 1.495 | 0.03957 | 102.72% | 1.934 | 77.29% |
| 21 | 1.455 | 1.465 | 0.00940 | 100.65% | 2.486 | 58.93% |
| 22 | 1.455 | 1.495 | 0.03950 | 102.71% | 2.486 | 60.14% |
| 31 | 1.455 | 1.486 | 0.03045 | 102.09% | 0.380 | 391.02% |
| 32 | 1.455 | 1.464 | 0.00830 | 100.57% | 0.380 | 385.19% |
| 41 | 1.455 | 1.458 | 0.00237 | 100.16% | 1.236 | 117.95% |
| 42 | 1.455 | 1.484 | 0.02825 | 101.94% | 1.236 | 120.04% |
| 51 | 1.455 | 1.462 | 0.00672 | 100.46% | 1.072 | 136.42% |
| 52 | 1.455 | 1.499 | 0.04335 | 102.98% | 1.072 | 139.83% |
| 61 | 1.455 | 1.465 | 0.00964 | 100.66% | 1.031 | 142.06% |
| 62 | 1.455 | 1.469 | 0.01374 | 100.94% | 1.031 | 142.45% |

-continued

First Embodiment (Primary Reference Wavelength = 555 nm)

| ARS | EHD | ARS value | ARS − EHD | (ARS/EHD) % | TP | ARS/TP (%) |
|---|---|---|---|---|---|---|
| 11 | 5.800 | 6.141 | 0.341 | 105.88% | 1.934 | 317.51% |
| 12 | 3.299 | 4.423 | 1.125 | 134.10% | 1.934 | 228.70% |
| 21 | 1.664 | 1.674 | 0.010 | 100.61% | 2.486 | 67.35% |
| 22 | 1.950 | 2.119 | 0.169 | 108.65% | 2.486 | 85.23% |
| 31 | 1.980 | 2.048 | 0.069 | 103.47% | 0.380 | 539.05% |
| 32 | 2.084 | 2.101 | 0.017 | 100.83% | 0.380 | 552.87% |
| 41 | 2.247 | 2.287 | 0.040 | 101.80% | 1.236 | 185.05% |
| 42 | 2.530 | 2.813 | 0.284 | 111.22% | 1.236 | 227.63% |
| 51 | 2.655 | 2.690 | 0.035 | 101.32% | 1.072 | 250.99% |
| 52 | 2.764 | 2.930 | 0.166 | 106.00% | 1.072 | 273.40% |
| 61 | 2.816 | 2.905 | 0.089 | 103.16% | 1.031 | 281.64% |
| 62 | 3.363 | 3.391 | 0.029 | 100.86% | 1.031 | 328.83% |

The detail parameters of the first embodiment are listed in Table 1, in which the unit of the radius of the curvature, the thickness, and the focal length is the millimeter, and surface 0-16 indicates the surfaces of all elements in the system in sequence from the object side to the image side. Table 2 shows the aspheric coefficients of the first embodiment, where k is the conic coefficient in the aspheric surface equation, and $A_1$-$A_{20}$ are respectively the first to the twentieth order aspheric surface coefficients. The following embodiments have the similar diagrams and tables, which are the similar to those of the first embodiment, so it needs not be described again. Furthermore, definitions of the mechanism element parameters of each embodiment described below are the same as that of the first embodiment.

Second Embodiment

Figure 2A:
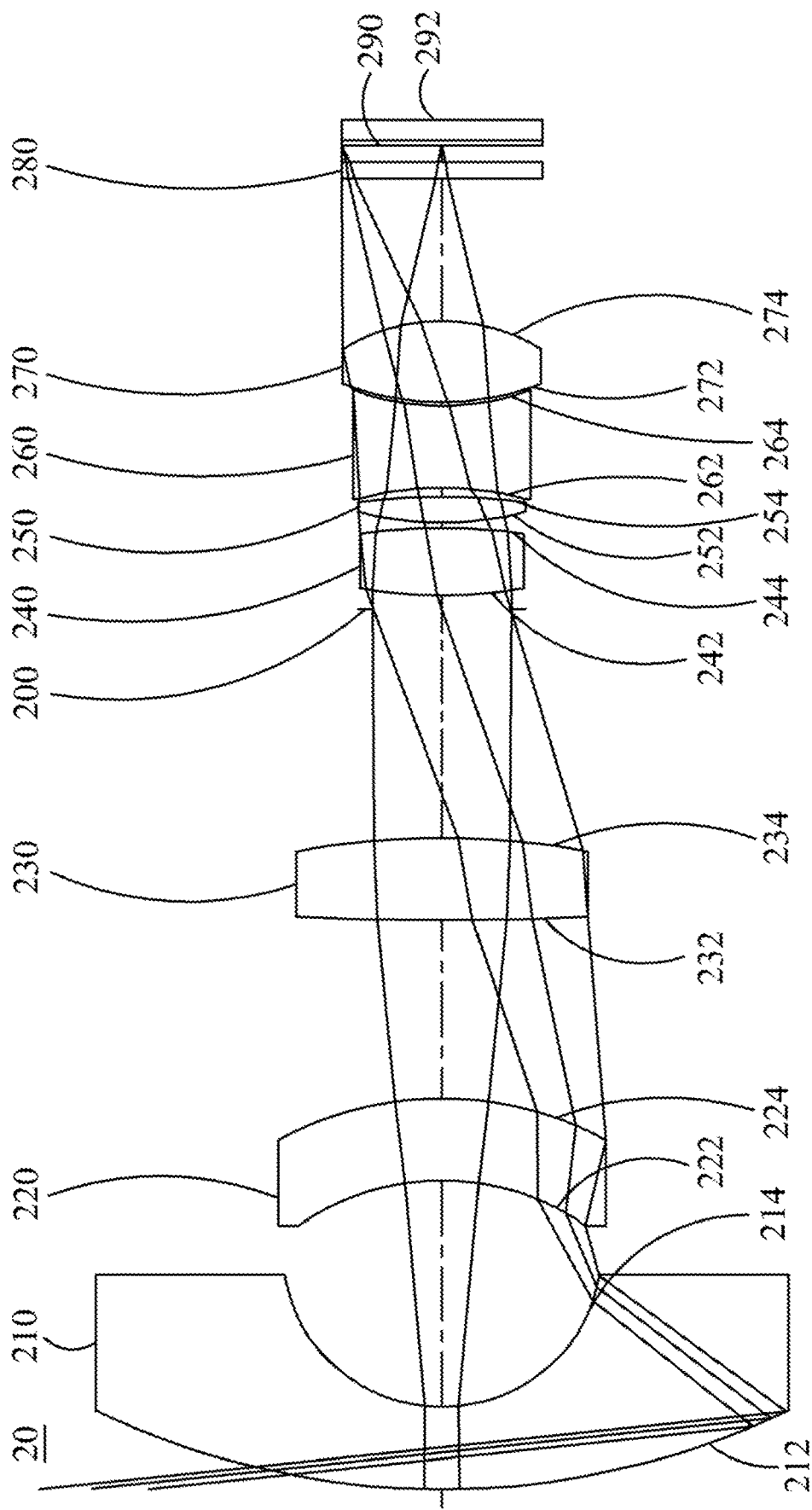
FIG. 2A is a schematic diagram of an optical image capturing system with thin mounting components of a second embodiment of the present invention.
Figure 2B:
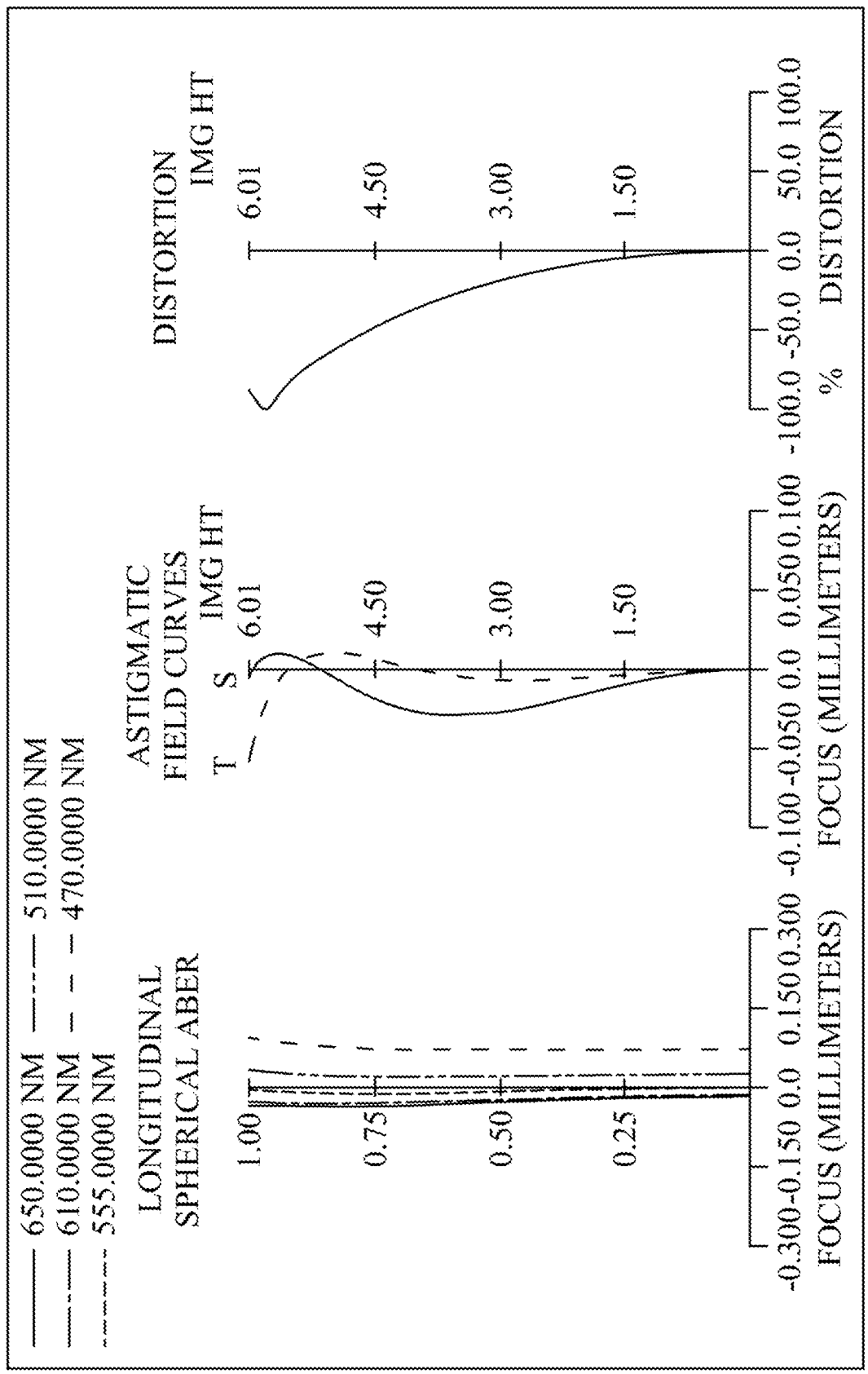
FIG. 2B shows curve diagrams of longitudinal spherical aberration, astigmatic field, and optical distortion of the optical image capturing system with thin mounting components of the second embodiment of the present invention in the order from left to right.
Figure 2C:
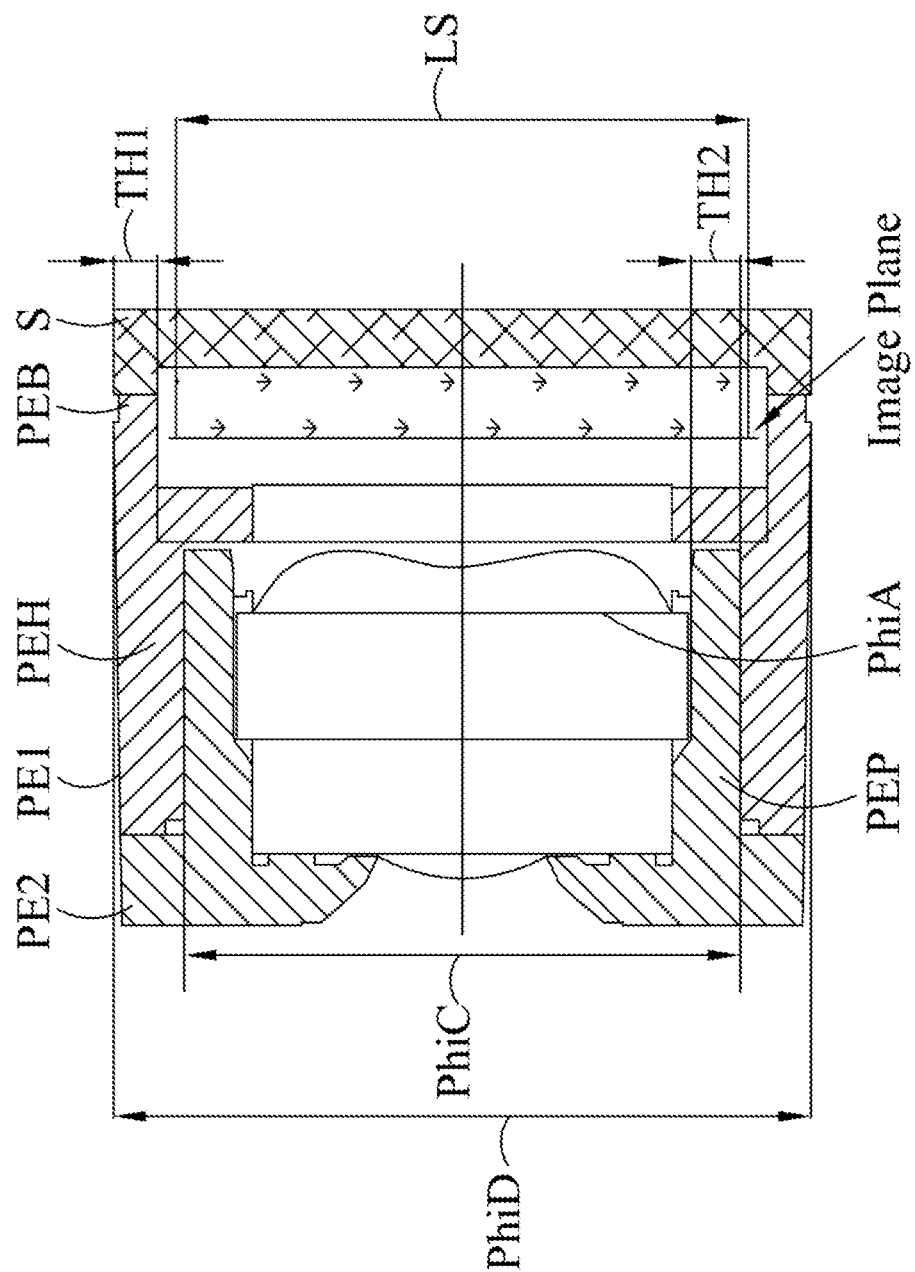
FIG. 2C is a schematic diagram depicting an assembly of a first lens positioning element and a second lens positioning element of the optical image capturing system with thin mounting components of the second embodiment of the present invention.

Please refer to FIG. 2A and FIG. 2B. FIG. 2A is a schematic diagram of a second embodiment of an optical imaging lens set of an optical image capturing system with thin mounting components of the present invention; FIG. 2B shows curve diagrams for longitudinal spherical aberration, astigmatic field, and optical distortion of the optical image capturing system with thin mounting components of the second embodiment of the present invention in the order from left to right. FIG. 2C is a schematic diagram depicting an assembly of a first lens positioning element and a second lens positioning element of the optical image capturing system with thin mounting components of the second embodiment of the present invention. An external side of the positioning portion PEP does not contact the inner sides (the thread-less design is employed in the present embodiment) of the lens mount PEH. Furthermore, the manner of dispensing adhesive on the object side is selectively performed so as to make the first lens positioning element PE1 and the second lens positioning element PE2 bonded and fixed.

As shown in FIG. 2A, in the order from the object side to the image side, the optical image capturing system with thin mounting components 20 includes a first lens 210, a second lens 220, a third lens 230, an aperture 200, a fourth lens 240, a fifth lens 250, a sixth lens 260, a seventh lens 270, an infrared filter 280, an image plane 290, and an image sensing device 292.

The first lens 210 has negative refractive power and is made of a glass material. An object side 212 of the first lens 210 is a convex surface, and an image side 214 of the first lens 210 is a concave surface. Both the object side 212 and the image side 214 of the first lens 210 are aspheric and have one inflection point.

The second lens 220 has negative refractive power and is made of a glass material. The object side 222 of the second lens 220 is a concave surface and the image side 224 of the second lens 220 is a convex surface. Both the object side 222 and the image side 224 of the second lens 220 are aspheric and have one inflection point.

The third lens 230 has positive refractive power and is made of a glass material. The object side 232 of the third lens 230 is a convex surface and the image side 234 of the third lens 230 is a convex surface, and both the object side 232 and the image side 234 of the third lens 230 are aspheric. The object side 232 of the third lens 230 has one inflection point.

The fourth lens 240 has positive refractive power and is made of a glass material. The object side 242 of the fourth lens 240 is a convex surface and the image side 244 of the fourth lens 240 is a convex surface. Both the object side 242 and the image side 244 of the fourth lens 240 are aspheric. The object side 242 of the fourth lens 240 has one inflection point and the image side 244 of the fourth lens 240 has two inflection points.

The fifth lens 250 has positive refractive power and is made of a glass material. The object side 252 of the fifth lens 250 is a convex surface and the image side 254 of the fifth lens 250 is a convex surface. Both the object side 252 and the image side 254 of the fifth lens 250 are aspheric and have one inflection point.

The sixth lens 260 has negative refractive power and is made of a glass material. The object side 262 of the sixth lens 260 is a concave surface and the image side 264 of the sixth lens 260 is a concave surface. Both the object side 262 and the image side 264 of the sixth lens 260 are aspheric and have two inflection points. The angle of striking on the sixth lens 260 for each field of view can be effectively adjusted so as to improve the aberration.

The seventh lens 270 has positive refractive power and is made of a glass material. The object side 272 of the seventh lens 270 is a convex surface and the image side 274 of the seventh lens 270 is a convex surface. This configuration is beneficial for shortening the back focal length of the optical image capturing system with thin mounting components so as allow for miniaturization. Both the object side 272 and the image side 274 of the seventh lens 270 have one inflection point. This configuration can also reduce the incident angle of the off-axis rays effectively, thereby further correcting the off-axis aberration.

The infrared filter 280 is made of a glass material and is disposed between the seventh lens 270 and the image plane 290. The infrared filter 280 does not affect the focal length of the optical image capturing system with thin mounting components.

The parameters of the lenses of the second embodiment are listed in Table 3 and Table 4.

TABLE 3

Lens Parameters for the Second Embodiment
f (focal length) = 4.7601 mm; f/HEP = 2.2; HAF (half angle of view) = 95.98 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+18 | | | | |
| 1 | First Lens | 47.71478323 | 4.977 | Glass | 2.001 | 29.13 | −12.647 |
| 2 | | 9.527614761 | 13.737 | | | | |
| 3 | Second Lens | −14.88061107 | 5.000 | Glass | 2.001 | 29.13 | −99.541 |
| 4 | | −20.42046946 | 10.837 | | | | |

TABLE 3-continued

Lens Parameters for the Second Embodiment
f (focal length) = 4.7601 mm; f/HEP = 2.2; HAF (half angle of view) = 95.98 deg

| Surface No | | Curvature Radius | Thickness (mm) | Material | Refractive Index | Coefficient of Dispersion | Focal Length |
|---|---|---|---|---|---|---|---|
| 5 | Third Lens | 182.4762997 | 5.000 | Glass | 1.847 | 23.78 | 44.046 |
| 6 | | −46.71963608 | 13.902 | | | | |
| 7 | Aperture | 1E+18 | 0.850 | | | | |
| 8 | Fourth Lens | 28.60018103 | 4.095 | Glass | 1.834 | 37.35 | 19.369 |
| 9 | | −35.08507586 | 0.323 | | | | |
| 10 | Fifth Lens | 18.25991342 | 1.539 | Glass | 1.609 | 46.44 | 20.223 |
| 11 | | −36.99028878 | 0.546 | | | | |
| 12 | Sixth Lens | −18.24574524 | 5.000 | Glass | 2.002 | 19.32 | −7.668 |
| 13 | | 15.33897192 | 0.215 | | | | |
| 14 | Seventh Lens | 16.13218937 | 4.933 | Glass | 1.517 | 64.20 | 13.620 |
| 15 | | −11.24007 | 8.664 | | | | |
| 16 | Infrared filter | 1E+18 | 1.000 | BK_7 | 1.517 | 64.2 | |
| 17 | | 1E+18 | 1.007 | | | | |
| 18 | Image Plane | 1E+18 | −0.007 | | | | |

Reference Wavelength (d-line) = 555 nm

TABLE 4

Coefficients of the aspheric surfaces of the second embodiment
Table 4: Aspheric Coefficients

| | Surface No | | | | | | |
|---|---|---|---|---|---|---|---|
| | 1 | 2 | 3 | 4 | 5 | 6 | 8 |
| k  | 0.000000E+00 | 0.000000E+00 | 0.000000E+00 | 0.000000E+00 | 0.000000E+00 | 0.000000E+00 | 0.000000E+00 |
| A4 | 0.000000E+00 | 0.000000E+00 | 0.000000E+00 | 0.000000E+00 | 0.000000E+00 | 0.000000E+00 | 0.000000E+00 |
| A6 | 0.000000E+00 | 0.000000E+00 | 0.000000E+00 | 0.000000E+00 | 0.000000E+00 | 0.000000E+00 | 0.000000E+00 |
| A8 | 0.000000E+00 | 0.000000E+00 | 0.000000E+00 | 0.000000E+00 | 0.000000E+00 | 0.000000E+00 | 0.000000E+00 |
| A10 | 0.000000E+00 | 0.000000E+00 | 0.000000E+00 | 0.000000E+00 | 0.000000E+00 | 0.000000E+00 | 0.000000E+00 |
| A12 | 0.000000E+00 | 0.000000E+00 | 0.000000E+00 | 0.000000E+00 | 0.000000E+00 | 0.000000E+00 | 0.000000E+00 |

| | Surface No | | | | | | |
|---|---|---|---|---|---|---|---|
| | 9 | 10 | 11 | 12 | 13 | 14 | 15 |
| k  | 0.000000E+00 | 0.000000E+00 | 0.000000E+00 | 0.000000E+00 | 0.000000E+00 | 0.000000E+00 | 0.000000E+00 |
| A4 | 0.000000E+00 | 0.000000E+00 | 0.000000E+00 | 0.000000E+00 | 0.000000E+00 | 0.000000E+00 | 0.000000E+00 |
| A6 | 0.000000E+00 | 0.000000E+00 | 0.000000E+00 | 0.000000E+00 | 0.000000E+00 | 0.000000E+00 | 0.000000E+00 |
| A8 | 0.000000E+00 | 0.000000E+00 | 0.000000E+00 | 0.000000E+00 | 0.000000E+00 | 0.000000E+00 | 0.000000E+00 |
| A10 | 0.000000E+00 | 0.000000E+00 | 0.000000E+00 | 0.000000E+00 | 0.000000E+00 | 0.000000E+00 | 0.000000E+00 |
| A12 | 0.000000E+00 | 0.000000E+00 | 0.000000E+00 | 0.000000E+00 | 0.000000E+00 | 0.000000E+00 | 0.000000E+00 |

An equation of the aspheric surfaces of the second embodiment is the same as that of the first embodiment, and the definitions are the same as well.

The conditional values of the second embodiment based on Table 3 and Table 4 are listed in the following table:

Second Embodiment (Primary reference wavelength = 555 nm)

| |f/f1| | |f/f2| | |f/f3| | |f/f4| | |f/f5| | |f/f6| |
|---|---|---|---|---|---|
| 0.3764 | 0.0478 | 0.1081 | 0.2458 | 0.2354 | 0.6208 |
| |f/f7| | ΣPPR | ΣNPR | ΣPPR/|ΣNPR| | IN12/f | IN67/f |
| 0.3495 | 1.3510 | 0.6327 | 2.1352 | 2.8858 | 0.0451 |
| |f1/f2| | |f2/f3| | (TP1 + IN12)/TP2 | | (TP7 + IN67)/TP6 | |
| 0.1271 | 2.2599 | 3.7428 | | 1.0296 | |
| HOS | InTL | HOS/HOI | InS/HOS | ODT % | TDT % |
| 81.6178 | 70.9539 | 13.6030 | 0.3451 | −113.2790 | 84.4806 |

Second Embodiment (Primary reference wavelength = 555 nm)

| HVT11 | HVT12 | HVT21 | HVT22 | HVT31 | HVT32 |
|---|---|---|---|---|---|
| 0.0000 | 0.0000 | 0.0000 | 0.0000 | 0.0000 | 0.0000 |
| HVT61 | HVT62 | HVT71 | HVT72 | HVT72/HOI | HVT72/HOS |
| 0.0000 | 0.0000 | 0.0000 | 0.0000 | 0.0000 | 0.0000 |
| PhiA | PhiC | PhiD | TH1 | TH2 | HOI |
| 11.962 mm | 12.362 mm | 12.862 mm | 0.25 mm | 0.2 mm | 6 mm |
| PhiA/PhiD | TH1 + TH2 | (TH1 + TH2)/HOI | (TH1 + TH2)/HOS | 2(TH1 + TH2)/PhiA | InTL/HOS |
| 0.9676 | 0.45 mm | 0.075 | 0.0055 | 0.0752 | 0.86934 |

Values related to the lengths of the outline curves of the second embodiment based on Table 3 and Table 4 are listed in the following table:

Second embodiment (Primary Reference wavelength: 555 nm)

| ARE | ½(HEP) | ARE value | ARE − ½(HEP) | 2(ARE/HEP) % | TP | ARE/TP (%) |
|---|---|---|---|---|---|---|
| 11 | 1.082 | 1.081 | −0.00075 | 99.93% | 4.977 | 21.72% |
| 12 | 1.082 | 1.083 | 0.00149 | 100.14% | 4.977 | 21.77% |
| 21 | 1.082 | 1.082 | 0.00011 | 100.01% | 5.000 | 21.64% |
| 22 | 1.082 | 1.082 | −0.00034 | 99.97% | 5.000 | 21.63% |
| 31 | 1.082 | 1.081 | −0.00084 | 99.92% | 5.000 | 21.62% |
| 32 | 1.082 | 1.081 | −0.00075 | 99.93% | 5.000 | 21.62% |
| 41 | 1.082 | 1.081 | −0.00059 | 99.95% | 4.095 | 26.41% |
| 42 | 1.082 | 1.081 | −0.00067 | 99.94% | 4.095 | 26.40% |
| 51 | 1.082 | 1.082 | −0.00021 | 99.98% | 1.539 | 70.28% |
| 52 | 1.082 | 1.081 | −0.00069 | 99.94% | 1.539 | 70.25% |
| 61 | 1.082 | 1.082 | −0.00021 | 99.98% | 5.000 | 21.63% |
| 62 | 1.082 | 1.082 | 0.00005 | 100.00% | 5.000 | 21.64% |
| 71 | 1.082 | 1.082 | −0.00003 | 100.00% | 4.933 | 21.93% |
| 72 | 1.082 | 1.083 | 0.00083 | 100.08% | 4.933 | 21.95% |

| ARS | EHD | ARS value | ARS − EHD | (ARS/EHD) % | TP | ARS/TP (%) |
|---|---|---|---|---|---|---|
| 11 | 20.767 | 21.486 | 0.719 | 103.46% | 4.977 | 431.68% |
| 12 | 9.412 | 13.474 | 4.062 | 143.16% | 4.977 | 270.71% |
| 21 | 8.636 | 9.212 | 0.577 | 106.68% | 5.000 | 184.25% |
| 22 | 9.838 | 10.264 | 0.426 | 104.33% | 5.000 | 205.27% |
| 31 | 8.770 | 8.772 | 0.003 | 100.03% | 5.000 | 175.45% |
| 32 | 8.511 | 8.558 | 0.047 | 100.55% | 5.000 | 171.16% |
| 41 | 4.600 | 4.619 | 0.019 | 100.42% | 4.095 | 112.80% |
| 42 | 4.965 | 4.981 | 0.016 | 100.32% | 4.095 | 121.64% |
| 51 | 5.075 | 5.143 | 0.067 | 101.33% | 1.539 | 334.15% |
| 52 | 5.047 | 5.062 | 0.015 | 100.30% | 1.539 | 328.89% |
| 61 | 5.011 | 5.075 | 0.064 | 101.28% | 5.000 | 101.50% |
| 62 | 5.373 | 5.489 | 0.116 | 102.16% | 5.000 | 109.79% |
| 71 | 5.513 | 5.625 | 0.112 | 102.04% | 4.933 | 114.03% |
| 72 | 5.981 | 6.307 | 0.326 | 105.44% | 4.933 | 127.84% |

The results of the equations of the second embodiment based on Table 3 and Table 4 are listed in the following table:

Values related to the inflection points of the second embodiment (Reference wavelength: 555 nm)

| HIF111 | 0 | HIF111/HOI | 0 | SGI111 | 0 | |SGI111|/(|SGI111| + TP1) | 0 |
|---|---|---|---|---|---|---|---|

Third Embodiment

Figure 3A:
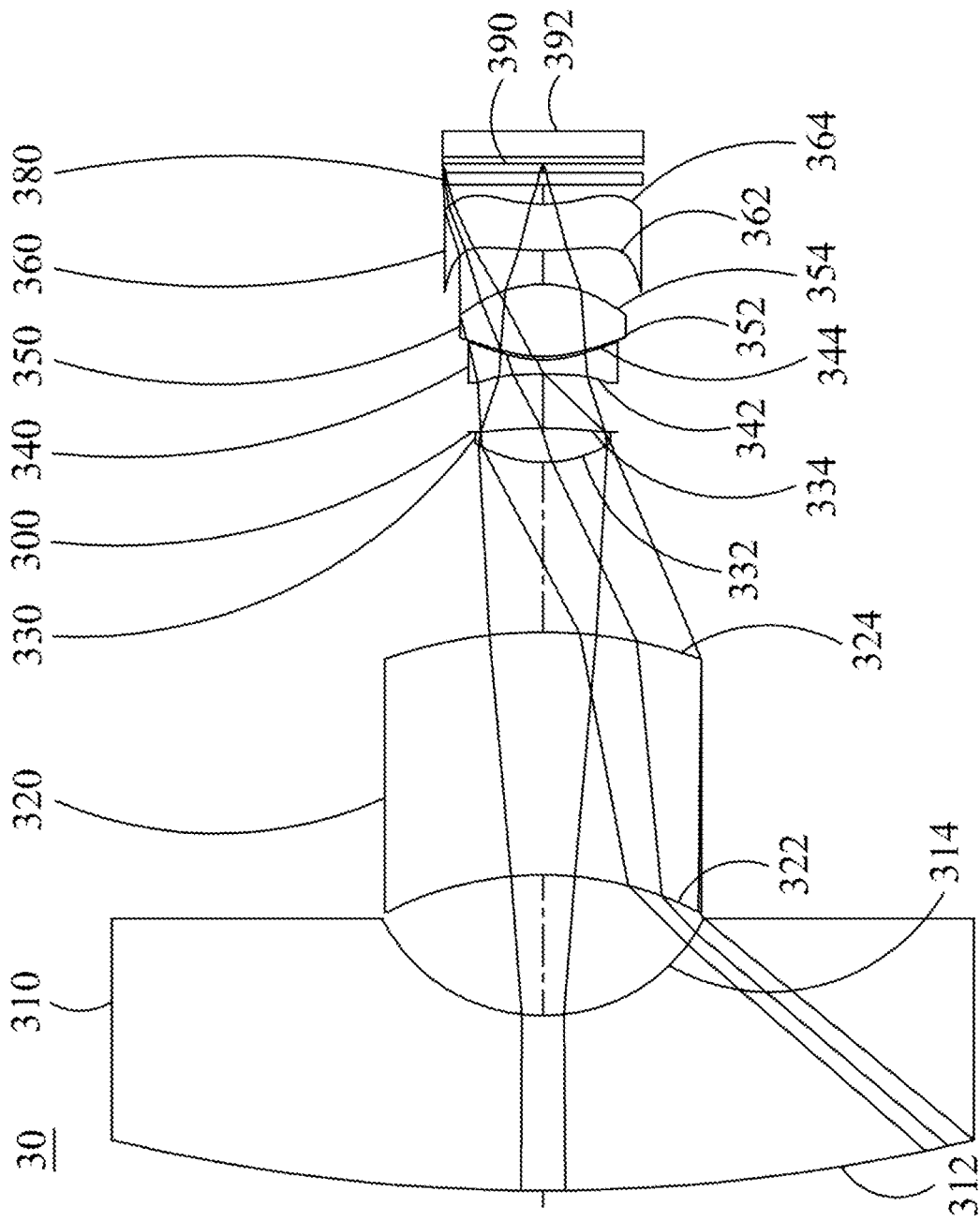
FIG. 3A is a schematic diagram of an optical image capturing system with thin mounting components of a third embodiment of the present invention.
Figure 3B:
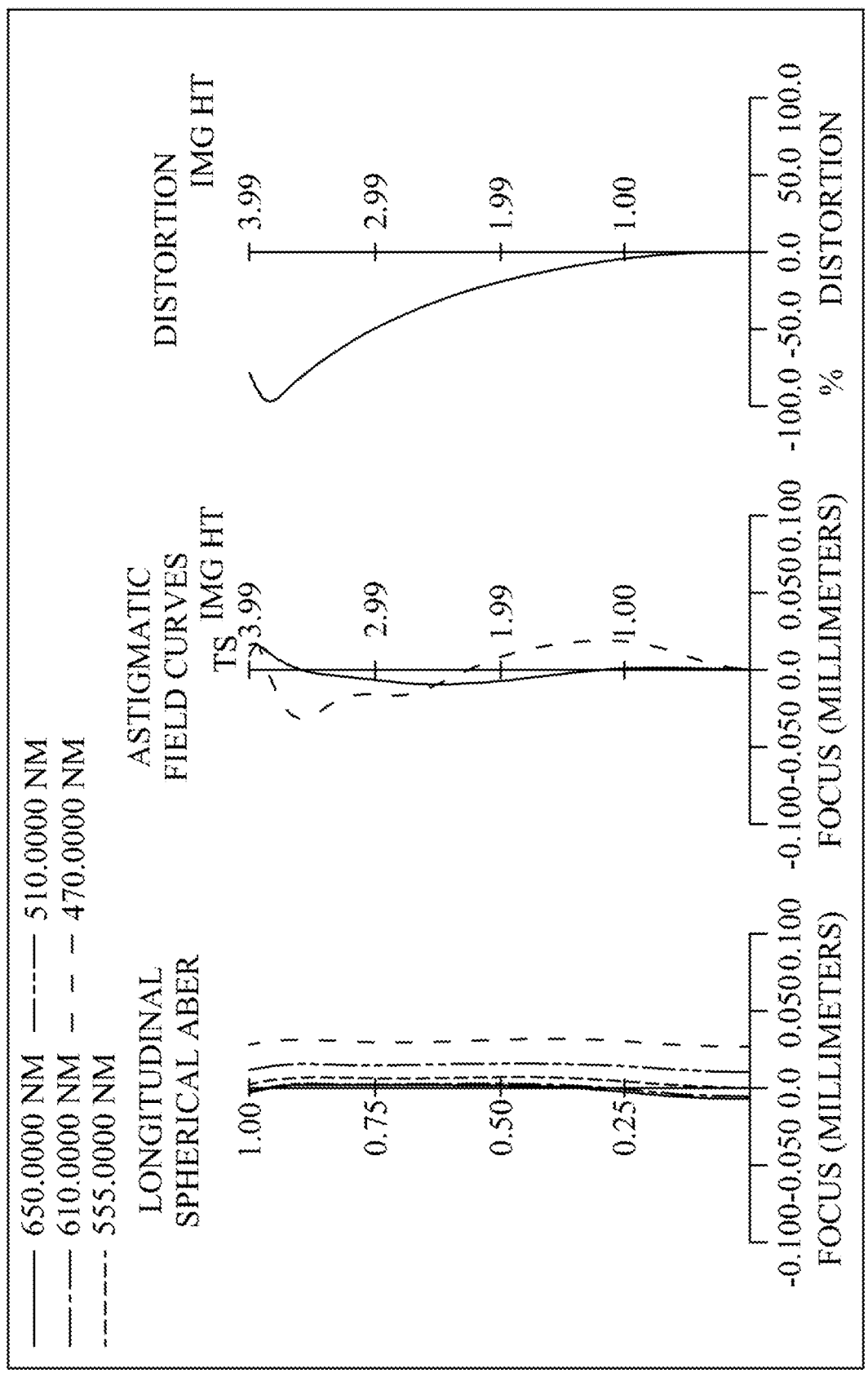
FIG. 3B shows curve diagrams of longitudinal spherical aberration, astigmatic field, and optical distortion of the optical image capturing system with thin mounting components of the third embodiment of the present invention in the order from left to right.
Figure 3C:
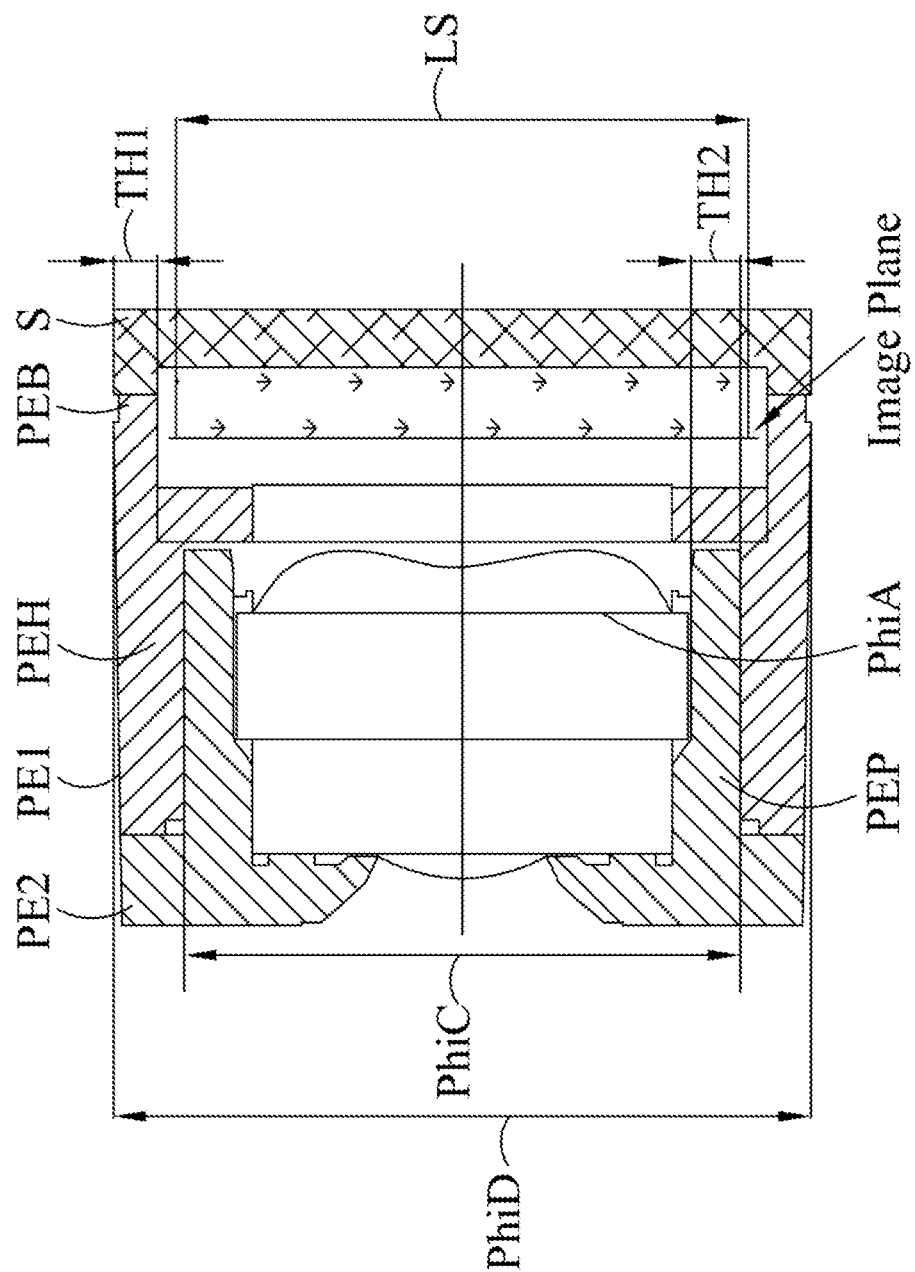
FIG. 3C is a schematic diagram depicting an assembly of a first lens positioning element and a second lens positioning element of the optical image capturing system with thin mounting components of the third embodiment of the present invention.

Please refer to FIG. 3A and FIG. 3B. FIG. 3A is a schematic diagram of a third embodiment of an optical imaging lens set of an optical image capturing system with thin mounting components of the present invention; FIG. 3B shows the curve diagrams of longitudinal spherical aberration, astigmatic field, and optical distortion of the optical image capturing system with thin mounting components of the third embodiment of the present invention in the order from left to right. FIG. 3C is a schematic diagram depicting an assembly of a first lens positioning element and a second lens positioning element of the optical image capturing system with thin mounting components of the third embodiment of the present invention. An external side of the positioning portion PEP does not contact the inner sides (a thread-less design is employed in the present embodiment) of the lens mount PEH. Furthermore, the manner of dispensing adhesive on the object side is selectively performed so as to make the first lens positioning element PE1 and the second lens positioning element PE2 bonded and fixed.

As shown in FIG. 3A, in the order from the object side to the image side, the optical image capturing system with thin mounting components 30 includes a first lens 310, a second lens 320, a third lens 330, an aperture 300, a fourth lens 340, a fifth lens 350, a sixth lens 360, an infrared filter 380, an image plane 390, and an image sensing device 392.

The first lens 310 has negative refractive power and is made of a glass material. The object side 312 of the first lens 310 is a convex surface and the image side 314 of the first lens 310 is a concave surface. Both the object side 312 and the image side 314 of the first lens 310 are spherical.

The second lens 320 has negative refractive power and is made of a glass material. The object side 322 of the second lens 320 is a concave surface and the image side 324 of the second lens 320 is a convex surface. Both the object side 322 and the image side 324 of the second lens 320 are spherical.

The third lens 330 has positive refractive power and is made of a plastic material. The object side 332 of the third lens 330 is a convex surface and the image side 334 of the third lens 330 is a convex surface, and both the object side 332 and the image side 334 of the third lens 330 are aspheric. The image side 334 of the third lens 330 has one inflection point.

The fourth lens 340 has negative refractive power and is made of a plastic material. The object side 342 of the fourth lens 340 is a concave surface and the image side 344 of the fourth lens 340 is a concave surface, and both the object side 342 and the image side 344 of the fourth lens 340 are aspheric. The image side 344 of the fourth lens 340 has one inflection point.

The fifth lens 350 has positive refractive power and is made of a plastic material. The object side 352 of the fifth lens 350 is a convex surface and the image side 354 of the fifth lens 350 is a convex surface, and both the object side 352 and the image side 354 of the fifth lens 350 are aspheric.

The sixth lens 360 has negative refractive power and is made of plastic material. The object side 362 of the sixth lens 360 is a concave surface and the image side 364 of the sixth lens 360 is a concave surface, and both the object side 362 and the image side 364 of the sixth lens 360 are aspheric. Both the object side 362 and the image side 364 of the sixth lens 360 have one inflection point. This configuration is beneficial for shortening the back focal length of the optical image capturing system with thin mounting components so as to allow for miniaturization. The incident angle of the off-axis rays can be reduced effectively, thereby further correcting the off-axis aberration.

The infrared filter 380 is made of a glass material and is disposed between the sixth lens 360 and the image plane 390. The infrared filter 380 does not affect the focal length of the optical image capturing system with thin mounting components.

The parameters of the lenses of the third embodiment are listed in Table 5 and Table 6.

An equation of the aspheric surfaces of the third embodiment is the same as that of the first embodiment, and the definitions are the same as well.

The conditional values of the third embodiment based on Table 5 and Table 6 are listed in the following table:

| Third Embodiment (Primary Reference Wavelength = 555 nm) | | | | | |
|---|---|---|---|---|---|
| \|f/f1\| | \|f/f2\| | \|f/f3\| | \|f/f4\| | \|f/f5\| | \|f/f6\| |
| 0.23865 | 0.00062 | 0.37172 | 0.56396 | 0.59621 | 0.11996 |
| ΣPPR | ΣNPR | ΣPPR/\|ΣNPR\| | IN12/f | IN56/f | TP4/(IN34 + TP4 + IN45) |
| 1.77054 | 0.12058 | 14.68400 | 2.06169 | 0.49464 | 0.19512 |
| \|f1/f2\| | \|f2/f3\| | (TP1 + IN12)/TP2 | | (TP6 + IN56)/TP5 | |
| 0.00259 | 600.74778 | 1.30023 | | 1.1131 | |

TABLE 5

Lens Parameters for the Third Embodiment
f (focal length) = 2.808 mm; f/HEP = 1.6; HAF (half angle of view) = 100 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 1E+18 | | | | |
| 1 | First Lens | 71.398124 | 7.214 | Glass | 1.702 | 41.15 | −11.765 |
| 2 | | 7.117272355 | 5.788 | | | | |
| 3 | Second Lens | −13.29213699 | 10.000 | Glass | 2.003 | 19.32 | −4537.460 |
| 4 | | −18.37509887 | 7.005 | | | | |
| 5 | Third Lens | 5.039114804 | 1.398 | Plastic | 1.514 | 56.80 | 7.553 |
| 6 | | −15.53136631 | −0.140 | | | | |
| 7 | Aperture | 1E+18 | 2.378 | | | | |
| 8 | Fourth Lens | −18.68613609 | 0.577 | Plastic | 1.661 | 20.40 | −4.978 |
| 9 | | 4.086545927 | 0.141 | | | | |
| 10 | Fifth Lens | 4.927609282 | 2.974 | Plastic | 1.565 | 58.00 | 4.709 |
| 11 | | −4.551946605 | 1.389 | | | | |
| 12 | Sixth Lens | 9.184876531 | 1.916 | Plastic | 1.514 | 56.80 | −23.405 |
| 13 | | 4.845500046 | 0.800 | | | | |
| 14 | Infrared Filter | 1E+18 | 0.500 | BK_7 | 1.517 | 64.13 | |
| 15 | | 1E+18 | 0.371 | | | | |
| 16 | Image Plane | 1E+18 | 0.005 | | | | |

Reference Wavelength = 555 nm

TABLE 6

Coefficients of the aspheric surfaces of the third embodiment
Table 6: Aspheric Coefficients

| Surface No | 1 | 2 | 3 | 4 | 5 | 6 | 8 |
|---|---|---|---|---|---|---|---|
| k | 0.000000E+00 | 0.000000E+00 | 0.000000E+00 | 0.000000E+00 | 1.318519E−01 | 3.120384E+00 | −1.494442E+01 |
| A4 | 0.000000E+00 | 0.000000E+00 | 0.000000E+00 | 0.000000E+00 | 6.405246E−05 | 2.103942E−03 | −1.598286E−03 |
| A6 | 0.000000E+00 | 0.000000E+00 | 0.000000E+00 | 0.000000E+00 | 2.278341E−05 | −1.050629E−04 | −9.177115E−04 |
| A8 | 0.000000E+00 | 0.000000E+00 | 0.000000E+00 | 0.000000E+00 | −3.672908E−06 | 6.168906E−06 | 1.011405E−04 |
| A10 | 0.000000E+00 | 0.000000E+00 | 0.000000E+00 | 0.000000E+00 | 3.748457E−07 | −1.224682E−07 | −4.919835E−06 |

| Surface No | 9 | 10 | 11 | 12 | 13 |
|---|---|---|---|---|---|
| k | 2.744228E−02 | −7.864013E+00 | −2.263702E+00 | −4.206923E+01 | −7.030803E+00 |
| A4 | −7.291825E−03 | 1.405243E−04 | −3.919567E−03 | −1.679499E−03 | −2.640099E−03 |
| A6 | 9.730714E−05 | 1.837602E−04 | 2.683449E−04 | −3.518520E−04 | −4.507651E−05 |
| A8 | 1.101816E−06 | −2.173368E−05 | −1.229452E−05 | 5.047353E−05 | −2.600391E−05 |
| A10 | −6.849076E−07 | 7.328496E−07 | 4.222621E−07 | −3.851055E−06 | 1.161811E−06 |

-continued

| Third Embodiment (Primary Reference Wavelength = 555 nm) | | | | | |
|---|---|---|---|---|---|
| HOS | InTL | HOS/HOI | InS/HOS | ODT % | TDT % |
| 42.31580 | 40.63970 | 10.57895 | 0.26115 | −122.32700 | 93.33510 |
| HVT51 | HVT52 | HVT61 | HVT62 | HVT62/HOI | HVT62/HOS |
| 0 | 0 | 2.22299 | 2.60561 | 0.65140 | 0.06158 |
| TP2/ | | | | | \|InRS62\|/ |
| TP3 | TP3/TP4 | InRS61 | InRS62 | \|InRS61\|/TP6 | TP6 |
| 7.15374 | 2.42321 | −0.20807 | −0.24978 | 0.10861 | 0.13038 |
| PhiA | PhiC | PhiD | TH1 | TH2 | HOI |
| 6.150 mm | 6.41 mm | 6.71 mm | 0.15 mm | 0.13 mm | 4 mm |
| | | (TH1 + TH2)/ | (TH1 + TH2)/ | | |
| PhiA/PhiD | TH1 + TH2 | HOI | HOS | 2(TH1 + TH2)/PhiA | InTL/HOS |
| 0.9165 | 0.28 mm | 0.07 | 0.0066 | 0.0911 | 0.96039 |

Values related to the lengths of the outline curves of the third embodiment based on Table 5 and Table 6 are listed in the following table:

| Third embodiment (Primary Reference wavelength: 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.877 | 0.877 | −0.00036 | 99.96% | 7.214 | 12.16% |
| 12 | 0.877 | 0.879 | 0.00186 | 100.21% | 7.214 | 12.19% |
| 21 | 0.877 | 0.878 | 0.00026 | 100.03% | 10.000 | 8.78% |
| 22 | 0.877 | 0.877 | −0.00004 | 100.00% | 10.000 | 8.77% |
| 31 | 0.877 | 0.882 | 0.00413 | 100.47% | 1.398 | 63.06% |
| 32 | 0.877 | 0.877 | 0.00004 | 100.00% | 1.398 | 62.77% |
| 41 | 0.877 | 0.877 | −0.00001 | 100.00% | 0.577 | 152.09% |
| 42 | 0.877 | 0.883 | 0.00579 | 100.66% | 0.577 | 153.10% |
| 51 | 0.877 | 0.881 | 0.00373 | 100.43% | 2.974 | 29.63% |
| 52 | 0.877 | 0.883 | 0.00521 | 100.59% | 2.974 | 29.68% |
| 61 | 0.877 | 0.878 | 0.00064 | 100.07% | 1.916 | 45.83% |
| 62 | 0.877 | 0.881 | 0.00368 | 100.42% | 1.916 | 45.99% |
| ARS | EHD | ARS value | ARE − EHD | (ARS/EHD)% | TP | ARS/TP (%) |
| 11 | 17.443 | 17.620 | 0.178 | 101.02% | 7.214 | 244.25% |
| 12 | 6.428 | 8.019 | 1.592 | 124.76% | 7.214 | 111.16% |
| 21 | 6.318 | 6.584 | 0.266 | 104.20% | 10.000 | 65.84% |
| 22 | 6.340 | 6.472 | 0.132 | 102.08% | 10.000 | 64.72% |
| 31 | 2.699 | 2.857 | 0.158 | 105.84% | 1.398 | 204.38% |
| 32 | 2.476 | 2.481 | 0.005 | 100.18% | 1.398 | 177.46% |
| 41 | 2.601 | 2.652 | 0.051 | 101.96% | 0.577 | 459.78% |
| 42 | 3.006 | 3.119 | 0.113 | 103.75% | 0.577 | 540.61% |
| 51 | 3.075 | 3.171 | 0.096 | 103.13% | 2.974 | 106.65% |
| 52 | 3.317 | 3.624 | 0.307 | 109.24% | 2.974 | 121.88% |
| 61 | 3.331 | 3.427 | 0.095 | 102.86% | 1.916 | 178.88% |
| 62 | 3.944 | 4.160 | 0.215 | 105.46% | 1.916 | 217.14% |

The results of the equations of the third embodiment based on Table 5 and Table 6 are listed in the following table:

| Values related to the inflection points of the third embodiment (Reference wavelength: 555 nm) | | | | | | | |
|---|---|---|---|---|---|---|---|
| HIF321 | 2.0367 | HIF321/HOI | 0.5092 | SGI321 | −0.1056 | \| SGI321 \| /( \| SGI321 \| + TP3) | 0.0702 |
| HIF421 | 2.4635 | HIF421/HOI | 0.6159 | SGI421 | 0.5780 | \| SGI421 \| /( \| SGI421 \| + TP4) | 0.5005 |
| HIF611 | 1.2364 | HIF611/HOI | 0.3091 | SGI611 | 0.0668 | \| SGI611 \| /( \| SGI611 \| + TP6) | 0.0337 |
| HIF621 | 1.5488 | HIF621/HOI | 0.3872 | SGI621 | 0.2014 | \| SGI621 \| /( \| SGI621 \| + TP6) | 0.0951 |

Fourth Embodiment

Figure 4A:
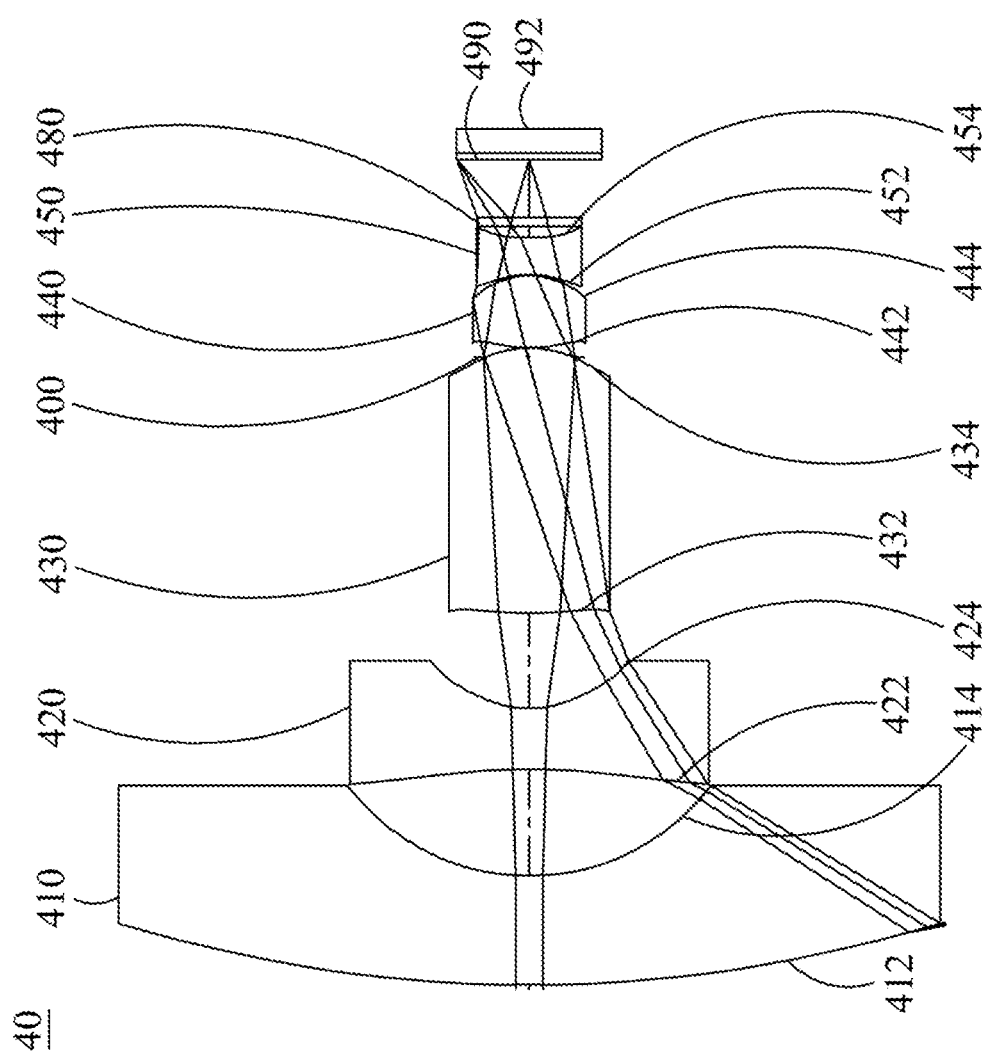
FIG. 4A is a schematic diagram of the optical image capturing system with thin mounting components of a fourth embodiment of the present invention.
Figure 4B:
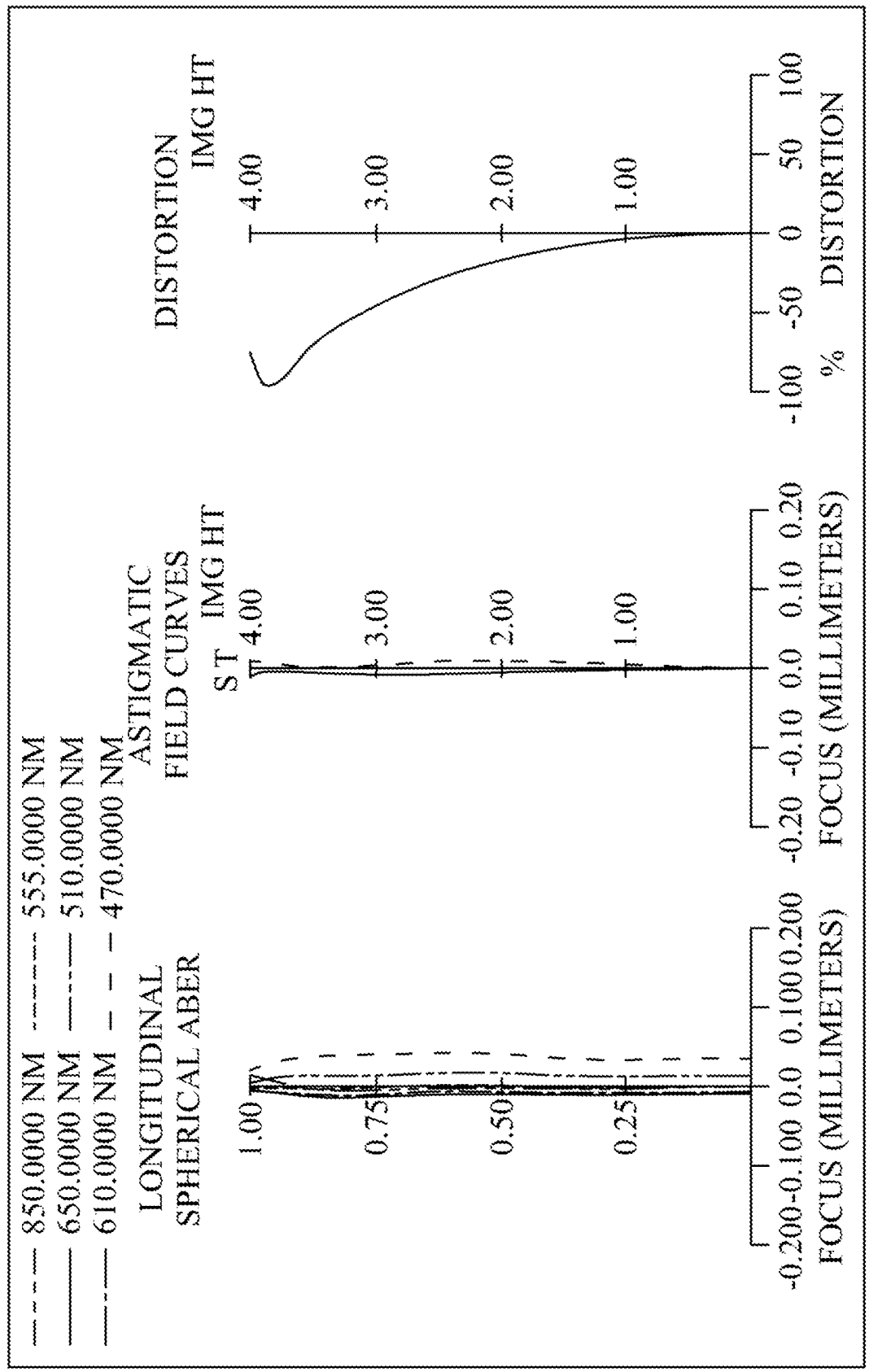
FIG. 4B shows curve diagrams of longitudinal spherical aberration, astigmatic field, and optical distortion of the optical image capturing system with thin mounting components of the fourth embodiment of the present invention in the order from left to right.
Figure 4C:
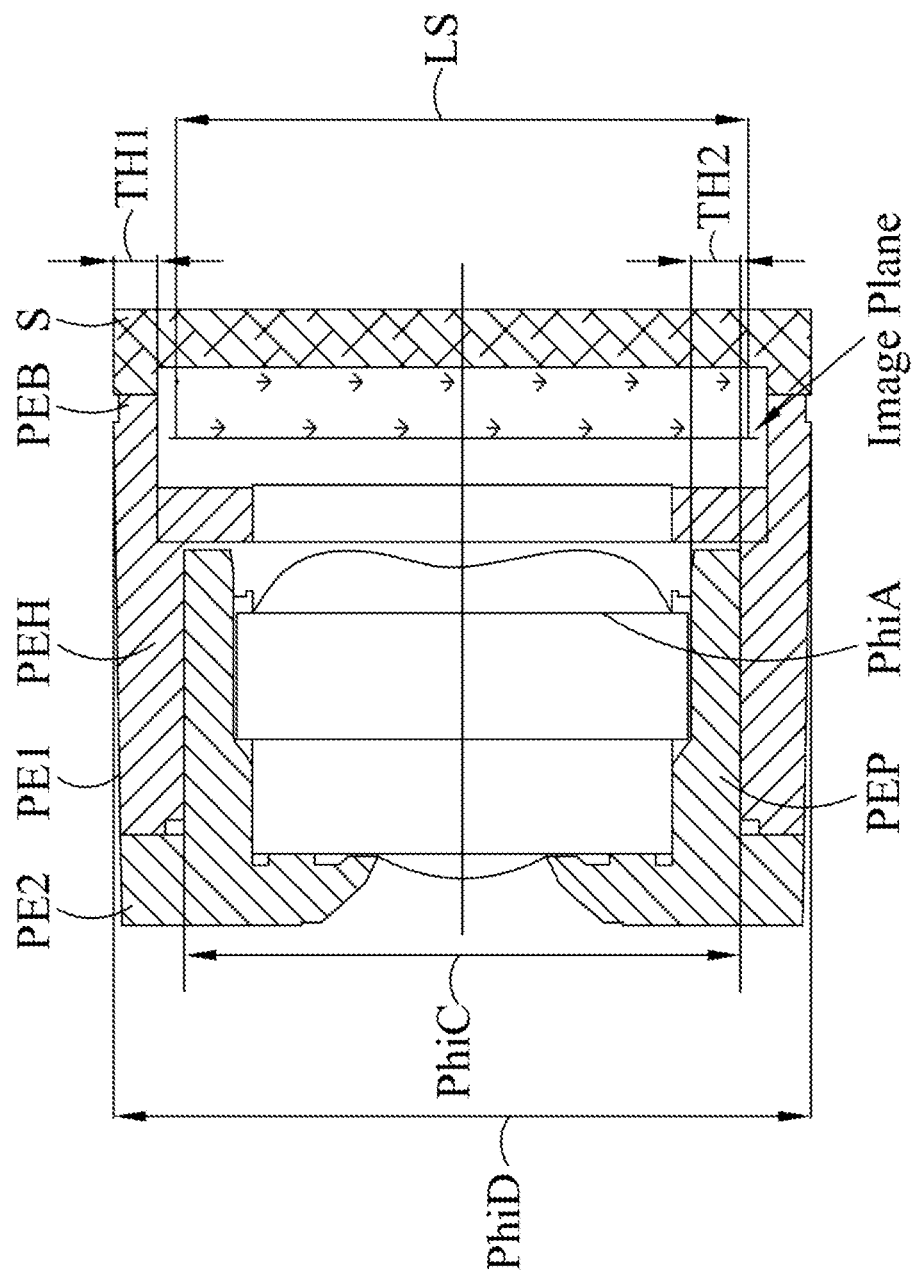
FIG. 4C is a schematic diagram depicting an assembly of a first lens positioning element and a second lens positioning element of the optical image capturing system with thin mounting components of the fourth embodiment of the present invention.

Please refer to FIG. 4A and FIG. 4B. FIG. 4A is a schematic diagram of an optical imaging lens set of an optical image capturing system with thin mounting components of a fourth embodiment of the present invention; FIG. 4B shows the curve diagrams of longitudinal spherical aberration, astigmatic field, and optical distortion of the optical image capturing system with thin mounting components of the fourth embodiment of the present invention in the order from left to right. FIG. 4C is a schematic diagram depicting an assembly of a first lens positioning element and a second lens positioning element of the optical image capturing system with thin mounting components of the fourth embodiment of the present invention. An external side of the positioning portion PEP does not contact the inner sides (a thread-less design is employed in the present embodiment) of the lens mount PEH. Furthermore, the manner of dispensing adhesive on the object side is selectively performed so as to make the first lens positioning element PE1 and the second lens positioning element PE2 bonded and fixed.

As shown in FIG. 4A, in the order from the object side to the image side, the optical image capturing system with thin mounting components 40 includes a first lens 410, a second lens 420, a third lens 430, an aperture 400 a fourth lens 440, a fifth lens 450, an infrared filter 480, an image plane 490, and an image sensing device 492.

The first lens 410 has negative refractive power and is made of a glass material. An object side 412 of the first lens 410 is a convex surface, and an image side 414 of the first lens 410 is a concave surface. Both the object side 412 and the image side 414 of the first lens 410 are spherical.

The second lens 420 has negative refractive power and is made of a plastic material. An object side surface 422 of the second lens 420 is a concave surface, and an image-side surface 424 of the second lens 420 is a concave surface. Both the object side 422 and the image side 424 of the second lens 420 are aspheric. The object side 422 of the second lens 420 has one inflection point.

The third lens 430 has positive refractive power and is made of plastic material. An object side 432 of the third lens 430 is a convex surface, and an image side 434 of the third lens 430 is a convex surface. Both the object side 432 and the image side 434 of the third lens 430 are aspheric. And the object side 432 of the third lens 430 has one inflection point.

The fourth lens 440 has positive refractive power and is made of a plastic material. An object side 442 of the fourth lens 440 is a convex surface, and an image side 444 of the fourth lens 440 is a convex surface. Both the object side 442 and the image side 444 of the fourth lens 440 are aspheric. The object side 442 of the fourth lens 440 has one inflection point.

The fifth lens 450 has negative refractive power and is made of a plastic material. An object side 452 of the fifth lens 450 is a concave surface, and an image side 454 of the fifth lens 450 is a concave surface. Both the object side 452 and the image side 454 of the fifth lens 450 are aspheric. The object side 452 of the fifth lens 450 has two inflection points. This configuration is beneficial for shortening the back focal distance of the optical image capturing system with thin mounting components so as allow for miniaturization.

The infrared filter 480 is made of a glass material and is disposed between the fifth lens 450 and the image plane 490. The infrared filter 480 does not affect the focal length of the optical image capturing system with thin mounting components.

The parameters of the lenses of the fourth embodiment are listed in Table 7 and Table 8.

TABLE 7

Lens Parameters for the Fourth Embodiment
f(focal length) = 2.7883 mm; f/HEP = 1.8; HAF(half angle of view) = 101 deg

| Surface No | Curvature Radius | Thickness (mm) | Material | Refractive Index | Coefficient of Dispersion | Focal Length |
|---|---|---|---|---|---|---|
| 0 | Object | 1E+18 | 1E+18 | | | |
| 1 | First Lens | 76.84219 | 6.117399 | Glass | 1.497 | 81.61 | −31.322 |
| 2 | | 12.62555 | 5.924382 | | | | |
| 3 | Second Lens | −37.0327 | 3.429817 | Plastic | 1.565 | 54.5 | −8.70843 |
| 4 | | 5.88556 | 5.305191 | | | | |
| 5 | Third Lens | 17.99395 | 14.79391 | Plastic | 1.565 | 58 | 9.94787 |
| 6 | | −5.76903 | −0.4855 | | | | |
| 7 | Aperture | 1E+18 | 0.535498 | | | | |
| 8 | Fourth Lens | 8.19404 | 4.011739 | Plastic | 1.565 | 58 | 5.24898 |
| 9 | | −3.84363 | 0.050366 | | | | |
| 10 | Fifth Lens | −4.34991 | 2.088275 | Plastic | 1.661 | 20.4 | −4.97515 |
| 11 | | 16.6609 | 0.6 | | | | |
| 12 | Infrared filter | 1E+18 | 0.5 | BK_7 | 1.517 | 64.13 | |
| 13 | | 1E+18 | 3.254927 | | | | |
| 14 | Image Plane | 1E+18 | −0.00013 | | | | |

Reference Wavelength = 555 nm

TABLE 8

Coefficients of the aspheric surfaces of the fourth embodiment
Table 8: Aspheric Coefficients

| Surface No | 1 | 2 | 3 | 4 | 5 | 6 | 8 |
|---|---|---|---|---|---|---|---|
| k | 0.000000E+00 | 0.000000E+00 | 0.131249 | −0.069541 | −0.324555 | 0.009216 | −0.292346 |
| A4 | 0.000000E+00 | 0.000000E+00 | 3.99823E−05 | −8.55712E−04 | −9.07093E−04 | 8.80963E−04 | −1.02138E−03 |
| A6 | 0.000000E+00 | 0.000000E+00 | 9.03636E−08 | −1.96175E−06 | −1.02465E−05 | 3.14497E−05 | −1.18559E−04 |
| A8 | 0.000000E+00 | 0.000000E+00 | 1.91025E−09 | −1.39344E−08 | −8.18157E−08 | −3.15863E−06 | 1.34404E−05 |
| A10 | 0.000000E+00 | 0.000000E+00 | −1.18567E−11 | −4.17090E−09 | −2.42621E−09 | 1.44613E−07 | −2.80681E−06 |
| A12 | 0.000000E+00 | 0.000000E+00 | 0.000000E+00 | 0.000000E+00 | 0.000000E+00 | 0.000000E+00 | 0.000000E+00 |

| Surface No | 9 | 10 | 11 |
|---|---|---|---|
| k | −0.18604 | −6.17195 | 27.541383 |
| A4 | 4.33629E−03 | 1.58379E−03 | 7.56932E−03 |
| A6 | −2.91588E−04 | −1.81549E−04 | −7.83858E−04 |
| A8 | 9.11419E−06 | −1.18213E−05 | 4.79120E−05 |
| A10 | 1.28365E−07 | 1.92716E−06 | −1.73591E−06 |
| A12 | 0.000000E+00 | 0.000000E+00 | 0.000000E+00 |

An equation of the aspheric surfaces of the fourth embodiment is the same as that of the first embodiment, and the definitions are the same as well.

The conditional values of the fourth embodiment based on Table 7 and Table 8 are listed in the following table:

| Fourth Embodiment (Primary Reference Wavelength = 555 nm) | | | | | |
|---|---|---|---|---|---|
| |f/f1| | |f/f2| | |f/f3| | |f/f4| | |f/f5| | |f1/f2| |
| 0.08902 | 0.32019 | 0.28029 | 0.53121 | 0.56045 | 3.59674 |
| ΣPPR | ΣNPR | ΣPPR/|ΣNPR| | IN12/f | IN45/f | |f2/f3| |
| 1.4118 | 0.3693 | 3.8229 | 2.1247 | 0.0181 | 0.8754 |
| TP3/(IN23 + TP3 + IN34) | | (TP1 + IN12)/TP2 | | (TP5 + IN45)/TP4 | |
| 0.73422 | | 3.51091 | | 0.53309 | |
| HOS | InTL | HOS/HOI | InS/HOS | ODT % | TDT % |
| 46.12590 | 41.77110 | 11.53148 | 0.23936 | −125.266 | 99.1671 |
| HVT41 | HVT42 | HVT51 | HVT52 | HVT52/HOI | HVT52/HOS |
| 0.00000 | 0.00000 | 0.00000 | 0.00000 | 0.00000 | 0.00000 |
| | | | | | |InRS52|/ |
| TP2/TP3 | TP3/TP4 | InRS51 | InRS52 | |InRS51|/TP5 | TP5 |
| 0.23184 | 3.68765 | −0.679265 | 0.5369 | 0.32528 | 0.25710 |
| PhiA | PhiC | PhiD | TH1 | TH2 | HOI |
| 5.598 mm | 5.858 mm | 6.118 mm | 0.13 mm | 0.13 mm | 4 mm |
| | | (TH1 + TH2)/ HOI | (TH1 + TH2)/ HOS | 2(TH1 + TH2)/ PhiA | |
| PhiA/PhiD | TH1 + TH2 | | | | InTL/HOS |
| 0.9150 | 0.26 mm | 0.065 | 0.0056 | 0.0929 | 0.90558 |

Values related to the lengths of the outline curves of the fourth embodiment based on Table 7 and Table 8 are listed in the following table:

| Fourth embodiment (Primary Reference wavelength: 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.775 | 0.774 | −0.00052 | 99.93% | 6.117 | 12.65% |
| 12 | 0.775 | 0.774 | −0.00005 | 99.99% | 6.117 | 12.66% |
| 21 | 0.775 | 0.774 | −0.00048 | 99.94% | 3.430 | 22.57% |
| 22 | 0.775 | 0.776 | 0.00168 | 100.22% | 3.430 | 22.63% |
| 31 | 0.775 | 0.774 | −0.00031 | 99.96% | 14.794 | 5.23% |
| 32 | 0.775 | 0.776 | 0.00177 | 100.23% | 14.794 | 5.25% |
| 41 | 0.775 | 0.775 | 0.00059 | 100.08% | 4.012 | 19.32% |
| 42 | 0.775 | 0.779 | 0.00453 | 100.59% | 4.012 | 19.42% |
| 51 | 0.775 | 0.778 | 0.00311 | 100.40% | 2.088 | 37.24% |
| 52 | 0.775 | 0.774 | −0.00014 | 99.98% | 2.088 | 37.08% |
| ARS | EHD | ARS value | ARE − EHD | (ARS/EHD)% | TP | ARS/TP (%) |
| 11 | 23.038 | 23.397 | 0.359 | 101.56% | 6.117 | 382.46% |
| 12 | 10.140 | 11.772 | 1.632 | 116.10% | 6.117 | 192.44% |
| 21 | 10.138 | 10.178 | 0.039 | 100.39% | 3.430 | 296.74% |
| 22 | 5.537 | 6.337 | 0.800 | 114.44% | 3.430 | 184.76% |
| 31 | 4.490 | 4.502 | 0.012 | 100.27% | 14.794 | 30.43% |
| 32 | 2.544 | 2.620 | 0.076 | 102.97% | 14.794 | 17.71% |
| 41 | 2.735 | 2.759 | 0.024 | 100.89% | 4.012 | 68.77% |
| 42 | 3.123 | 3.449 | 0.326 | 110.43% | 4.012 | 85.97% |
| 51 | 2.934 | 3.023 | 0.089 | 103.04% | 2.088 | 144.74% |
| 52 | 2.799 | 2.883 | 0.084 | 103.00% | 2.088 | 138.08% |

The results of the equations of the fourth embodiment based on Table 7 and Table 8 are listed in the following table:

| Values related to the inflection points of the fourth embodiment (Reference wavelength: 555 nm) | | | | | | |
|---|---|---|---|---|---|---|
| HIF211 | 6.3902 | HIF211/HOI | 1.5976 | SGI211 | −0.4793 | | SGI211 | /( | SGI211 | + TP2) | 0.1226 |
| HIF311 | 2.1324 | HIF311/HOI | 0.5331 | SGI311 | 0.1069 | | SGI311 | /( | SGI311 | + TP3) | 0.0072 |
| HIF411 | 2.0278 | HIF411/HOI | 0.5070 | SGI411 | 0.2287 | | SGI411 | /( | SGI411 | + TP4) | 0.0539 |
| HIF511 | 2.6253 | HIF511/HOI | 0.6563 | SGI511 | −0.5681 | | SGI511 | /( | SGI511 | + TP5) | 0.2139 |
| HIF512 | 2.1521 | HIF512/HOI | 0.5380 | SGI512 | −0.8314 | | SGI512 | /( | SGI512 | + TP5) | 0.2848 |

Fifth Embodiment

Figure 5A:
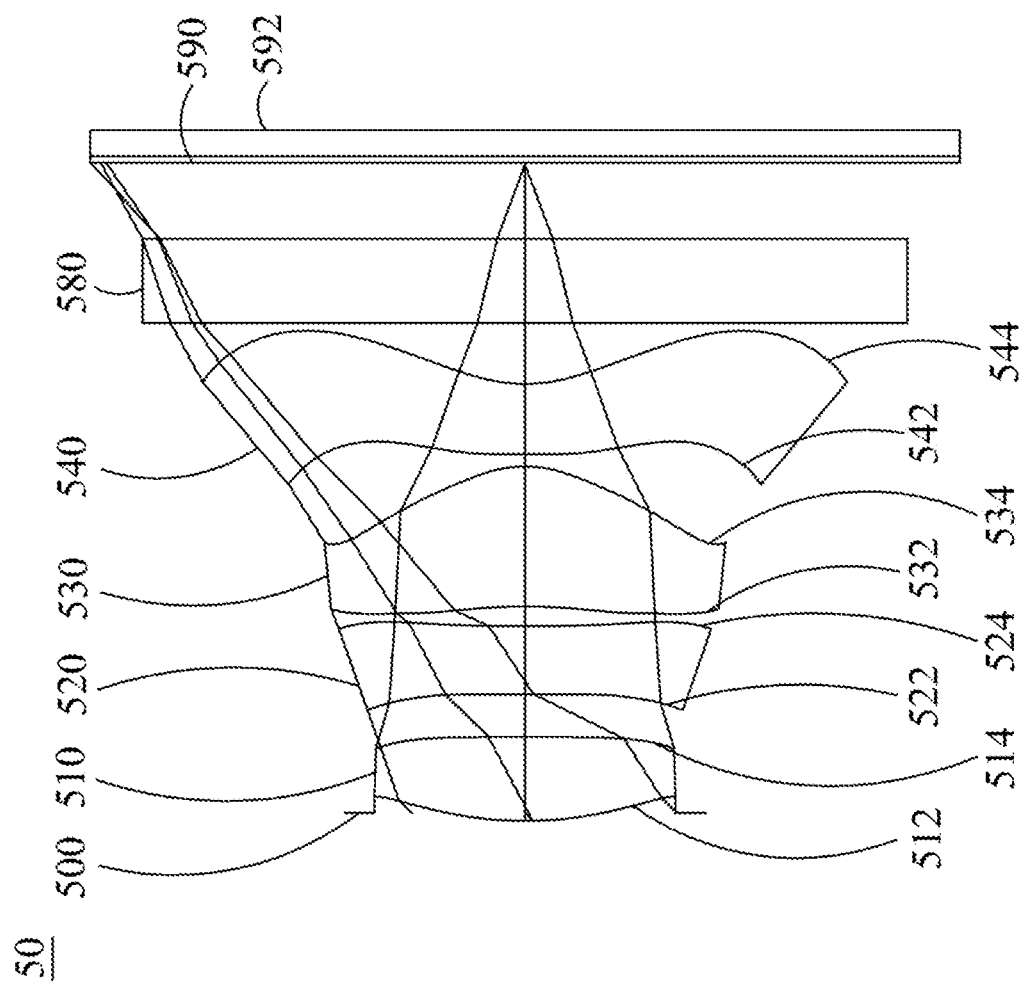
FIG. 5A is a schematic diagram of an optical image capturing system with thin mounting components of a fifth embodiment of the present invention.
Figure 5B:
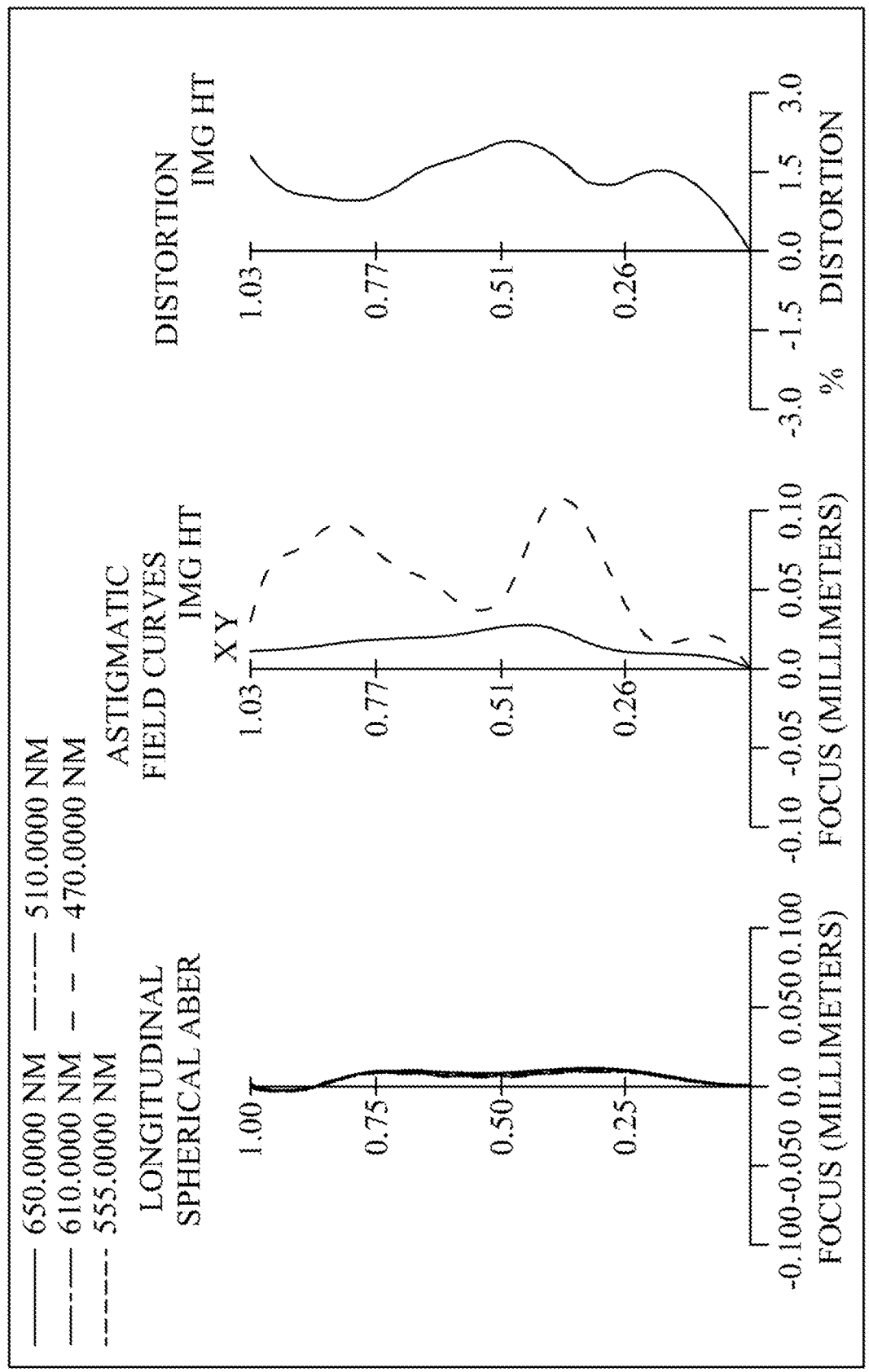
FIG. 5B shows curve diagrams of longitudinal spherical aberration, astigmatic field, and optical distortion of the optical image capturing system with thin mounting components of the fifth embodiment of the present invention in the order from left to right.
Figure 5C:
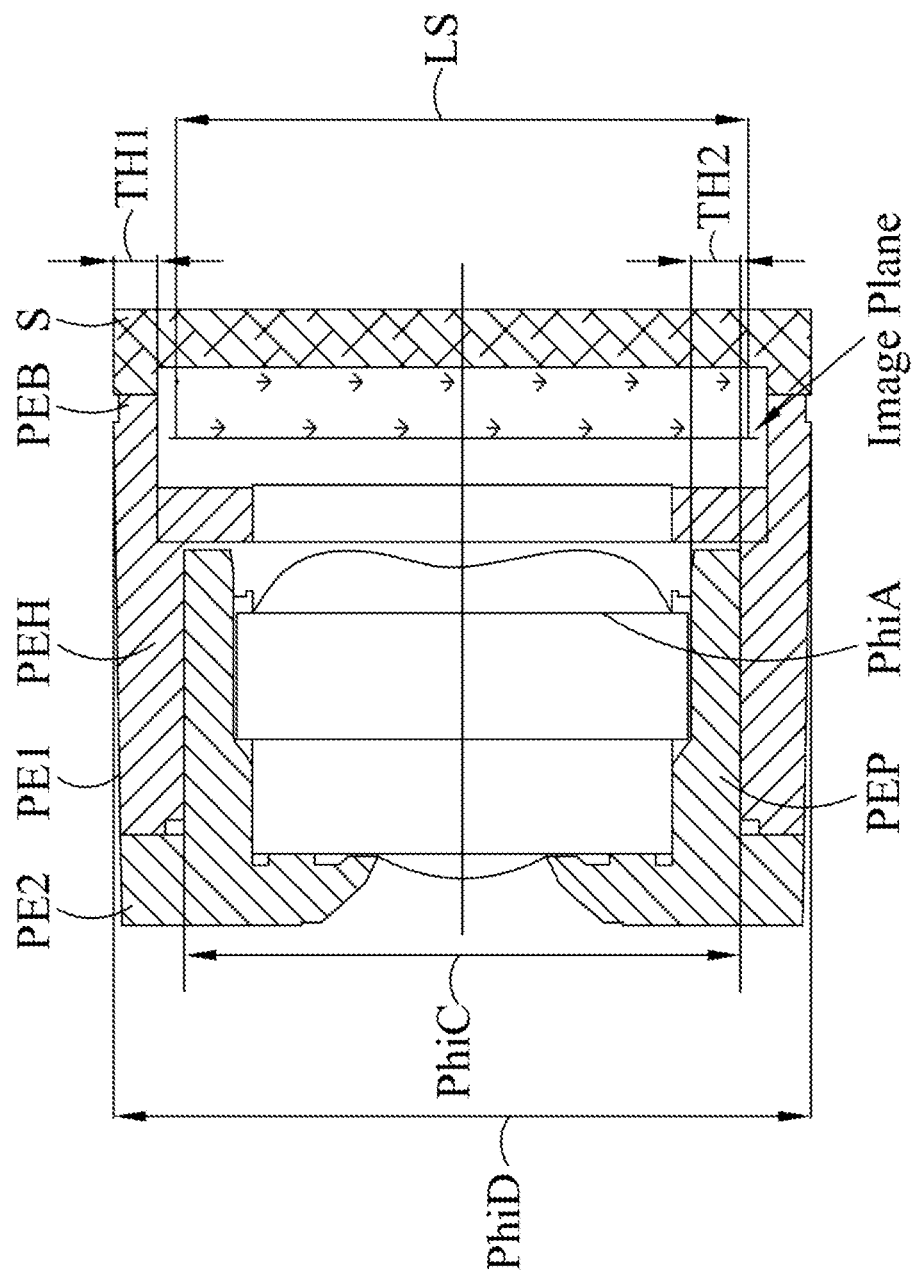
FIG. 5C is a schematic diagram depicting an assembly of a first lens positioning element and a second lens positioning element of the optical image capturing system with thin mounting components of the fifth embodiment of the present invention.

Please refer FIG. 5A and FIG. 5B. FIG. 5A is a schematic diagram of an optical imaging lens set of the optical image capturing system with thin mounting components of a fifth embodiment of the present invention; FIG. 5B shows the curve diagrams of longitudinal spherical aberration, astigmatic field, and optical distortion of the optical image capturing system with thin mounting components of the fifth embodiment of the present invention in the order from left to right. FIG. 5C is a schematic diagram depicting an assembly of a first lens positioning element and a second lens positioning element of the optical image capturing system with thin mounting components of the fifth embodiment of the present invention. An external side of the positioning portion PEP does not contact the inner sides (a thread-less design is employed in the present embodiment) of the lens mount PEH. Furthermore, the manner of dispensing adhesive on the object side is selectively performed so as to make the first lens positioning element PE1 and the second lens positioning element PE2 bonded and fixed.

As shown in FIG. 5A, in the order from the object side to the image side, the optical image capturing system with thin mounting components 50 includes an aperture 500, a first lens 510, a second lens 520, a third lens 530, a fourth lens 540, an image plane 580, and an image sensing device 590.

The first lens 510 has positive refractive power and is made of a plastic material. An object side 512 of the first lens 510 is a convex surface, and an image side 514 of the first lens 510 is a convex surface. Both the object side 512 and image side 514 of the first lens 510 are aspheric. The object side 512 of the first lens 510 has one inflection point.

The second lens 520 has negative refractive power and is made of a plastic material. An object side 522 of the second lens 520 is a concave surface, and an image side 524 of the second lens 520 is a concave surface. Both the object side 522 and image side 524 of the second lens 520 are aspheric. The object side 522 of the second lens 520 has two inflection points and the image side 524 of the second lens 520 has one inflection point.

The third lens 530 has positive refractive power and is made of a plastic material. An object side surface 532 of the third lens 530 is a concave surface, and an image side 534 of the third lens 530 is a convex surface. Both the object side 532 and image side 534 of the third lens 530 are aspheric. The object side 532 of the third lens 530 has three inflection points and the image side 534 of the third lens 530 has one inflection point.

The fourth lens 540 has negative refractive power and is made of a plastic material. An object side 542 of the fourth lens 540 is a concave surface, and an image side 544 of the fourth lens 540 is a concave surface. Both the object side 542 and image side 544 of the fourth lens 540 are aspheric. The object side 542 of the fourth lens 540 has two inflection points and the image side 544 of the fourth lens 540 has one inflection point.

The infrared filter 570 is made of a glass material and disposed between the fourth lens 540 and the image plane 580. The infrared filter 570 does not affect the focal length of the optical image capturing system with thin mounting components.

The parameters of the lenses of the fifth embodiment are listed in Table 9 and Table 10.

TABLE 9

Lens Parameters for the Fifth Embodiment
f(focal length) = 1.04102 mm; f/HEP = 1.4; HAF(half angle of view) = 44.0346 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 600 | | | | |
| 1 | Aperture | 1E+18 | −0.020 | | | | |
| 2 | First Lens | 0.890166851 | 0.210 | Plastic | 1.545 | 55.96 | 1.587 |
| 3 | | −29.11040115 | −0.010 | | | | |
| 4 | | 1E+18 | 0.116 | | | | |
| 5 | Second Lens | 10.67765398 | 0.170 | Plastic | 1.642 | 22.46 | −14.569 |
| 6 | | 4.977771922 | 0.049 | | | | |
| 7 | Third Lens | −1.191436932 | 0.349 | Plastic | 1.545 | 55.96 | 0.510 |
| 8 | | −0.248990674 | 0.030 | | | | |
| 9 | Fourth Lens | −38.08537212 | 0.176 | Plastic | 1.642 | 22.46 | −0.569 |
| 10 | | 0.372574476 | 0.152 | | | | |
| 11 | Infrared filter | 1E+18 | 0.210 | BK_7 | 1.517 | 64.13 | |
| 12 | | 1E+18 | 0.185 | | | | |
| 13 | Image Plane | 1E+18 | 0.005 | | | | |

Reference Wavelength = 555 nm; Shield Position: The 4th surface with effective aperture radius = 0.360 mm

TABLE 10

Coefficients of the aspheric surfaces of fifth embodiment
Table 10: Aspheric Coefficients

| Surface No. | 2 | 3 | 5 | 6 | 7 | 8 |
|---|---|---|---|---|---|---|
| k = | −1.106629E+00 | 2.994179E−07 | −7.788754E+01 | −3.440335E+01 | −8.522097E−01 | −4.735945E+00 |
| A4 = | 8.291155E−01 | −6.401113E−01 | −4.958114E+00 | −1.875957E+00 | −4.878227E−01 | −2.490377E+00 |
| A6 = | −2.398799E+01 | −1.265726E+01 | 1.299769E+02 | 8.568480E+01 | 1.291242E+02 | 1.524149E+02 |
| A8 = | 1.825378E+02 | 8.457286E+01 | −2.736977E+03 | −1.279044E+03 | −1.979689E+03 | −4.841033E+03 |
| A10 = | −6.211133E+02 | −2.157875E+02 | 2.908537E+04 | 8.661312E+03 | 1.456076E+04 | 8.053747E+04 |
| A12 = | −4.719066E+02 | −6.203600E+02 | −1.499597E+05 | −2.875274E+04 | −5.975920E+04 | −7.936887E+05 |
| A14 = | 0.000000E+00 | 0.000000E+00 | 2.992026E+05 | 3.764871E+04 | 1.351676E+05 | 4.811528E+06 |
| A16 = | 0.000000E+00 | 0.000000E+00 | 0.000000E+00 | 0.000000E+00 | −1.329001E+05 | −1.762293E+07 |
| A18 = | 0.000000E+00 | 0.000000E+00 | 0.000000E+00 | 0.000000E+00 | 0.000000E+00 | 3.579891E+07 |
| A20 = | 0.000000E+00 | 0.000000E+00 | 0.000000E+00 | 0.000000E+00 | 0.000000E+00 | −3.094006E+07 |

| Surface No | 9 | 10 |
|---|---|---|
| k = | −2.277155E+01 | −8.039778E−01 |
| A4 = | 1.672704E+01 | −7.613206E+00 |
| A6 = | −3.260722E+02 | 3.374046E+01 |
| A8 = | 3.373231E+03 | −1.368453E+02 |
| A10 = | −2.177676E+04 | 4.049486E+02 |
| A12 = | 8.951687E+04 | −9.711797E+02 |
| A14 = | −2.363737E+05 | 1.942574E+03 |

TABLE 10-continued

Coefficients of the aspheric surfaces of fifth embodiment
Table 10: Aspheric Coefficients

| | | |
|---|---|---|
| A16 = | 3.983151E+05 | −2.876356E+03 |
| A18 = | −4.090689E+05 | 2.562386E+03 |
| A20 = | 2.056724E+05 | −9.943657E+02 |

An equation of the aspheric surfaces of the fifth embodiment is the same as that of the first embodiment, and the definitions are the same as well.

The conditional values of the fifth embodiment based on Table 9 and Table 10 are listed in the following table:

Fifth Embodiment (Primary Reference Wavelength = 555 nm)

| InRS41 | InRS42 | HVT41 | HVT42 | ODT % | TDT % |
|---|---|---|---|---|---|
| −0.07431 | 0.00475 | 0.00000 | 0.53450 | 2.09403 | 0.84704 |
| \|f/f1\| | \|f/f2\| | \|f/f3\| | \|f/f4\| | \|f1/f2\| | \|f2/f3\| |
| 0.65616 | 0.07145 | 2.04129 | 1.83056 | 0.10890 | 28.56826 |
| ΣPPR | ΣNPR | ΣPPR/\|ΣNPR\| | ΣPP | ΣNP | f1/ΣPP |
| 2.11274 | 2.48672 | 0.84961 | −14.05932 | 1.01785 | 1.03627 |
| f4/ΣNP | IN12/f | IN23/f | IN34/f | TP3/f | TP4/f |
| 1.55872 | 0.10215 | 0.04697 | 0.02882 | 0.33567 | 0.16952 |

Fifth Embodiment (Primary Reference Wavelength = 555 nm)

| InTL | HOS | HOS/HOI | InS/HOS | InTL/HOS | ΣTP/InTL |
|---|---|---|---|---|---|
| 1.09131 | 1.64329 | 1.59853 | 0.98783 | 0.66410 | 0.83025 |
| (TP1 + IN12)/TP2 | (TP4 + IN34)/TP3 | TP1/TP2 | TP3/TP4 | IN23 + TP3) | IN23/(TP2 + |
| 1.86168 | 0.59088 | 1.23615 | 1.98009 | 0.08604 | |
| \|InRS41\|/TP4 | \|InRS42\|/TP4 | HVT42/HOI | HVT42/HOS | | |
| 0.4211 | 0.0269 | 0.5199 | 0.3253 | | |
| PhiA | PhiC | PhiD | TH1 | TH2 | HOI |
| 1.596 mm | 1.996 mm | 2.396 mm | 0.2 mm | 0.2 mm | 1.028 mm |
| PhiA/ PhiD | TH1 + TH2 | (TH1 + TH2)/ HOI | (TH1 + TH2)/ HOS | 2(TH1 + TH2)/ PhiA | |
| 0.7996 | 0.4 mm | 0.3891 | 0.2434 | 0.5013 | |

The results of the equations of the fifth embodiment based on Table 9 and Table 10 are listed in the following table:

Values related to the inflection points of the fifth embodiment
(Reference wavelength: 555 nm)

| | | | | | | | |
|---|---|---|---|---|---|---|---|
| HIF111 | 0.28454 | HIF111/HOI | 0.27679 | SGI111 | 0.04361 | \| SGI111 \| /( \| SGI111 \| + TP1) | 0.17184 |
| HIF211 | 0.04198 | HIF211/HOI | 0.04083 | SGI211 | 0.00007 | \| SGI211 \| /( \| SGI211 \| + TP2) | 0.00040 |
| HIF212 | 0.37903 | HIF212/HOI | 0.36871 | SGI212 | −0.03682 | \| SGI212 \| /( \| SGI212 \| + TP2) | 0.17801 |
| HIF221 | 0.25058 | HIF221/HOI | 0.24376 | SGI221 | 0.00695 | \| SGI221 \| /( \| SGI221 \| + TP2) | 0.03927 |
| HIF311 | 0.14881 | HIF311/HOI | 0.14476 | SGI311 | −0.00854 | \| SGI311 \| /( \| SGI311 \| + TP3) | 0.02386 |
| HIF312 | 0.31992 | HIF312/HOI | 0.31120 | SGI312 | −0.01783 | \| SGI312 \| /( \| SGI312 \| + TP3) | 0.04855 |
| HIF313 | 0.32956 | HIF313/HOI | 0.32058 | SGI313 | −0.01801 | \| SGI313 \| /( \| SGI313 \| + TP3) | 0.04902 |
| HIF321 | 0.36943 | HIF321/HOI | 0.35937 | SGI321 | −0.14878 | \| SGI321 \| /( \| SGI321 \| + TP3) | 0.29862 |
| HIF411 | 0.01147 | HIF411/HOI | 0.01116 | SGI411 | −0.00000 | \| SGI411 \| /( \| SGI411 \| + TP4) | 0.00001 |
| HIF412 | 0.22405 | HIF412/HOI | 0.21795 | SGI412 | 0.01598 | \| SGI412 \| /( \| SGI412 \| + TP4) | 0.08304 |
| HIF421 | 0.24105 | HIF421/HOI | 0.23448 | SGI421 | 0.05924 | \| SGI421 \| /( \| SGI421 \| + TP4) | 0.25131 |

Values related to the lengths of the outline curves of the fifth embodiment based on Table 9 and Table 10 are listed in the following table:

Fifth Embodiment (Primary Reference Wavelength = 555 nm)

| ARE | ½(HEP) | ARE value | ARE − ½(HEP) | 2(ARE/HEP) % | TP | ARE/TP (%) |
|---|---|---|---|---|---|---|
| 11 | 0.368 | 0.374 | 0.00578 | 101.57% | 0.210 | 178.10% |
| 12 | 0.366 | 0.368 | 0.00240 | 100.66% | 0.210 | 175.11% |
| 21 | 0.372 | 0.375 | 0.00267 | 100.72% | 0.170 | 220.31% |
| 22 | 0.372 | 0.371 | −0.00060 | 99.84% | 0.170 | 218.39% |
| 31 | 0.372 | 0.372 | −0.00023 | 99.94% | 0.349 | 106.35% |
| 32 | 0.372 | 0.404 | 0.03219 | 108.66% | 0.349 | 115.63% |
| 41 | 0.372 | 0.373 | 0.00112 | 100.30% | 0.176 | 211.35% |
| 42 | 0.372 | 0.387 | 0.01533 | 104.12% | 0.176 | 219.40% |
| ARS | EHD | ARS value | ARE − EHD | (ARS/EHD)% | TP | ARS/TP (%) |
| 11 | 0.368 | 0.374 | 0.00578 | 101.57% | 0.210 | 178.10% |
| 12 | 0.366 | 0.368 | 0.00240 | 100.66% | 0.210 | 175.11% |
| 21 | 0.387 | 0.391 | 0.00383 | 100.99% | 0.170 | 229.73% |
| 22 | 0.458 | 0.460 | 0.00202 | 100.44% | 0.170 | 270.73% |
| 31 | 0.476 | 0.478 | 0.00161 | 100.34% | 0.349 | 136.76% |
| 32 | 0.494 | 0.538 | 0.04435 | 108.98% | 0.349 | 154.02% |
| 41 | 0.585 | 0.624 | 0.03890 | 106.65% | 0.176 | 353.34% |
| 42 | 0.798 | 0.866 | 0.06775 | 108.49% | 0.176 | 490.68% |

Sixth Embodiment

Figure 6A:
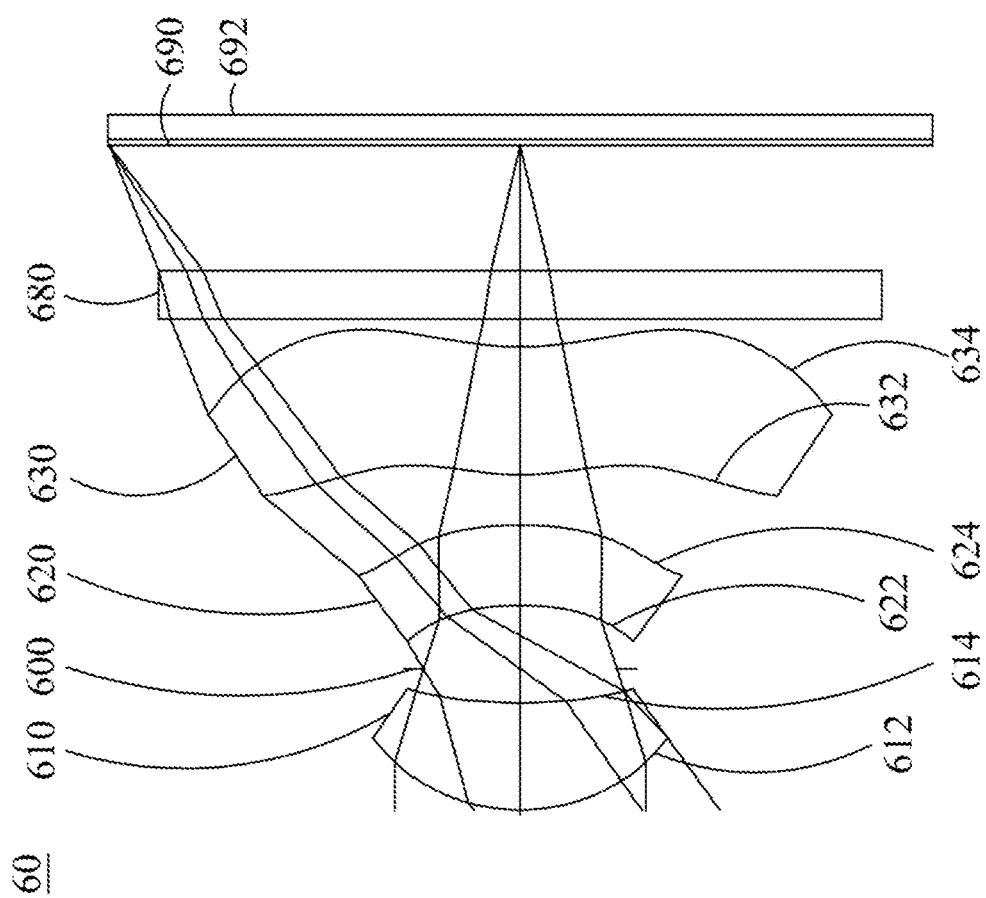
FIG. 6A is a schematic diagram of an optical image capturing system with thin mounting components of a sixth embodiment of the present invention.
Figure 6B:
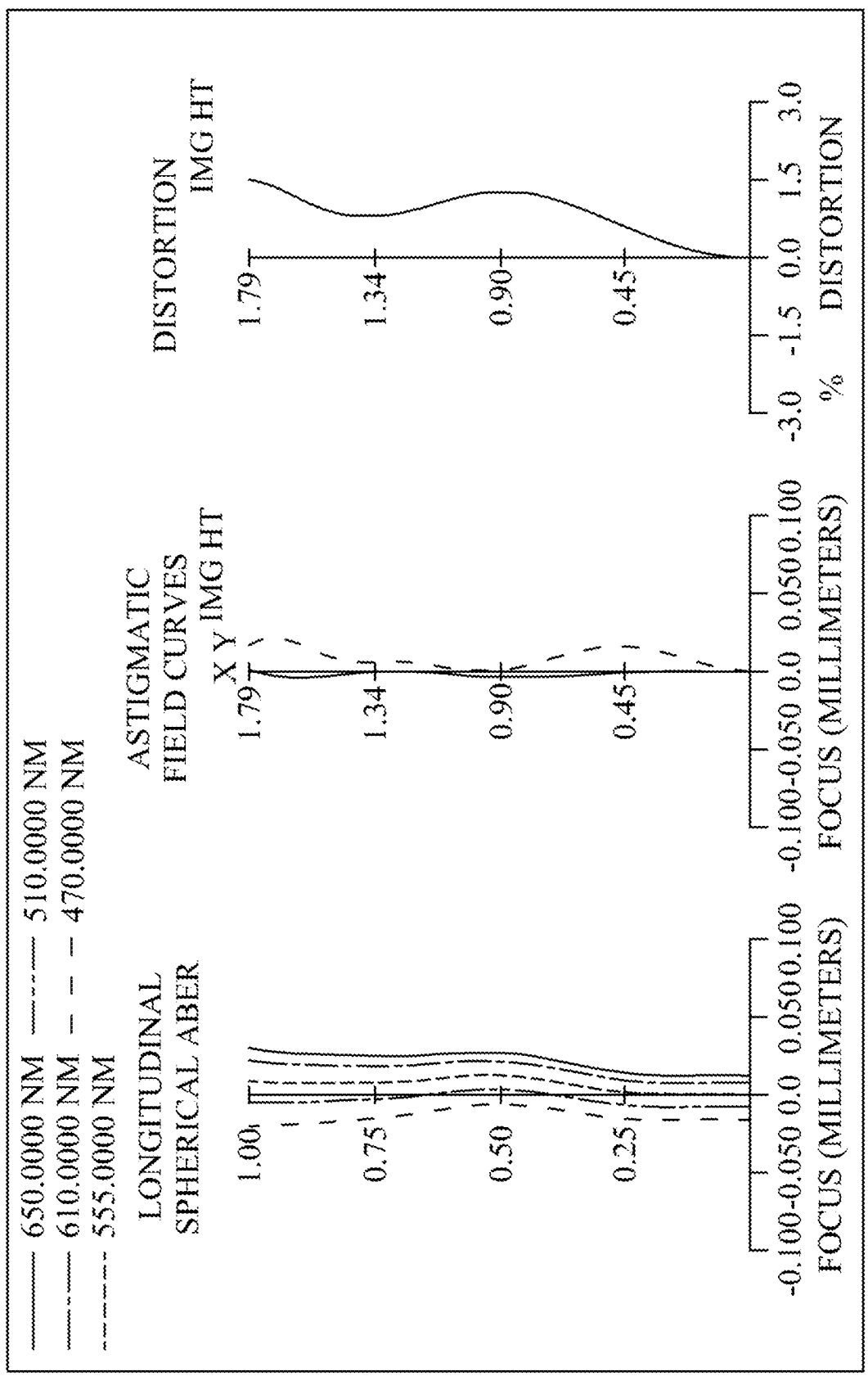
FIG. 6B shows curve diagrams of longitudinal spherical aberration, astigmatic field, and optical distortion of the optical image capturing system with thin mounting components of the sixth embodiment of the present invention in the order from left to right.
Figure 6C:
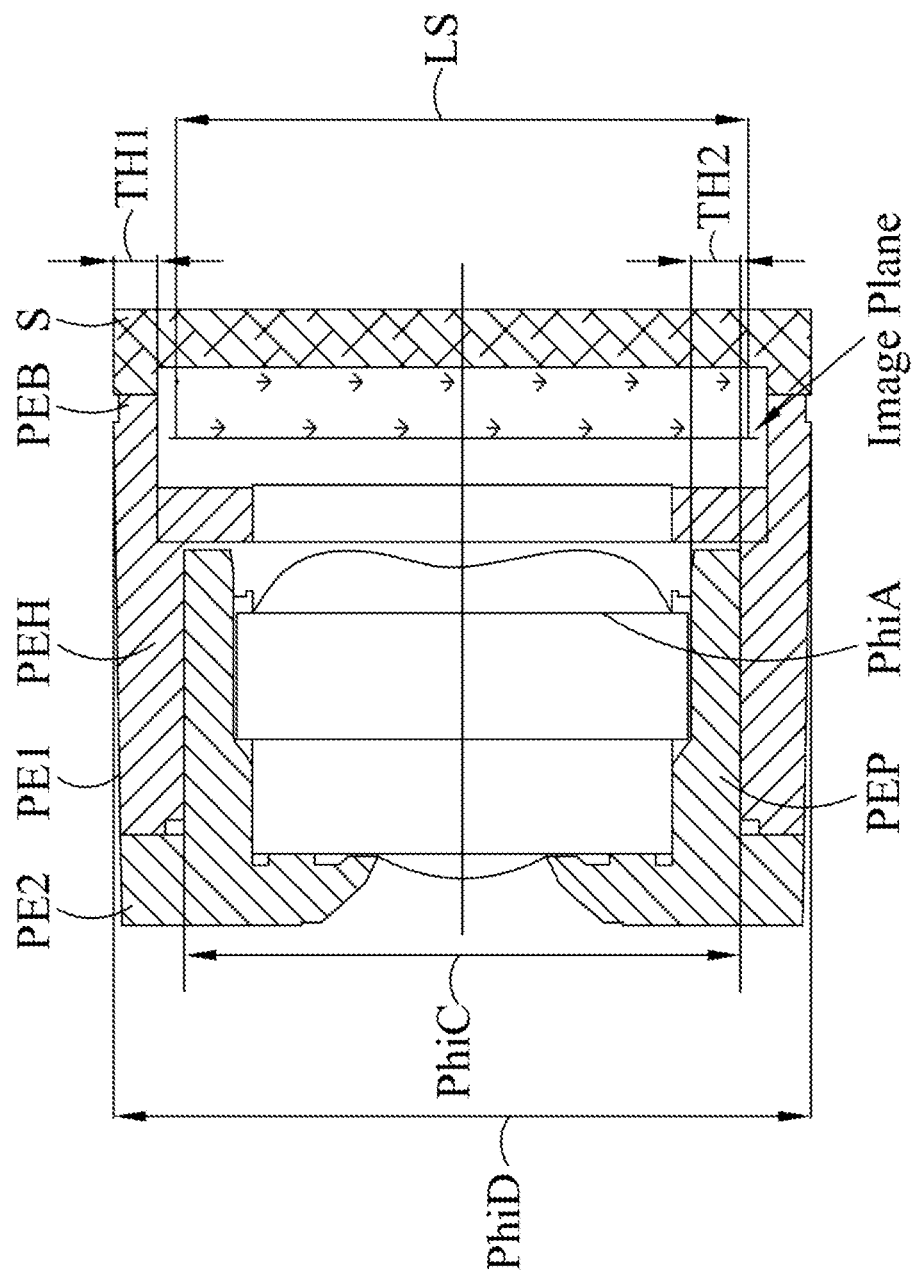
FIG. 6C is a schematic diagram depicting an assembly of a first lens positioning element and a second lens positioning element of the optical image capturing system with thin mounting components of the sixth embodiment of the present invention.

Please refer to FIG. 6A and FIG. 6B. FIG. 6A is a schematic diagram of an optical imaging lens set of an optical image capturing system with thin mounting components of the sixth embodiment of the present invention; FIG. 6B shows the curve diagrams of longitudinal spherical aberration, astigmatic field, and optical distortion of the optical image capturing system with thin mounting components of the sixth embodiment of the present invention in the order from left to right. FIG. 6C is a schematic diagram depicting an assembly of a first lens positioning element and a second lens positioning element of the optical image capturing system with thin mounting components of the sixth embodiment of the present invention. An external side of the positioning portion PEP does not contact the inner sides (a thread-less design is employed in the present embodiment) of the lens mount PEH. Furthermore, the manner of dispensing adhesive on the object side is selectively performed so as to make the first lens positioning element PE1 and the second lens positioning element PE2 bonded and fixed.

As shown in FIG. 6A, in the order from the object side to the image side, the optical image capturing system with thin mounting components 60 includes a first lens 610, an aperture 600, a second lens 620, a third lens 630, an image plane 680, and an image sensing element 690.

The first lens 610 has positive refractive power and is made of a plastic material. An object side 612 of the first lens 610 is a convex surface, and an image side 614 of the first lens 610 is a concave surface. Both the object side 612 and the image side 614 of the first lens 610 are aspheric.

The second lens 620 has negative refractive power and is made of a plastic material. An object side 622 of the second lens 620 is a concave surface, and an image side surface 624 of the second lens 620 is a convex surface. Both the object side 622 and the image side 624 of the second lens 620 are aspheric. The image side 624 of the second lens 620 has one inflection point.

The third lens 630 has positive refractive power and is made of a plastic material. An object side 632 of the third lens 630 is a concave surface, and an image side 634 of the third lens 630 is a convex surface. Both the object side 632 and the image side 634 of the third lens 630 are aspheric. The object side 632 of the third lens 630 has two inflection points and the image side 634 of the third lens 630 has one inflection point.

The infrared filter 670 is made of a glass material and disposed between the third lens 630 and the image plane 680. The infrared filter 670 does not affect the focal length of the optical image capturing system with thin mounting components.

The parameters of the lenses of the sixth embodiment are listed in Table 11 and Table 12.

TABLE 11

Lens Parameters for the Sixth Embodiment
f(focal length) = 2.41135 mm; f/HEP = 2.22; HAF(half angle of view) = 36 deg

| Surface No | | Curvature Radius | Thickness (mm) | Material | Refractive Index | Coefficient of Dispersion | Focal Length |
|---|---|---|---|---|---|---|---|
| 0 | Object | 1E+18 | 600 | | | | |
| 1 | First Lens | 0.840352226 | 0.468 | Plastic | 1.535 | 56.27 | 2.232 |
| 2 | | 2.271975602 | 0.148 | | | | |
| 3 | Aperture | 1E+18 | 0.277 | | | | |
| 4 | Second Lens | −1.157324239 | 0.349 | Plastic | 1.642 | 22.46 | −5.221 |
| 5 | | −1.968404008 | 0.221 | | | | |
| 6 | Third Lens | 1.151874235 | 0.559 | Plastic | 1.544 | 56.09 | 7.360 |
| 7 | | 1.338105159 | 0.123 | | | | |
| 8 | Infrared filter | 1E+18 | 0.210 | BK7 | 1.517 | 64.13 | |
| 9 | | 1E+18 | 0.547 | | | | |
| 10 | Image Plane | 1E+18 | 0.000 | | | | |

Reference Wavelength = 555 nm; Shield Position: The 1st surface with effective aperture radius = 0.640 mm

TABLE 12

Coefficients of the aspheric surfaces of the sixth embodiment
Table 12: Aspheric Coefficients

| Surface No | 1 | 2 | 4 | 5 | 6 | 7 |
|---|---|---|---|---|---|---|
| k = | −2.019203E−01 | 1.528275E+01 | 3.743939E+00 | −1.207814E+01 | −1.276860E+01 | −3.034004E+00 |
| A4 = | 3.944883E−02 | −1.670490E−01 | −4.266331E−01 | −1.696843E+00 | −7.396546E−01 | −5.308488E−01 |
| A6 = | 4.774062E−01 | 3.857435E+00 | −1.423859E+00 | 5.164775E+00 | 4.449101E−01 | 4.374142E−01 |
| A8 = | −1.528780E+00 | −7.091408E+01 | 4.119587E+01 | −1.445541E+01 | 2.622372E−01 | −3.111192E−01 |
| A10 = | 5.133947E+00 | 6.365801E+02 | −3.456462E+02 | 2.876958E+01 | −2.510946E−01 | 1.354257E−01 |
| A12 = | −6.250496E+00 | −3.141002E+03 | 1.495452E+03 | −2.662400E+01 | −1.048030E−01 | −2.652902E−02 |
| A14 = | 1.068803E+00 | 7.962834E+03 | −2.747802E+03 | 1.661634E+01 | 1.462137E−01 | −1.203306E−03 |
| A16 = | 7.995491E+00 | −8.268637E+03 | 1.443133E+03 | −1.327827E+01 | −3.676651E−02 | 7.805611E−04 |

An equation of the aspheric surfaces of the sixth embodiment is the same as that of the first embodiment, and the definitions are the same as well.

The conditional values of the sixth embodiment based on Table 11 and Table 12 are listed in the following table:

| \|f/f1\| | \|f/f2\| | \|f/f3\| | \|f1/f2\| | \|f2/f3\| | TP1/TP2 |
|---|---|---|---|---|---|
| 1.08042 | 0.46186 | 0.32763 | 2.33928 | 1.40968 | 1.33921 |
| ΣPPR | ΣNPR | ΣPPR/\|ΣNPR\| | IN12/f | IN23/f | TP2/TP3 |
| 1.40805 | 0.46186 | 3.04866 | 0.17636 | 0.09155 | 0.62498 |
| TP2/(IN12 + TP2 + IN23) | | (TP1 + IN12)/TP2 | | (TP3 + IN23)/TP2 | |
| 0.35102 | | 2.23183 | | 2.23183 | |
| HOS | InTL | HOS/HOI | InS/HOS | \|ODT\|% | \|TDT\|% |
| 2.90175 | 2.02243 | 1.61928 | 0.78770 | 1.50000 | 0.71008 |
| HVT21 | HVT22 | HVT31 | HVT32 | HVT32/HOI | HVT32/HOS |
| 0.00000 | 0.00000 | 0.46887 | 0.67544 | 0.37692 | 0.23277 |
| PhiA | PhiC | PhiD | TH1 | TH2 | HOI |
| 2.716 mm | 3.116 mm | 3.616 mm | 0.25 mm | 0.2 mm | 1.792 mm |
| | | | (TH1 + TH2)/ | (TH1 + TH2)/ | 2(TH1 + TH2)/ |
| PhiA/PhiD | TH1 + TH2 | HOI | HOS | PhiA | InTL/HOS |
| 0.7511 | 0.45 mm | 0.2511 | 0.1551 | 0.3314 | 0.69696 |

Sixth Embodiment (Primary Reference Wavelength = 555 nm)

The results of the equations of the sixth embodiment based on Table 11 and Table 12 are listed in the following table:

Values related to the inflection points of the sixth embodiment (Reference wavelength: 555 nm)

| HIF221 | 0.5599 | HIF221/HOI | 0.3125 | SGI221 | −0.1487 | \| SGI221 \|/(\| SGI221 \| + TP2) | 0.2412 |
|---|---|---|---|---|---|---|---|
| HIF311 | 0.2405 | HIF311/HOI | 0.1342 | SGI311 | 0.0201 | \| SGI311 \|/(\| SGI311 \| + TP3) | 0.0413 |
| HIF312 | 0.8255 | HIF312/HOI | 0.4607 | SGI312 | −0.0234 | \| SGI312 \|/(\| SGI312 \| + TP3) | 0.0476 |
| HIF321 | 0.3505 | HIF321/HOI | 0.1956 | SGI321 | 0.0371 | \| SGI321 \|/(\| SGI321 \| + TP3) | 0.0735 |

Values related to the lengths of the outline curves of the sixth embodiment based on Table 11 and Table 12 are listed in the following table:

Sixth embodiment (Reference wavelength: 555 nm)

| ARE | ½(HEP) | ARE value | ARE − ½(HEP) | 2(ARE/HEP) % | TP | ARE/TP (%) |
|---|---|---|---|---|---|---|
| 11 | 0.546 | 0.598 | 0.052 | 109.49% | 0.468 | 127.80% |
| 12 | 0.500 | 0.506 | 0.005 | 101.06% | 0.468 | 108.03% |
| 21 | 0.492 | 0.528 | 0.036 | 107.37% | 0.349 | 151.10% |
| 22 | 0.546 | 0.572 | 0.026 | 104.78% | 0.349 | 163.78% |
| 31 | 0.546 | 0.548 | 0.002 | 100.36% | 0.559 | 98.04% |
| 32 | 0.546 | 0.550 | 0.004 | 100.80% | 0.559 | 98.47% |

| ARS | EHD | ARS value | ARE − EHD | (ARS/EHD)% | TP | ARS/TP (%) |
|---|---|---|---|---|---|---|
| 11 | 0.640 | 0.739 | 0.099 | 115.54% | 0.468 | 158.03% |
| 12 | 0.500 | 0.506 | 0.005 | 101.06% | 0.468 | 108.03% |
| 21 | 0.492 | 0.528 | 0.036 | 107.37% | 0.349 | 151.10% |
| 22 | 0.706 | 0.750 | 0.044 | 106.28% | 0.349 | 214.72% |
| 31 | 1.118 | 1.135 | 0.017 | 101.49% | 0.559 | 203.04% |
| 32 | 1.358 | 1.489 | 0.131 | 109.69% | 0.559 | 266.34% |

Figure 7A:
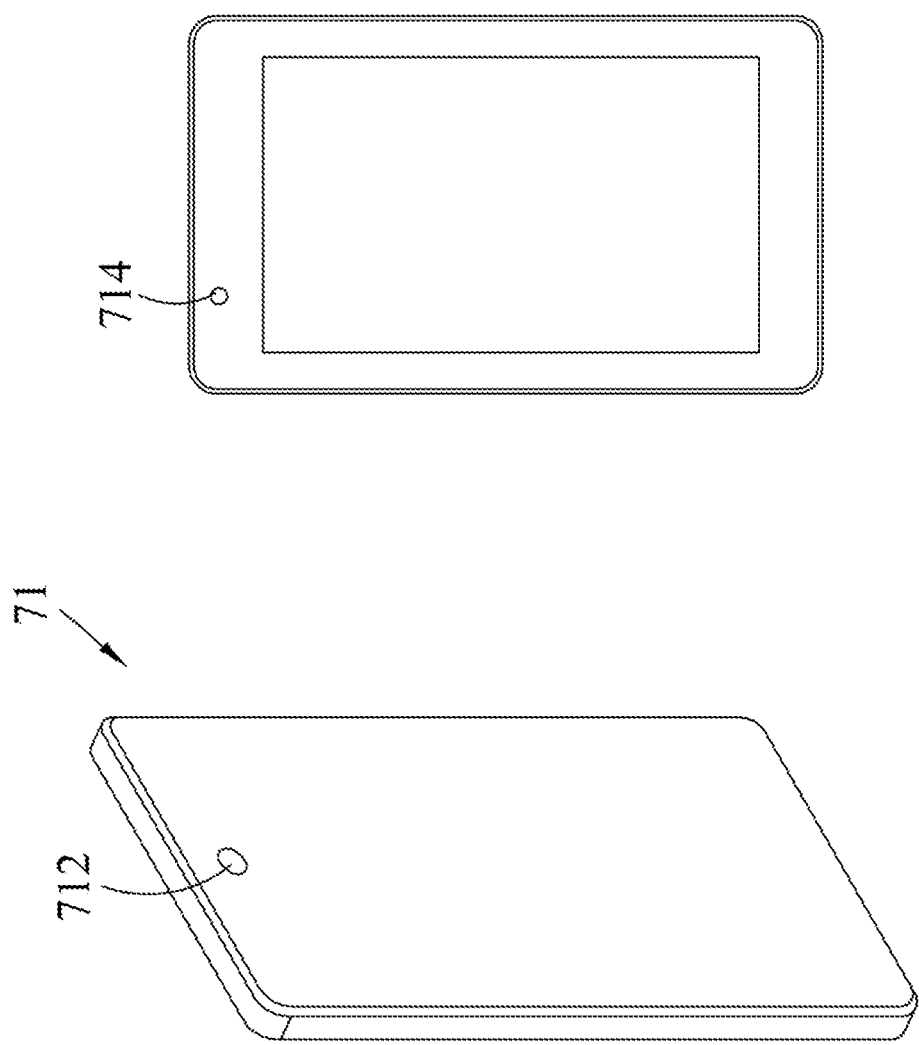
FIG. 7A shows a schematic view of the optical image capturing system with thin mounting components of the present invention applied to a mobile communication device.
Figure 7B:
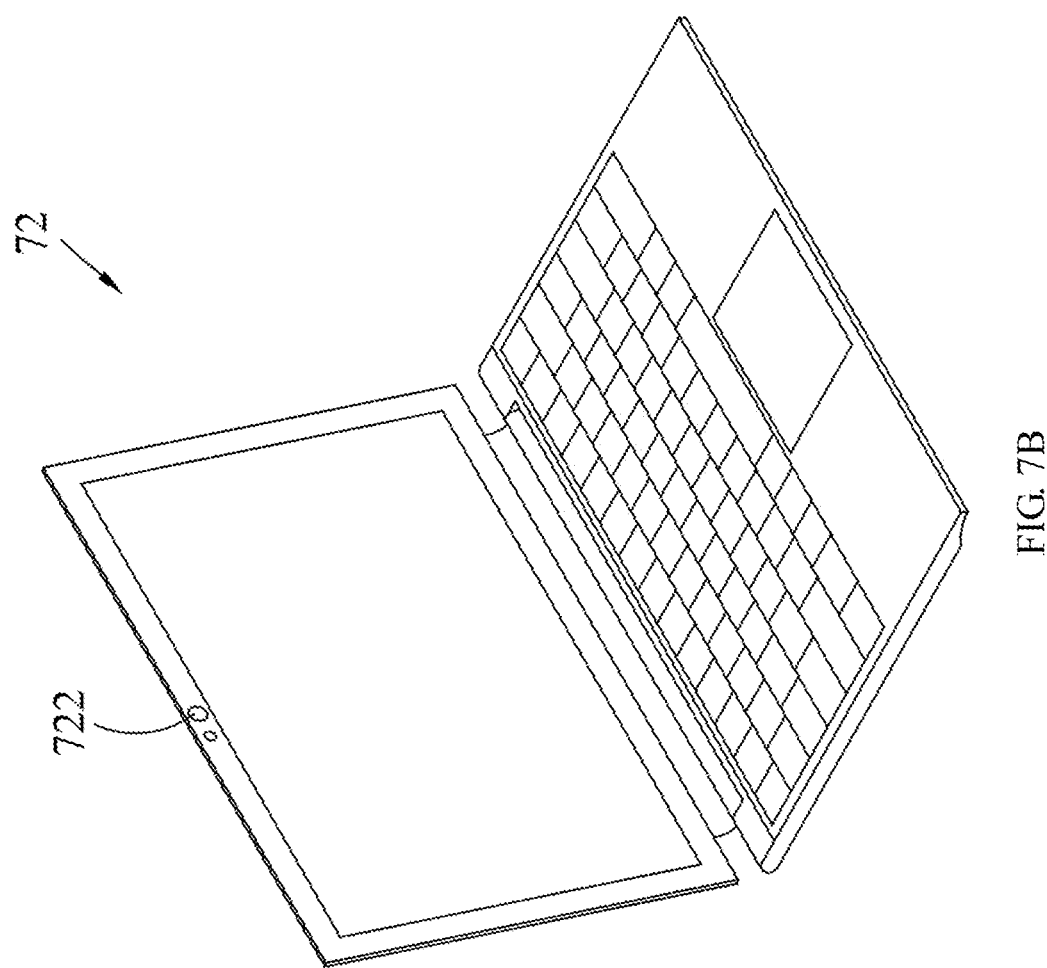
FIG. 7B shows a schematic view of the optical image capturing system with thin mounting components of the present invention applied to a mobile information device.
Figure 7C:
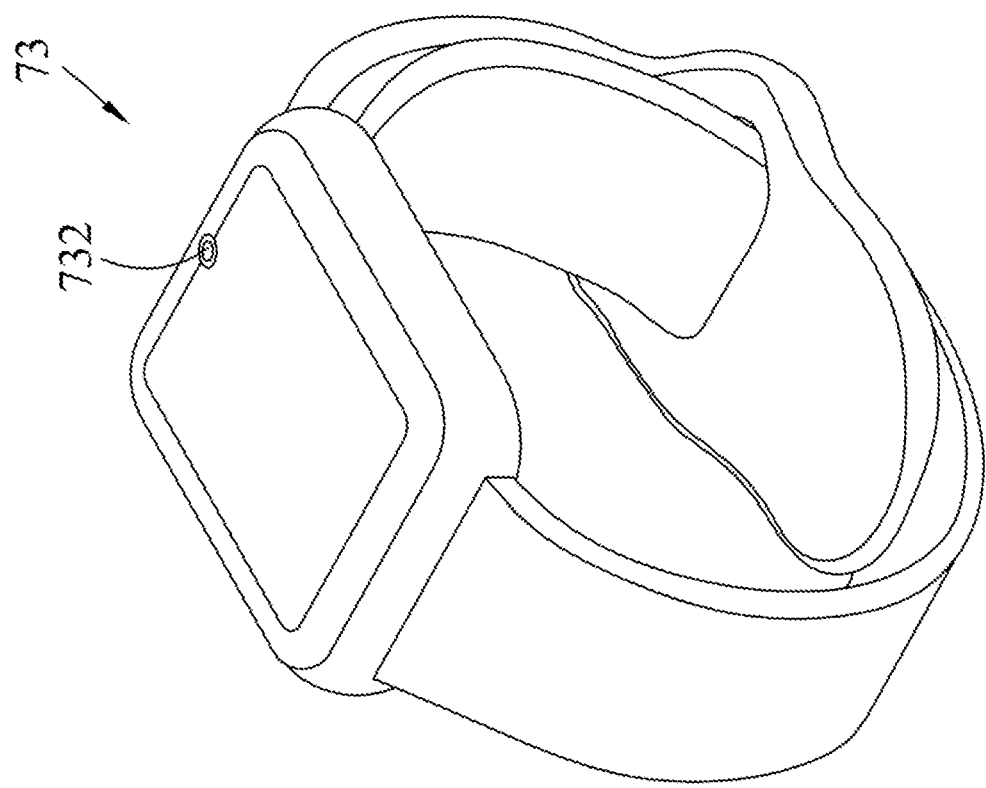
FIG. 7C shows a schematic view of the optical image capturing system with thin mounting components of the present invention applied to a smart watch.
Figure 7D:
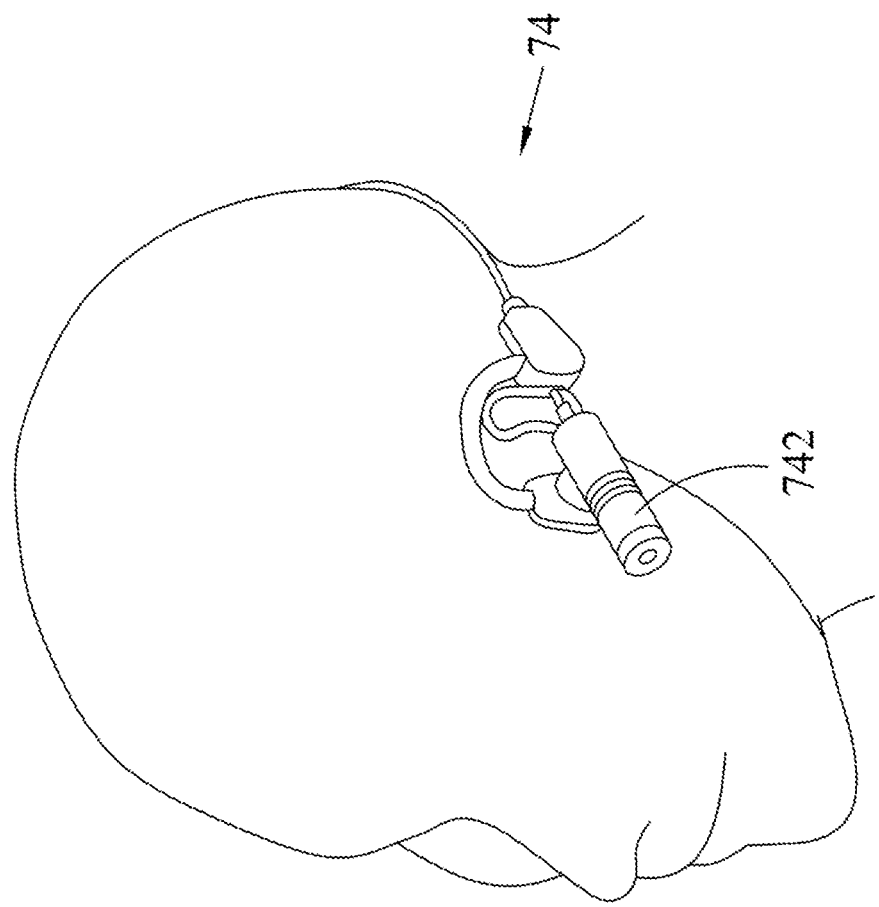
FIG. 7D shows a schematic view of the optical image capturing system with thin mounting components of the present invention applied to a smart head-mounted device.
Figure 7E:
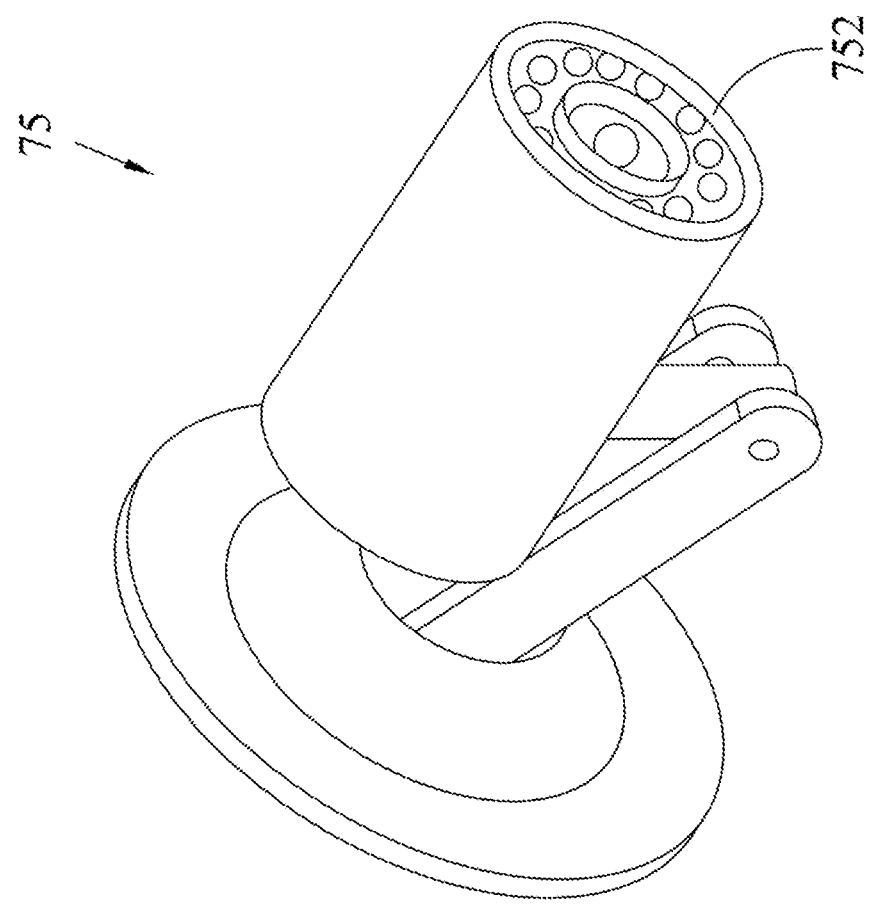
FIG. 7E shows a schematic view of the optical image capturing system with thin mounting components of the present invention applied to a security monitoring device.
Figure 7F:
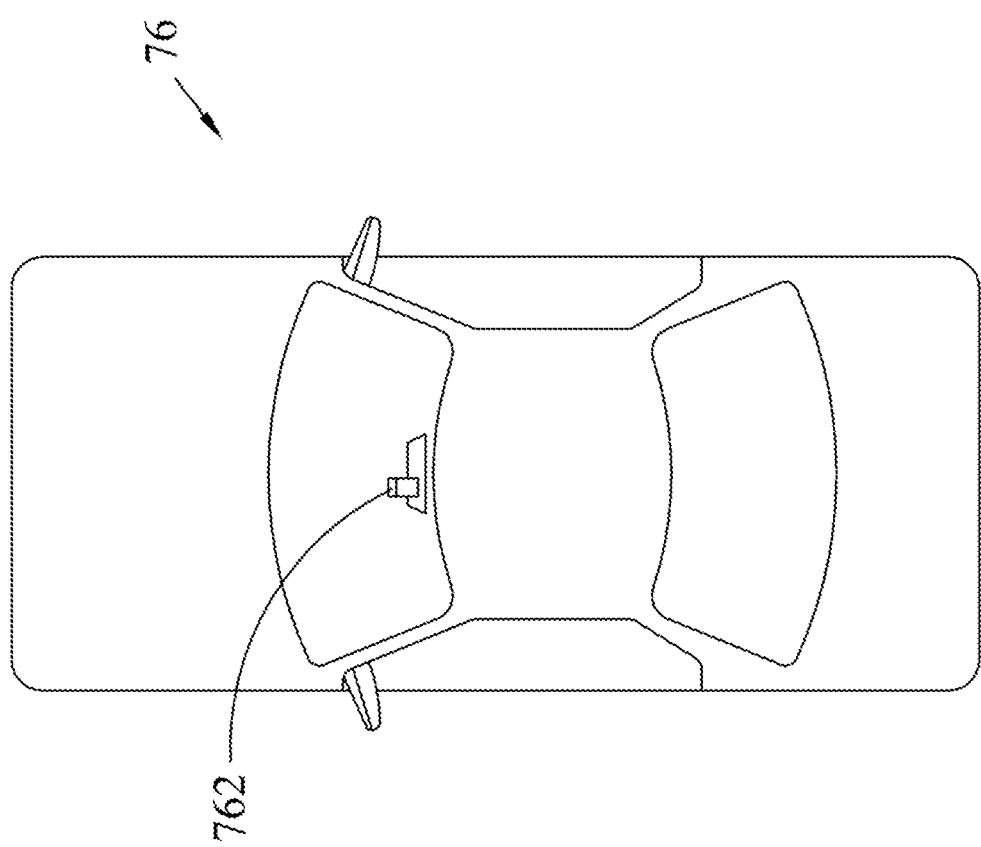
FIG. 7F shows a schematic view of the optical image capturing system with thin mounting components of the present invention applied to an automotive imaging device.
Figure 7G:
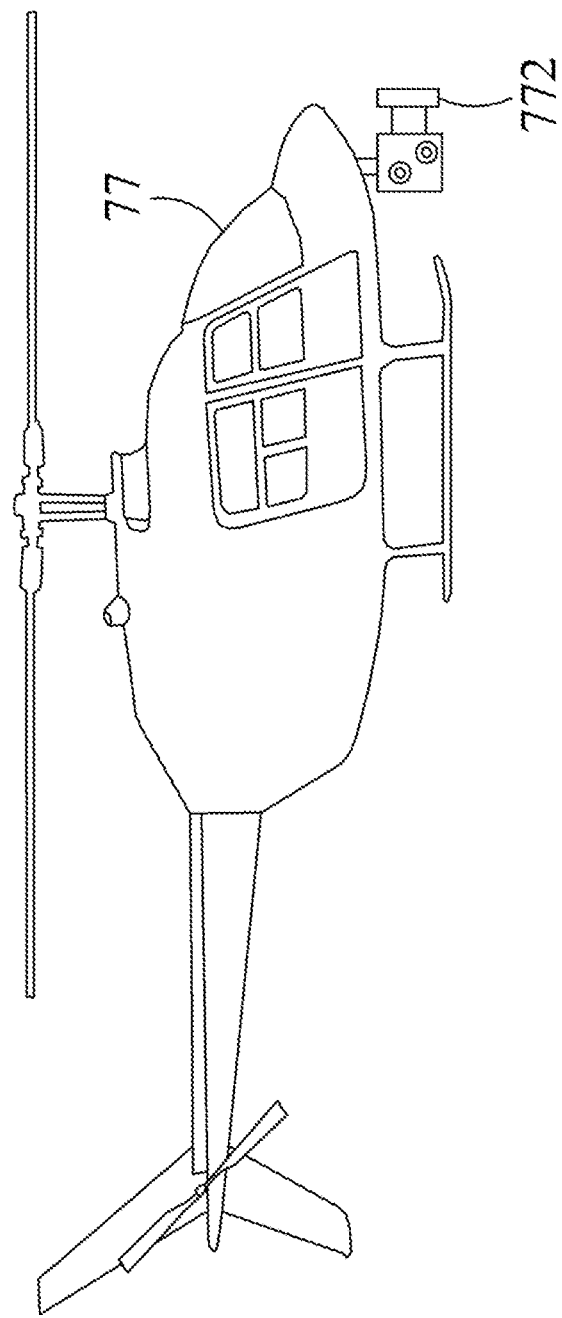
FIG. 7G shows a schematic view of the optical image capturing system with thin mounting components of the present invention applied to an unmanned aerial vehicle.

The optical image capturing system with thin mounting components of present invention is selected from one among the group including an electronic portable device, an electronic wearable device, an electronic monitoring device, an electronic information device, an electronic communication device, a machinery visual device and an automotive electronic device. Based on different requirements, the mechanism space is reduced and the visible field of the screen is elevated by means of different number of lenses of the optical image capturing system with thin mounting components. Referring to FIG. 7A, FIG. 7A shows that an optical image capturing system with thin mounting components 712 and an optical image capturing system with thin mounting components 714 (acting as a front camera lens of the smart phone) of the present invention are applied to a mobile communication device 71, such as a smart phone. FIG. 7B shows that an optical image capturing system with thin mounting components 722 of the present invention is applied to a mobile information device 72, such as a notebook computer. FIG. 7C shows that an optical image capturing system with thin mounting components 732 of the present invention is applied to a smart watch 73. FIG. 7D shows that an optical image capturing system with thin mounting components 742 of the present invention is applied to a smart head-mounted device 74, such as a smart hat. FIG. 7E shows that an optical image capturing system with thin mounting components 752 of the present invention is applied to a security monitoring device 75, such as an IP Cam. FIG. 7F shows that an optical image capturing system with thin mounting components 762 of the present invention is applied to an automotive imaging device 76. FIG. 7G shows that an optical image capturing system with thin mounting components 772 of the present invention is applied to an unmanned aerial vehicle 77. FIG. 7H shows that an optical image capturing system with thin mounting components 782 of the present invention is applied to an extreme sport imaging device 78.

Figure 8A:
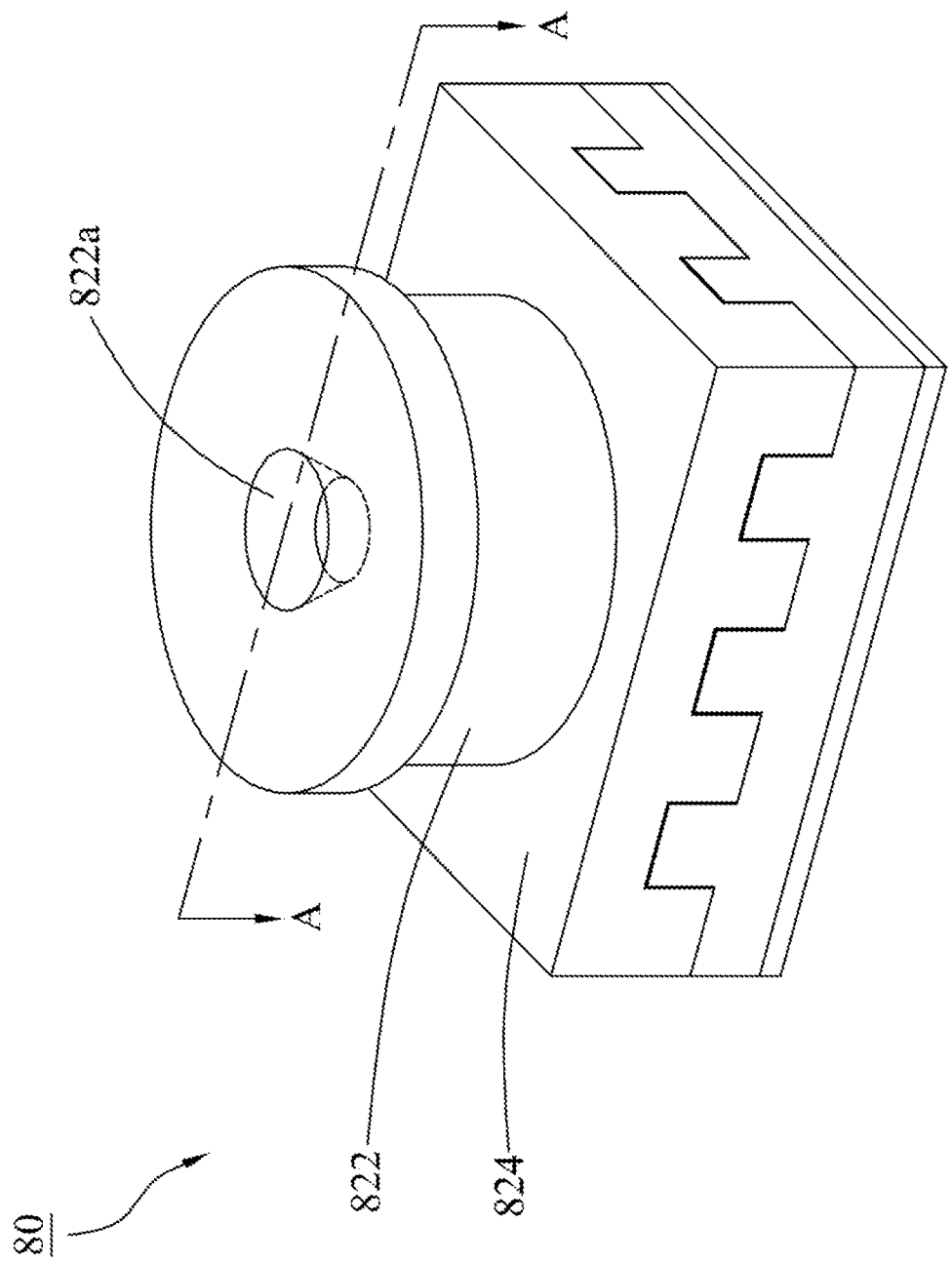
FIG. 8A is a schematic diagram of a first structure of an optical image capturing system with thin mounting components of the present invention.
Figure 8B:
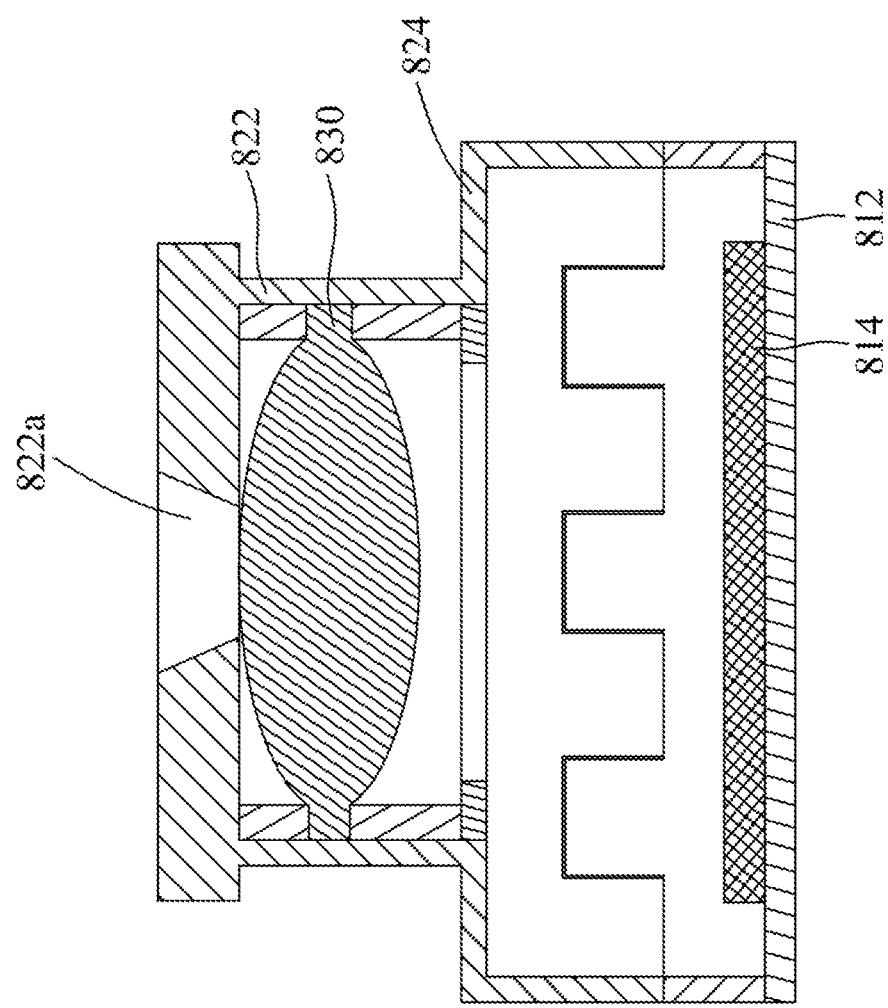
FIG. 8B is a schematic diagram of a second structure of an optical image capturing system with thin mounting components of the present invention.

Referring to FIG. 8A and FIG. 8B, a first lens positioning element of the optical image capturing system with thin mounting components of the present invention may be integrally formed and include a lens mount 822 and a base plate 824. The lens mount 822 is hollow and opaque for shading and accommodating the optical imaging lens set 830 so as to arrange the lenses on the optical axis. The lens mount is cylinder-shaped and the base plate is rectangular-shape. Two opposite ends of the lens mount have a first through hole 822a and a second through hole 822b respectively. The first through hole 822a is connected to the lens mount 822.

The optical imaging lens set 830 is disposed in the lens mount 822 and closer to the first through hole 822a than the image sensing device 814. The optical imaging lens set 830 faces the image sensing device 814 and the substrate 812.

Although the present invention is disclosed by the aforementioned embodiments, those embodiments do not serve to limit the scope of the present invention. A person skilled in the art can perform various alterations and modifications to the present invention, without departing from the spirit and the scope of the present invention. Hence, the scope of the present invention should be defined by the following appended claims.

Despite the fact that the present invention is specifically presented and illustrated with reference to the exemplary embodiments thereof, it should be apparent to a person skilled in the art that, various modifications could be performed to the forms and details of the present invention, without departing from the scope and spirit of the present invention defined in the claims and their equivalence.

What is claimed is:

1. An optical image capturing system with thin mounting components, comprising:
   an optical imaging lens set comprising at least two lenses having refractive power, with a second lens counting from an object side to an image side having a concave object side surface and a convex image side surface;
   an image plane; and
   an image sensing device, disposed on the image plane; and
   a first lens positioning element, comprising a lens mount and a base plate, the lens mount being hollow and opaque for shading the optical imaging lens set, the base plate being configured in a direction approaching the image plane for shading the image plane, a maximum of a smallest length on a plane of a periphery of the base plate and perpendicular to an optical axis is expressed as PhiD;
   wherein a focal length of the optical imaging lens set is expressed as f, an entrance pupil diameter of the optical imaging lens set is expressed as HEP, a half maximum angle of view of the optical imaging lens set is expressed as HAF, a distance on the optical axis from an aperture to the image plane is expressed as InS, the optical axis of the optical imaging lens set is adjustable to overlap a normal line at a center of the image sensing device, and the following conditions are satisfied: $1.0 \leq f/HEP \leq 10.0$, $0 \deg < HAF \leq 150 \deg$, $0 \text{ mm} < PhiD \leq 18 \text{ mm}$, and $0.2 \leq InS/HOS \leq 1.1$, a distance on the optical axis from the object side of a first lens to the image plane is expressed as HOS.

2. The optical image capturing system with thin mounting components according to claim 1, wherein a maximum effective diameter of an image side of a lens closest to the image plane among the optical imaging lens set is expressed as PhiA, and the following condition is satisfied: $0 < PhiA/PhiD \leq 0.99$.

3. The optical image capturing system with thin mounting components according to claim 1, wherein a maximum thickness of a base of the first lens positioning element is expressed as TH1, and the following condition are satisfied: $0 \text{ mm} < TH1 \leq 0.5 \text{ mm}$.

4. The optical image capturing system with thin mounting components according to claim 1, wherein the optical imaging lens set comprises three lenses having refractive power, a sequence from the object side to the image side is a first lens, a second lens and a third lens, a distance on the optical axis from the object side of the first lens to an image side of the third lens is expressed as InTL, and the following conditions is satisfied: $0.1 \leq InTL/HOS \leq 0.95$.

5. The optical image capturing system with thin mounting components according to claim 1, wherein the optical imaging lens set comprises six lenses having refractive power, a sequence from the object side to the image side is a first lens, a second lens, a third lens, a fourth lens, a fifth lens and a sixth lens, a distance on the optical axis from the object side of the first lens to an image side of the sixth lens is expressed as InTL, and the following condition is satisfied: $0.1 \leq InTL/HOS \leq 0.95$.

6. The optical image capturing system with thin mounting components according to claim 1, wherein the optical imaging lens set comprises seven lenses having refractive power, a sequence from the object side to the image side is a first lens, a second lens, a third lens, a fourth lens, a fifth lens, a sixth lens and a seventh lens, a distance on the optical axis from the object side of the first lens to an image side of the seventh lens is expressed as InTL, and the following condition is satisfied: $0.1 \leq InTL/HOS \leq 0.95$.

7. The optical image capturing system with thin mounting components according to claim 1, the optical image capturing system with thin mounting components comprises a second lens positioning element, the second lens positioning element is accommodated in the lens mount and comprises a positioning portion, the positioning portion being hollow for accommodating the optical imaging lens set so as to arrange the lenses on the optical axis, wherein an external side of the positioning portion does not contact an inner side of the lens mount, a maximum diameter on a plane of a periphery of an image side of the positioning portion and perpendicular to the optical axis is expressed as PhiC, the first lens positioning element and the second lens positioning element are fixed to each other by an adhesive in order to conduct an active alignment assembly.

8. The optical image capturing system with thin mounting components according to claim 7, wherein a minimum thickness of the second lens positioning element is TH2, and the following condition is satisfied: $0 \text{ mm} < TH2 \leq 0.5 \text{ mm}$.

9. The optical image capturing system with thin mounting components according to claim 1, wherein the optical image capturing system with thin mounting components is selected from one among a group including an electronic portable device, an electronic wearable device, an electronic monitoring device, an electronic information device, an electronic communication device, a machinery visual device and an automotive electronic device.

10. An optical image capturing system with thin mounting components, comprising:
    an optical imaging lens set comprising at least two lenses having refractive power, with a second lens counting from an object side to an image side having a concave object side surface and a convex image side surface;
    an image plane;
    a first lens positioning element, comprising a lens mount and a base plate, the lens mount being hollow and opaque for shading the optical imaging lens set, the base plate being configured in a direction approaching the image plane for shading the image plane, a maximum of a smallest length on a plane of a periphery of the base plate and perpendicular to an optical axis is expressed as PhiD; and
    a second lens positioning element, being accommodated in the lens mount and comprising a positioning portion, the positioning portion being hollow for accommodating the optical imaging lens set so as to arrange the lenses on the optical axis, wherein an external side of the positioning portion does not contact an inner side of the lens mount, a maximum diameter on a plane of a periphery of an image side of the positioning portion and perpendicular to the optical axis is expressed as PhiC;

wherein a focal length of the optical imaging lens set is f, an entrance pupil diameter of the optical imaging lens set is expressed as HEP, a half maximum angle of view of the optical imaging lens set is expressed as HAF, wherein a maximum thickness of the minimum length of the base plate is expressed as TH1 and the minimum thickness of the positioning portion is expressed as TH2, and the following conditions are satisfied: $1.0 \leq f/HEP \leq 10.0$, 0 deg$<$HAF$\leq$150 deg, 0 mm$<$PhiD$\leq$18 mm and 0 mm$<$TH1+TH2$\leq$1.5 mm.

11. The optical image capturing system with thin mounting components according to claim 10, wherein the optical image capturing system with thin mounting components has a maximum image height HOI on the image plane and perpendicular to the optical axis, and the following condition is satisfied: $0<$(TH1+TH2)/HOI$\leq 0.95$.

12. The optical image capturing system with thin mounting components according to claim 10, wherein a maximum effective diameter of an image side of a lens closest to the image plane among the optical imaging lens set is expressed as PhiA, and the following condition is satisfied: $0<$(TH1+TH2)/PhiA$\leq 0.95$.

13. The optical image capturing system with thin mounting components according to claim 10, wherein the first lens positioning element and the second lens positioning element are fixed to each other by an adhesive.

14. The optical image capturing system with thin mounting components according to claim 10, wherein the optical imaging lens set comprises three lenses having refractive power, a sequence from the object side to the image side is a first lens, a second lens and a third lens, a distance on the optical axis from the object side of the first lens to the image plane is expressed as HOS, a distance on the optical axis from the object side of the first lens to an image side of the third lens is expressed as InTL, and the following condition is satisfied: $0.1 \leq $InTL/HOS$\leq 0.95$.

15. The optical image capturing system with thin mounting components according to claim 10, wherein the optical imaging lens set comprises six lenses having refractive power, a sequence from the object side to the image side is a first lens, a second lens, a third lens, a fourth lens, a fifth lens and a sixth lens, a distance on the optical axis from the object side of the first lens to the image plane is expressed as HOS, a distance on the optical axis from the object side of the first lens to an image side of the sixth lens is expressed as InTL, and the following condition is satisfied: $0.1 \leq $InTL/HOS$\leq 0.95$.

16. The optical image capturing system with thin mounting components according to claim 10, wherein the optical imaging lens set comprises seven lenses having refractive power, a sequence from the object side to the image side is a first lens, a second lens, a third lens, a fourth lens, a fifth lens, a sixth lens and a seventh lens, a distance on the optical axis from the object side of the first lens to the image plane is HOS, a distance on the optical axis from the object side of the first lens to an image side of the seventh lens is expressed as InTL, and the following condition is satisfied: $0.1 \leq $InTL/HOS$\leq 0.95$.

17. The optical image capturing system with thin mounting components according to claim 10, wherein the optical image capturing system with thin mounting components is selected from one among a group including an electronic portable device, an electronic wearable device, an electronic monitoring device, an electronic information device, an electronic communication device, a machinery visual device and an automotive electronic device.

18. An optical image capturing system with thin mounting components, comprising:
  an optical imaging lens set, comprising at least two lenses having refractive power, with a second lens counting from an object side to an image side having a concave object side surface and a convex image side surface;
  an image plane; and
  a first lens positioning element, comprising a lens mount and a base plate, the lens mount being hollow and opaque for shading the optical imaging lens set and accommodating the optical imaging lens set so as to arrange the lenses on the optical axis, the base plate being configured in a direction approaching the image plane for shading the image plane, a maximum of a smallest length on a plane of a periphery of the base plate and perpendicular to an optical axis is expressed as PhiD; wherein a focal length of the optical imaging lens set is expressed as f, an entrance pupil diameter of the optical imaging lens set is expressed as HEP, a half maximum angle of view of the optical imaging lens set is expressed as HAF, wherein a maximum thickness of the minimum length of the base plate is expressed as TH1, and the following conditions are satisfied: $1.0 \leq f/HEP \leq 10.0$, 0 deg$<$HAF$\leq$150 deg, 0 mm$<$PhiD$\leq$18 mm and 0 mm$<$TH1$\leq$0.3 mm.

19. The optical image capturing system with thin mounting components according to claim 18, wherein a maximum effective diameter of an image side of a lens closest to the image plane among the optical imaging lens set is expressed as PhiA, and the following condition is satisfied: $0<$PhiA/PhiD$\leq 0.99$.

20. The optical image capturing system with thin mounting components according to claim 18, wherein the optical image capturing system with thin mounting components is selected from one among a group including an electronic portable device, an electronic wearable device, an electronic monitoring device, an electronic information device, an electronic communication device, a machinery visual device and an automotive electronic device.

* * * * *